(12) United States Patent
Kim et al.

(10) Patent No.: US 12,074,888 B2
(45) Date of Patent: Aug. 27, 2024

(54) NETWORK SECURITY MONITORING METHOD, NETWORK SECURITY MONITORING DEVICE, AND SYSTEM

(71) Applicant: MAGDATA INC., Seoul (KR)

(72) Inventors: Jong Min Kim, Seoul (KR); Ho Jeong Hwang, Seongnam-si (KR); Yun Young Hur, Yongin-si (KR)

(73) Assignee: MAGDATA INC., Seoul (KR)

( * ) Notice: Subject to any disclaimer, the term of this patent is extended or adjusted under 35 U.S.C. 154(b) by 543 days.

(21) Appl. No.: 17/276,822

(22) PCT Filed: Sep. 19, 2019

(86) PCT No.: PCT/KR2019/012151
§ 371 (c)(1),
(2) Date: Mar. 17, 2021

(87) PCT Pub. No.: WO2020/060231
PCT Pub. Date: Mar. 26, 2020

(65) Prior Publication Data
US 2021/0352090 A1  Nov. 11, 2021

(30) Foreign Application Priority Data

Sep. 19, 2018 (KR) .................. 10-2018-0112360
Jan. 10, 2019 (KR) .................. 10-2019-0003294
(Continued)

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC . H04L 63/1416; H04L 63/1425; H04L 43/20; H04L 41/40; H04L 49/208; H04L 63/1408; H04L 67/1095
See application file for complete search history.

(56) References Cited

U.S. PATENT DOCUMENTS 9,985,984 B1  5/2018  Chavez et al.
2003/0182580 A1  9/2003  Lee
(Continued)

FOREIGN PATENT DOCUMENTS

JP  2012-533231 A  12/2012
JP  2017-028616 A  2/2017
(Continued)

*Primary Examiner* — Huan V Doan
(74) *Attorney, Agent, or Firm* — INVENSTONE PATENT, LLC

(57) ABSTRACT

Disclosed is a network security monitoring device, which is included in a network comprising a first entity, a second entity, a switching device provided between the first entity and the second entity, and the network security monitoring device connected to the switching device. The device comprises the port for obtaining at least one mirrored packet for at least one packet transmitted and received between the first entity and the second entity on the basis of mirroring from the switching device, and a processor for determining whether a security problem has occurred for a network associated with the first entity and the second entity on the basis of at least some of information included in the at least one mirrored packet.

16 Claims, 36 Drawing Sheets

(30) Foreign Application Priority Data

Jan. 10, 2019 (KR) .......................... 10-2019-0003295
Jan. 10, 2019 (KR) .......................... 10-2019-0003296

(56) References Cited

U.S. PATENT DOCUMENTS

| | | |
|---|---|---|
| 2007/0056028 A1 | 3/2007 | Kay |
| 2008/0240128 A1 | 10/2008 | Elrod |
| 2011/0271341 A1 | 11/2011 | Satish et al. |
| 2014/0201838 A1* | 7/2014 | Varsanyi ............... G06F 21/552 |
| | | 726/23 |
| 2017/0302554 A1* | 10/2017 | Chandrasekaran ......................... |
| | | H04L 43/0882 |
| 2018/0288126 A1* | 10/2018 | Smart ..................... H04L 69/22 |

FOREIGN PATENT DOCUMENTS

| | | |
|---|---|---|
| JP | 2017-111796 A | 6/2017 |
| JP | 2017-152852 A | 8/2017 |
| JP | 2018026747 A | 2/2018 |
| KR | 10-2012-0000942 A | 1/2012 |
| KR | 10-2015-0120882 A | 10/2015 |
| KR | 10-1621019 B1 | 5/2016 |
| KR | 10-2016-0105222 A | 9/2016 |
| KR | 10-2018-0041953 A | 4/2018 |
| KR | 10-2018-0085157 A | 7/2018 |

* cited by examiner

FIG. 12

| Alert Name | Rule Set | Alert Level | Duration | Server IP | SMS | E-Mail |
|---|---|---|---|---|---|---|
| Web traffic latency occurs | Wait > 70%<br>Latency > 5sec | Normal | 10sec | All web servers | Y | Y |
| WAS traffic server latency 5 sec or more | Latency > 5sec | High | 5sec | 1 case except 192.169.10.20 | Y | Y |
| WAS traffic Wait excess occurs | Wait > 70% | High | 5sec | 1 case except 192.169.10.20 | | Y |
| DB traffic latency occurs | Wait > 70%<br>Latency > 5sec | Normal | 10sec | All DB servers | | Y |
| BPS excess occurs | BPS > 50M | Normal | 5sec | All servers | | Y |
| 50X Error occurs | Http 50x Error > 5 | High | 5sec | All web servers | Y | Y |
| CPS excess occurs | CPS > 150 | Low | 10sec | All servers | | Y |
| Wait excess occurs | Session > 1000<br>Wait > 80% | High | 10sec | All servers | Y | Y |
| Web WAS section latency occurs | Latency > 5sec | Normal | 5sec | All Web-WAS servers | | Y |

FIG. 27

| Layer | Protocol example | Processable security module | | | | |
|---|---|---|---|---|---|---|
| | | Packet information | Traffic information | Protocol information | Statistical information | Alive information |
| L7 (Application) | HTTP, FTP | | | ○ | ○ | |
| L6 (Presentation) | TLS, SSL | | | | | |
| L5 (Session) | NetBIOS Named PIPE | | | | | |
| L4 (Transport) | TCP, UDP | ○ | ○ | | ○ | ○ |
| L3 (Network) | IP, ICMP | ○ | | | ○ | ○ |
| L2 (Data Link) | Ethernet, PPP | | | | | |
| L1 (Physical) | WiFi, RS-232 | | | | | |

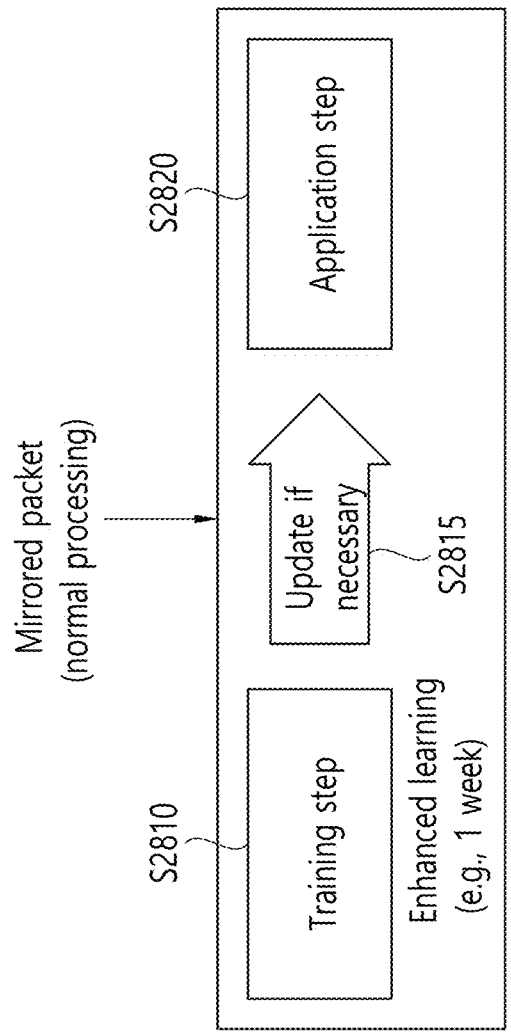

FIG. 29

| Processing element | Scheme (Detection Method) | Algorithm (target item) | Monitoring device | Edge (IoT) |
|---|---|---|---|---|
| Protocol information | AI (Clustering) Specification (Rule/Pattern) | AI Clustering (L7 data) Specification Anomaly detection (ex: URL, Command, Behavior) | ○ | × |
| Traffic information | AI (Clustering) | AI Clustering (ex: Traffic Dispersion Graph) | ○ | × |
| Packet information | AI (Clustering) Signature (Rule/Pattern) | AI Clustering (L3/L4 data) Signature Anomaly detection (ex: source IP, source Port, destination IP, destination Port, Protocol, Packet Flag, PPS, BPS, CPS) | ○ | ○ |
| Statistical information | AI (Statistical) | AI Time-based comparison(ex: difference(Ti – Tj)) | ○ | × |
| Alive information | Specification (Rule/Pattern) | Specification Threshold-based comparison | ○ | × |
| System state and log information | Signature (Rule/Pattern) | Signature Threshold-based comparison | × | ○ |

FIG. 30

| Processing element | |
|---|---|
| Protocol information | AI<br>    Excessive request for specific SQL from specific IP occurs<br>    Excessive HTTP request from source IP having small HTTP occurs<br>    Excessive request for specific URL for specific server occurs<br>Specification<br>    Specific action (ex: keep-alive) of 1 minute-threshold occurs<br>    Excessive access to a specific URL causing 404 error occurs<br>    Three times of login failure for 1 minute |
| Traffic information | AI<br>    Traffic deviated from normal traffic dispersion graph occurs |
| Packet information | AI<br>    Excessive access to a specific section (source IP ~ destination IP)<br>    Abnormal excessive request for specific URL<br>    When BPS of specific server is abnormally high Signature<br>    10,000 PPS or more occurs from specific source IP<br>    Excesssive SYN packet occurs from specific source IP<br>    Specific IP simultaneously attempts access to several server IPS |
| Statistical information | AI<br>    Occurrence of current average BPS at 2 p.m. twice than average<br>    BPS during same time zone with last week<br>    Server access from client IP not having access during one week<br>    When outbound BPS of server is higher than that at normal times |
| Alive information | Specification<br>    Access impossible for 3 seconds or more<br>    ACK packet very smaller than SYN packet generated<br>    When device IP is not present in ARP list |
| System state and log information | Signature<br>    Login attempt from unauthrorized IP<br>    Operation of unknown process<br>    Login failure of 3 times or more for 1 minute |

FIG. 31

|  |  | Whether security detection by monitoring device is performed | |
|---|---|---|---|
|  |  | ○ | × |
| Whether edge security detection is performed | ○ | Highest | Low |
|  | × | High | Lowest |

FIG. 32

| Mode | Status (TRUE) | Condition-1 | Condition-2 |
|---|---|---|---|
| Passive | Server Down | NOW() - last_transfer_time > n sec | COUNT(SYN) > m |
| Passive | Service Down | NOW() - last_transfer_time > n sec | COUNT(server_reset) > m |
| Active | Server Down | CONNECT(server_ip) = network_timeout or CONNECT(server_ip) = network_close | server_ip NOT IN(ARP) |
| Active | Service Down | CONNECT(server_ip) = network_timeout or CONNECT(server_ip) = network_close | server_ip IN(ARP) |

NETWORK SECURITY MONITORING METHOD, NETWORK SECURITY MONITORING DEVICE, AND SYSTEM

CROSS-REFERENCE TO RELATED APPLICATIONS

This application is the National Stage filing under 35 U.S.C. 371 of International Application No. PCT/KR2019/012151, filed on Sep. 19, 2019, which claims the benefit of earlier filing date and right of priority to Korean Application No. 10-2018-0112360, filed on Sep. 19, 2018 and No. 10-2019-0003294, filed on Jan. 10, 2019 and No. 10-2019-0003295, filed on Jan. 10, 2019, and No. 10-2019-0003296, filed on Jan. 10, 2019, the contents of which are all hereby incorporated by reference herein in their entirety.

BACKGROUND OF THE DISCLOSURE

Field of the Disclosure

The present disclosure relates to monitoring for a network, and more particularly, to a method of monitoring a network for quality and/or security diagnosis of a network including a plurality of entities.

Related Art

A network generally includes a communication link and various devices connected to the communication link and having a communication capability. In this case, the devices related to the network include a computer, a peripheral device, a router, a storage device, a processor and several electrical products having communication interfaces. In this case, the term "device" typically includes logical devices or other devices capable of processing and exchanging functionality and data, and may include household appliances and computers for common purposes.

Known network systems include a client device and various server devices associated with a web site used by a user. In general, the client device transmits an access request to a server having a specific IP address in order to use a web site and accesses the server after latency. In this case, if multiple client devices by multiple users access a server at a look at specific timing, performance of a network service associated with the server may be degraded due to a bottleneck phenomenon. When a service performance or quality problem occurs, a user experiences the reduced usage of service and reduced productivity and sales because latency is increased due to latency. Furthermore, an increased in the IT operation cost occurs, and an operator of a server and/or the management of related business may see bad consequences of competitive devaluations in a company.

Accordingly, a cause of performance degradation needs to be rapidly checked, and measures therefor need to be rapidly performed as soon as possible. However, proper measures are not taken because there is no proper service in clearly checking where such a cause of performance degradation is located.

FIG. 1 is a concept view for describing a conventional process of performing network service management.

Referring to FIG. 1, for IT management, an IT team leader transmits a command related to quality management to a network management part, a server management part, a database development part, an application development part, etc.

When a specific service problem occurs, each of persons in charge of the parts individually determines a problem in an IT device managed by the person and reports the problem. That is, the person does not rapidly check a cause of a problem due to an independent approach to the problem with a specific service, such as "this is not an application problem", "this is not a network problem" and/or "there is no abnormality in a server", and does not properly handle a problem with degraded performance. That is, there is a problem in that a golden time for performance improvement is missed.

Meanwhile, with the development of the Internet of Things (IoT), various change occurred even in the structure of a known network. As numerous devices to which the IoT has been applied participate in a network, the number of client terminals that access one server tends to clearly increase in geometrical progression, and diagnosis for the entire network including devices becomes gradually difficult. Moreover, if a security problem occurs in any one of IoT devices, there is a problem in that the IoT devices are vulnerable to security compared to conventional and common components of a network although the security problem may become a threat to the entire network.

SUMMARY

An object according to an aspect of the present disclosure for solving the aforementioned problems is to provide a method of monitoring a network, which can perform performance and/or security diagnosis for the network including a plurality of entities more efficiently and certainly.

A network security monitoring method according to an embodiment of the present disclosure for solving the aforementioned problems is a security monitoring method for a network including a first entity and a second entity, a switching device provided between the first entity and the second entity, and a network security monitoring device connected to the switching device, and may include the steps of obtaining, by the network security monitoring device, at least one mirrored packet for at least one packet transmitted and received between the first entity and the second entity, based on mirroring from the switching device; and determining, by the network security monitoring device, whether a security problem for the network associated with the first entity and the second entity occurs, based on at least some of pieces of information included in the at least one mirrored packet.

According to an aspect, the step of determining, by the network security monitoring device, whether a security problem occurs may include the steps of determining whether the security problem occurs based on information obtained from the at least one mirrored packet and related to data transmission and reception; determining whether the security problem occurs based on statistical information obtained from a plurality of mirrored packets; and determining whether the security problem occurs based on alive information indicating that a connection to at least one of the first entity and the second entity is possible.

According to an aspect, the step of determining whether the security problem occurs based on the information related to data transmission and reception may include the steps of determining whether the security problem occurs based on packet information including information from the at least one packet; determining whether the security problem occurs based on traffic information including information on a flow of the packet by using the source and destination of the packet; and determining whether the security problem occurs based on protocol information including information on the transmission and reception of a plurality of packets and an application of the packet.

According to an aspect, the packet information may be obtained from at least one of an OSI 3 layer and an OSI 4 layer, the traffic information may be obtained from the OSI 4 layer, the protocol information may be obtained from an OSI 7 layer, the statistical information may be obtained from at least one of the OSI 3 layer, the OSI 4 layer and the OSI 7 layer, and the alive information may be obtained from at least one of the OSI 3 layer and the OSI 4 layer.

According to an aspect, the step of determining whether the security problem occurs based on the packet information may include using at least one of clustering-based anomaly detection and signature-based detection, the step of determining whether the security problem occurs based on the traffic information may include using the clustering-based anomaly detection, the step of determining whether the security problem occurs based on the protocol information may include using at least one of the clustering-based anomaly detection and specification-based detection, the step of determining whether the security problem occurs based on the statistical information may include using statistical scheme-based anomaly detection, and the step of determining whether the security problem occurs based on the alive information may include using the specification-based detection.

According to an aspect, the step of determining whether the security problem occurs based on the packet information may include determining that a security problem has occurred in the network, based on at least one of a determination that the number of accesses in a section from a predetermined first source IP to a first destination IP is a predetermined threshold or more, a determination that a request for a predetermined first URL is a predetermined threshold or more, a determination that a bit per second (BPS) of a predetermined first server is a predetermined threshold or more, a determination that a packet per second (PPS) from a predetermined second source IP is a predetermined threshold or more, a determination that the number of synchronization signal (SYN) packets from a predetermined third source IP is a predetermined threshold or more, and a determination that a predetermined fourth source IP simultaneously attempts access to a predetermined threshold or more of server IPs.

According to an aspect, the step of determining whether the security problem occurs based on the traffic information may include determining that a security problem has occurred in the network, in response to a determination that traffic deviated from a traffic dispersion graph by a predetermined threshold or more has occurred by using a clustering scheme.

According to an aspect, the step of determining whether the security problem occurs based on the protocol information may include determining that a security problem has occurred in the network, based on at least one of a determination that a request for a predetermined first structured query language (SQL) from a predetermined first IP has occurred by a predetermined threshold or more, a determination that an HTTP request of a predetermined threshold or more from a fifth source IP whose HTTP request is smaller than a preset reference value has occurred, a determination that a request for a predetermined second URL for a predetermined second server has occurred by a predetermined threshold or more, a determination that a predetermined first action has occurred by a predetermined threshold or more for predetermined time length duration, a determination that access to a URL causing a 404 error has occurred by a predetermined threshold or more, and a determination that a login failure of a threshold number or more has occurred for predetermined time length duration.

According to an aspect, the step of determining whether the security problem occurs based on the statistical information may include determining that a security problem has occurred in the network, based on at least one of a determination that an average BPS for predetermined first duration is greater than an average BPS for the same time length duration prior to a preset date by a predetermined threshold or more, a determination that server access from a client IP not having access for predetermined time length duration has occurred, and a determination that an outbound BPS of a server is more than twice a preset average value.

According to an aspect, the step of determining whether the security problem occurs based on the alive information may include determining that a security problem has occurred in the network, based on at least one of a determination that access to at least one of the first entity or the second entity is impossible during time length duration of a predetermined threshold, a determination that an acknowledgement signal (ACK) packet has been generated less than a synchronization signal (SYN) packet by a predetermined threshold or more, and a determination that a device IP is not present within an address resolution protocol (ARP).

According to an aspect, the network security monitoring method may further include the step of calculating a performance-related index indicative of performance of service of a network associated with the first entity and the second entity based on at least some of pieces of information included in the at least one mirrored packet, in parallel to the step of determining, by the network security monitoring device, whether a security problem occurs.

According to an aspect, the first entity may include a server, and the second entity may include a client terminal.

According to an aspect, the client terminal may include an IoT device.

According to an aspect, the first entity may include a network video recorder (NVR), and the second entity may include an IP camera.

According to an aspect, the step of determining, by the network security monitoring device, whether a security problem occurs may include determining whether a security problem occurs based on at least one of artificial intelligence-based anomaly detection including a clustering or statistical scheme, signature-based detection using a pattern or a rule, and specification-based detection using a pattern or a ruler 다.

A network security monitoring device according to another embodiment of the present disclosure for solving the aforementioned problems is a network security monitoring device included in a network including a first entity and a second entity, a switching device provided between the first entity and the second entity, and a network security monitoring device connected to the switching device, and may include a port obtaining at least one mirrored packet for at least one packet transmitted and received between the first entity and the second entity, based on mirroring from the switching device and a processor determining whether a security problem for the network associated with the first entity and the second entity occurs, based on at least some of pieces of information included in the at least one mirrored packet.

A network security monitoring system according to another embodiment of the present disclosure for solving the aforementioned problem is a network security monitoring system determining whether a network security problem occurs, and may include a first entity; a second entity; a switching device provided between the first entity and the second entity; and a network security monitoring device connected to the switching device, obtaining at least one mirrored packet for at least one packet transmitted and received between the first entity and the second entity based on mirroring from the switching device, and determining whether a security problem for the network associated with the first entity and the second entity occurs based on at least some of pieces of information included in the at least one mirrored packet.

A computer-readable storage device according to another embodiment of the present disclosure for solving the aforementioned problems is a computer-readable storage device in which instructions executable by a processor of a computing device are stored in a network including a first entity and a second entity, a switching device provided between the first entity and the second entity, and the computing device connected to the switching device, wherein when being executed by the processor, the instructions may be configured to obtain at least one mirrored packet for at least one packet transmitted and received between the first entity and the second entity, based on mirroring from the switching device and to determine whether a security problem for the network associated with the first entity and the second entity occurs, based on at least some of pieces of information included in the at least one mirrored packet.

An artificial intelligence-based anomaly detection method according to an embodiment of the present disclosure for solving the aforementioned problem is an artificial intelligence-based anomaly detection method for a network, which is performed by a network monitoring device in the network including a first entity and a second entity, a switching device provided between the first entity and the second entity, and the network monitoring device connected to the switching device, and may include the steps of obtaining at least one mirrored packet for at least one packet transmitted and received between the first entity and the second entity based on mirroring from the switching device for predetermined first duration; training an artificial neural network based on the at least one mirrored packet for the determined first duration; and detecting whether an anomaly for the network has occurred based on at least some of pieces of information included in the at least one mirrored packet from the switching device at monitoring timing by using the trained artificial neural network.

According to an aspect, the step of training the artificial neural network may include the steps of converting the at least one mirrored packet for the predetermined first duration into each numerical value by using a first function; and determining, by the artificial neural network, the range of a normal numerical value based on the numerical values.

According to an aspect, the step of detecting whether an anomaly occurs may include the steps of converting the at least one packet mirrored at the monitoring timing into a reference numerical value by using the first function; and determining that an anomaly has occurred in response to a determination that the reference numerical value is not included in the range of the normal numerical value.

According to an aspect, the step of detecting whether an anomaly occurs may include determining whether a security problem for the network has occurred based on anomaly detection based on artificial intelligence including a clustering or statistical scheme.

According to an aspect, the step of detecting whether an anomaly occurs may include the steps of detecting whether an anomaly occurs based on information obtained from the at least one mirrored packet and related to data transmission and reception; detecting whether an anomaly occurs based on statistical information obtained from a plurality of mirrored packets; and detecting whether an anomaly occurs based on alive information indicating that a connection to at least one of the first entity and the second entity is possible.

According to an aspect, the step of detecting whether an anomaly occurs based on the information related to data transmission and reception may include the steps of detecting whether an anomaly occurs based on packet information including information from the at least one packet; detecting whether an anomaly occurs based on traffic information including information on a flow of the packet by using the source and destination of the packet; and detecting whether an anomaly occurs based on protocol information including information on the transmission and reception of a plurality of packets and the application of the packet.

According to an aspect, the packet information may be obtained from at least one of an OSI 3 layer and an OSI 4 layer, the traffic information may be obtained from an OSI 4 layer, the protocol information may be obtained from the OSI 7 layer, the statistical information may be obtained from at least one of the OSI 3 layer, the OSI 4 layer and the OSI 7 layer, and the alive information may be obtained from at least one of the OSI 3 layer and the OSI 4 layer.

According to an aspect, the step of detecting whether an anomaly occurs based on the packet information may include using at least one of clustering-based anomaly detection and signature-based detection. The step of detecting whether an anomaly occurs based on the traffic information may include using the clustering-based anomaly detection. The step of detecting whether an anomaly occurs based on the protocol information may include using at least one of the clustering-based anomaly detection and specification-based detection. The step of detecting whether an anomaly occurs based on the statistical information may include using statistical scheme-based anomaly detection. The step of detecting whether an anomaly occurs based on the alive information may include using the specification-based detection.

According to an aspect, the step of detecting whether an anomaly occurs based on the packet information may include determining that an anomaly has occurred in the network based on at least one of a determination that the number of accesses in a section from a predetermined first source IP to a first destination IP is a predetermined threshold or more, a determination that a request for a predetermined first URL is a predetermined threshold or more, a determination that a bit per second (BPS) of a predetermined first server is a predetermined threshold or more, a determination that a packet per second (PPS) from a predetermined second source IP is a predetermined threshold or more, a determination that the number of synchronization signal (SYN) packets from a predetermined third source IP is a predetermined threshold or more, and a determination that a predetermined fourth source IP simultaneously attempts access to a predetermined threshold or more of server IPs.

According to an aspect, the step of detecting whether an anomaly occurs based on the traffic information may include determining that an anomaly has occurred in the network, in response to a determination that traffic deviated from a traffic dispersion graph by a predetermined threshold or more has occurred by using a clustering scheme.

According to an aspect, the step of detecting whether an anomaly occurs based on the protocol information may include determining that an anomaly has occurred in the network based on at least one of a determination that a request for a predetermined first structured query language (SQL) from a predetermined first IP has occurred by a predetermined threshold or more, a determination that an HTTP request of a predetermined threshold or more from a fifth source IP whose HTTP request is smaller than a preset reference value has occurred, a determination that a request for a predetermined second URL for a predetermined second server has occurred by a predetermined threshold or more, a determination that a predetermined first action has occurred by a predetermined threshold or more for predetermined time length duration, a determination that access to a URL causing a 404 error has occurred by a predetermined threshold or more, and a determination that a login failure of a threshold number or more has occurred for predetermined time length duration.

According to an aspect, the step of detecting whether an anomaly occurs based on the statistical information may include determining that an anomaly has occurred in the network based on at least one of a determination that an average BPS for predetermined first duration is greater than an average BPS for the same time length duration prior to a preset date by a predetermined threshold or more, a determination that server access from a client IP not having access for predetermined time length duration has occurred, or a determination that the outbound BPS of the server is more than twice a preset average value.

According to an aspect, the step of detecting whether an anomaly occurs based on the alive information may include determining that an anomaly has occurred in the network based on at least one of a determination that access to at least one of the first entity or the second entity is impossible during time length duration of a predetermined threshold, a determination that an acknowledgement signal (ACK) packet has been generated less than a synchronization signal (SYN) packet by a predetermined threshold or more, a determination that a device IP is not present within an address resolution protocol (ARP).

According to an aspect, the first entity may include a server, and the second entity may include a client terminal.

According to an aspect, the client terminal may include an IoT device.

According to an aspect, the first entity may include a network video recorder (NVR), and the second entity may include an IP camera.

According to an aspect, the second entity may include a processor and perform edge computing or may be connected to the switching device via an edge computing device including a processor. The artificial intelligence-based anomaly detection method may further include the step of determining, by the second entity or the edge computing device, whether an anomaly for the network associated with the first entity and the second entity has occurred based on the at least some of pieces of information included in at least one packet received by the second entity or transmitted by the second entity, in parallel to the network monitoring device.

According to an aspect, the step of determining, by the second entity or the edge computing device, whether an anomaly has occurred may include the step of determining whether an anomaly has occurred based on at least one of a system state and log information of the second entity or the edge computing device.

According to an aspect, the step of determining, by the second entity or the edge computing device, whether an anomaly has occurred may include the step of determining whether an anomaly has occurred, based on packet information including information obtained from at least one packet transmitted to and received from the second entity or the edge computing device and related to data transmission and reception.

According to an aspect, the step of determining whether an anomaly has occurred based on at least one of the system state and the log information may include the step of determining that an anomaly has occurred in the second entity or the edge computing device, based on at least one of a determination that a login attempt has occurred from a unauthorized IP to the second entity or the edge computing device, a determination that an operation of an unknown process has occurred in the second entity or the edge computing device, or a determination that a login failure of a predetermined number or more for the second entity or the edge computing device has occurred for predetermined time length duration.

According to an aspect, the artificial intelligence-based anomaly detection method may further include the step of transmitting, by the second entity or the edge computing device, edge area security alert information to the switching device, in response to the determination that the second entity or the edge computing device determines that an anomaly has occurred.

According to an aspect, the artificial intelligence-based anomaly detection method may further include the step of transmitting security alert information to a user terminal having a first account for the management of a pre-registered network, in response to a determination that the network monitoring device determines that an anomaly for the network has occurred or the reception of the edge area security alert information from the second entity or the edge computing device via the switching device.

An artificial intelligence-based anomaly detection device according to another embodiment of the present disclosure for solving the aforementioned problems is an artificial intelligence-based anomaly detection device included in a network including a first entity and a second entity, a switching device provided between the first entity and the second entity, and an artificial intelligence-based anomaly detection device connected to the switching device, and may include a port which obtains at least one mirrored packet for at least one packet transmitted and received between the first entity and the second entity based on mirroring from the switching device; and a processor which obtains at least one mirrored packet for at least one packet transmitted and received between the first entity and the second entity based on mirroring from the switching device for predetermined first duration, trains an artificial neural network based on the at least one mirrored packet for the determined first duration, and detects whether an anomaly for the network occurs based on at least some of pieces of information included in the at least one mirrored packet from the switching device at monitoring timing by using the trained artificial neural network.

An anomaly detection system according to another embodiment of the present disclosure for solving the aforementioned problems is a network anomaly detection system detecting whether an anomaly for a network occurs, and may include a first entity; a second entity; a switching device provided between the first entity and the second entity; and an anomaly detection device which is connected to the switching device and which obtains at least one mirrored packet for at least one packet transmitted and received between the first entity and the second entity based on mirroring from the switching device for predetermined first duration, trains an artificial neural network based on the at least one mirrored packet for the determined first duration, and detects whether an anomaly for the network occurs based on at least some of pieces of information included in the at least one mirrored packet from the switching device at monitoring timing by using the trained artificial neural network.

A computer-readable storage device according to another embodiment of the present disclosure for solving the aforementioned problems is a computer-readable storage device in which instructions executable by the processor of a computing device are stored in a network including a first entity and a second entity, a switching device provided between the first entity and the second entity, and the computing device connected to the switching device, wherein the instructions may be configured to enable the processor, when being executed by the processor, to obtain at least one mirrored packet for at least one packet transmitted and received between the first entity and the second entity based on mirroring from the switching device for predetermined first duration, to train an artificial neural network based on the at least one mirrored packet for the determined first duration, and to detect whether an anomaly for the network occurs based on at least some of pieces of information included in the at least one mirrored packet from the switching device at monitoring timing by using the trained artificial neural network.

A network monitoring method according to an embodiment of the present disclosure for solving the aforementioned problem is an edge computing-based network monitoring method for a network including a first entity and a second entity, a switching device provided between the first entity and the second entity, and a network monitoring device connected to the switching device. The second entity includes a processor and performs edge computing or is connected to the switching device via an edge computing device including a processor. The method may include the steps of obtaining, by the network monitoring device, at least one mirrored packet for at least one packet transmitted and received between the first entity and the second entity based on mirroring from the switching device; determining, by the network monitoring device, whether a security problem for a network associated with the first entity and the second entity occurs based on at least some of pieces of information included in the at least one mirrored packet; and determining, by the second entity or the edge computing device, whether a security problem for a network associated with the first entity and the second entity occurs based on the at least some of pieces of information included in at least one packet received by the second entity or transmitted by the second entity, in parallel to the network monitoring device.

According to an aspect, the first entity may include a server, and the second entity may include a client terminal.

According to an aspect, the client terminal may include an IoT device.

According to an aspect, the first entity may include a network video recorder (NVR), and the second entity may include an IP camera.

According to an aspect, the step of determining, by the second entity or the edge computing device, whether a security problem occurs may include the step of determining whether a security problem occurs based on at least one of a system state and log information of the second entity or the edge computing device.

According to an aspect, the step of determining, by the second entity or the edge computing device, whether a security problem occurs may further include the step of determining whether a security problem occurs based on packet information including information obtained from at least one packet transmitted to and received from the second entity or the edge computing device and related to data transmission and reception.

According to an aspect, the step of determining whether a security problem occurs based on at least one of the system state and the log information may include the step of determining that a security problem has occurred in the second entity or the edge computing device based on at least one of a determination that a login attempt has occurred from a unauthorized IP to the second entity or the edge computing device, a determination that an operation of an unknown process has occurred in the second entity or the edge computing device, and a determination that a login failure of a predetermined number or more for the second entity or the edge computing device has occurred for predetermined time length duration.

According to an aspect, the network monitoring method may further include the step of transmitting, by the second entity or the edge computing device, edge area security alert information to at least one of the switching device and the network monitoring device, in response to a determination that the second entity or the edge computing device determines that the security problem has occurred.

According to an aspect, the network monitoring method may further include the step of transmitting security alert information to a user terminal having a first account for the management of a pre-registered network, in response to a determination that the network monitoring device determines that a security problem for the network has occurred or the reception of edge area security alert information directly from the second entity or the edge computing device or via the switching device.

According to an aspect, the step of determining, by the network monitoring device, whether a security problem occurs may include determining whether a security problem occurs based on at least one of anomaly detection based on artificial intelligence including a clustering or statistical scheme, signature-based detection using a pattern or a rule, and specification-based detection using a pattern or a rule.

According to an aspect, the step of determining, by the network monitoring device, whether a security problem occurs may include the steps of determining whether a security problem occurs based on information obtained from the at least one mirrored packet and related to data transmission and reception; determining whether a security problem occurs based on statistical information obtained from a plurality of mirrored packets; and determining whether a security problem occurs based on alive information indicating that a connection to at least one of the first entity and the second entity is possible.

According to an aspect, the step of determining whether a security problem occurs based on the information related to data transmission and reception may include the steps of determining whether a security problem occurs based on packet information including information from at least one packet; determining whether a security problem occurs based on traffic information including information on a flow of the packet by using the source and destination of the packet; and determining whether a security problem occurs based on protocol information including information on the transmission and reception of a plurality of packets and the application of the packet.

According to an aspect, the packet information may be obtained from at least one of an OSI 3 layer and an OSI 4 layer, the traffic information may be obtained from an OSI 4 layer, the protocol information may be obtained from the OSI 7 layer, the statistical information may be obtained from at least one of the OSI 3 layer, the OSI 4 layer and the OSI 7 layer, and the alive information may be obtained from at least one of the OSI 3 layer and the OSI 4 layer.

According to an aspect, the step of determining whether the security problem occurs based on the packet information may include using at least one of clustering-based anomaly detection and signature-based detection. The step of determining whether the security problem occurs based on the traffic information may include using the clustering-based anomaly detection. The step of determining whether the security problem occurs based on the protocol information may include using at least one of the clustering-based anomaly detection and specification-based detection. The step of determining whether the security problem occurs based on the statistical information may include using statistical scheme-based anomaly detection. The step of determining whether the security problem occurs based on the alive information may include using the specification-based detection.

According to an aspect, the step of determining whether the security problem occurs based on the packet information may include determining that the security problem has occurred in the network, based on at least one of a determination that the number of accesses in a section from a predetermined first source IP to a first destination IP is a predetermined threshold or more, a determination that a request for a predetermined first URL is a predetermined threshold or more, a determination that a bit per second (BPS) of a predetermined first server is a predetermined threshold or more, a determination that a packet per second (PPS) from a predetermined second source IP is a predetermined threshold or more, a determination that the number of synchronization signal (SYN) packets from a predetermined third source IP is a predetermined threshold or more, and a determination that a predetermined fourth source IP simultaneously attempts access to a predetermined threshold or more of server IPs.

According to an aspect, the step of determining whether the security problem occurs based on the traffic information may include determining that the security problem has occurred in the network, in response to a determination that traffic deviated from a traffic dispersion graph by a predetermined threshold or more has occurred by using a clustering scheme.

According to an aspect, the step of determining whether the security problem occurs based on the protocol information may include determining that the security problem has occurred in the network, based on at least one of a determination that a request for a predetermined first structured query language (SQL) from a predetermined first IP has occurred by a predetermined threshold or more, a determination that an HTTP request of a predetermined threshold or more from a fifth source IP whose HTTP request is smaller than a preset reference value has occurred, a determination that a request for a predetermined second URL for a predetermined second server has occurred by a predetermined threshold or more, a determination that a predetermined first action has occurred by a predetermined threshold or more for predetermined time length duration, a determination that access to a URL causing a 404 error has occurred by a predetermined threshold or more, a determination that a login failure of a threshold number or more has occurred for predetermined time length duration.

According to an aspect, the step of determining whether the security problem occurs based on the statistical information may include determining that the security problem has occurred in the network, based on at least one of a determination that an average BPS for predetermined first duration is greater than an average BPS for the same time length duration prior to a preset date by a predetermined threshold or more, a determination that server access from a client IP not having access for predetermined time length duration has occurred, or a determination that the outbound BPS of the server is more than twice a preset average value.

According to an aspect, the step of determining whether the security problem occurs based on the alive information may include determining that the security problem has occurred in the network, based on at least one of a determination that access to at least one of the first entity or the second entity is impossible during time length duration of a predetermined threshold, a determination that an acknowledgement signal (ACK) packet has been generated less than a synchronization signal (SYN) packet by a predetermined threshold or more, a determination that a device IP is not present within an address resolution protocol (ARP).

A network monitoring method according to another embodiment of the present disclosure for solving the aforementioned problem is an edge computing-based network monitoring method for a network including a first entity and a second entity, a switching device provided between the first entity and the second entity, and a network monitoring device connected to the switching device, wherein the second entity includes a processor and performs edge computing or is connected to the switching device via an edge computing device including a processor. The method may include the step of determining, by the second entity or the edge computing device, whether a security problem for a network associated with the first entity and the second entity occurs based on at least some of pieces of information included in at least one packet received by the second entity or transmitted by the second entity, in parallel to monitoring, by the network monitoring device, whether a security problem for the network occurs.

A second entity according to another embodiment of the present disclosure for solving the aforementioned problems is a second entity included in a network including a first entity and a second entity, and a switching device provided between the first entity and the second entity. The second entity includes a transceiver unit for transmitting and receiving packets to and from the first entity. The second entity includes a processor and performs edge computing or is connected to the switching device via an edge computing device including a processor. The processor may be configured to determine whether a security problem for a network associated with the first entity and the second entity occurs, based on at least some of pieces of information included in at least one packet received by the second entity or transmitted by the second entity.

A network monitoring system according to another embodiment of the present disclosure for solving the aforementioned problems is a network monitoring system which determines whether a network security problem occurs, and includes a switching device provided between a first entity and a second entity; a network monitoring device connected to the switching device and obtaining at least one mirrored packet for at least one packet transmitted and received between the first entity and the second entity based on mirroring from the switching device and determining whether a security problem for a network associated with the first entity and the second entity occurs based on at least some of pieces of information included in the at least one mirrored packet; and the second entity which includes a processor and performs edge computing or which is connected to the switching device via an edge computing device including a processor. The processor may be configured to determine whether a security problem for a network associated with the first entity and the second entity occurs, based on at least some of pieces of information included in at least one packet received by the second entity or transmitted by the second entity.

A computer-readable storage device according to another embodiment of the present disclosure for solving the aforementioned problem is a computer-readable storage device in which instructions executable by a processor are stored in a network including a first entity and a second entity, and a switching device provided between the first entity and the second entity, wherein the second entity includes a processor and performs edge computing or is connected to the switching device via an edge computing device including a processor. The instructions may be configured to enable the processor, when being executed by the processor, to determine whether a security problem for a network associated with the first entity and the second entity occurs based on at least some of pieces of information included in at least one packet received by the second entity or transmitted by the second entity.

Advantageous Effects

According to the network monitoring device or the network monitoring method according to an embodiment of the present disclosure, performance and/or security monitoring for at least one of a plurality of entities included in a network can be performed more efficiently and certainly. Furthermore, real-time diagnosis and post-forensics diagnosis can be performed together.

According to an aspect of the present disclosure, monitoring for a network can be efficiently performed although multiple entities are included in the entire network because at least some IoT devices of a plurality of entities in addition to a main monitoring device directly perform performance and/or security diagnosis at least partially.

BRIEF DESCRIPTION OF THE DRAWINGS

FIG. 12 is a table illustrating an example of setting values for determining whether an alert associated with network performance in the packet mirroring device according to an embodiment of the present disclosure occurs, FIG. 27 is a table illustrating an example of a security monitoring application scheme according to OSI 7 layers, FIG. 28 is a concept view of a method of applying a security monitoring method based on artificial intelligence, FIG. 29 is a table illustrating an example of security monitoring methods and target items according to a processing element, FIG. 30 is a table illustrating an example of security detection according to a processing element, FIG. 31 is a table illustrating security according to cooperation between the monitoring device and an edge area, FIG. 32 is a table illustrating an example of a security algorithm of alive information.

DESCRIPTION OF EXEMPLARY EMBODIMENTS

Figure 1:
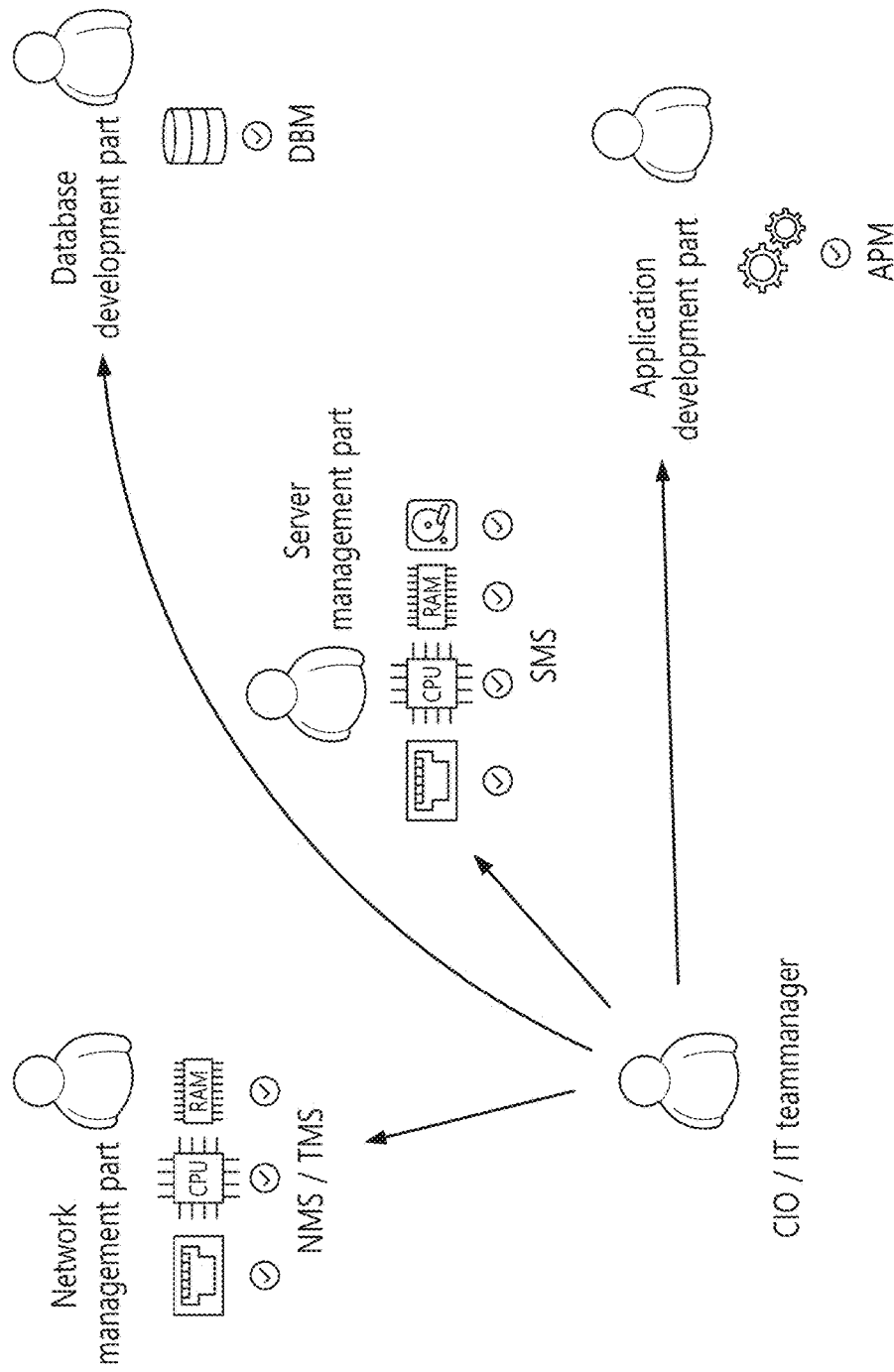
FIG. 1 is a concept view for describing a conventional process of performing network service management.

The present disclosure may be modified in various ways and may have various embodiments. Specific embodiments will be illustrated in the drawings and described in detail.

It is however to be understood that the present disclosure is not intended to be limited to the specific embodiments, but includes all modifications, equivalents and/or substitutions which fall within the spirit and technological scope of the present disclosure.

Terms, such as "a first" and "a second", may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include" or "have", is intended to designate the presence of a characteristic, a number, a step, an operation, an element, a part or a combination of them described in the specification and does not exclude the existence or possible addition of one or more other characteristics, numbers, steps, operations, elements, parts or combinations of them in advance.

Terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, preferred embodiments of the present disclosure are more specifically described with reference to the accompanying drawings. In describing the present disclosure, in order to help general understanding, the same reference numerals are used to denote the same elements throughout the drawings, and a redundant description of the same elements is omitted.

Throughout the entire specification, an entity includes various devices associated with a network, and is a term including a client terminal and/or a server device, IoT devices included in a network, a network video recorder (NVR), and a cloud network.

A user basically means the user of a client terminal or an IoT device. However, according to circumstances, a user means the user of a packet mirroring device (may also be hereinafter referred to as a "network performance diagnosis device" or a "network monitoring device") according to an embodiment of the present disclosure. A network operator and/or a network manager is a person who manages a network related to the packet mirroring device, and may mean the user of the packet mirroring device.

A network performance diagnosis device for calculating a performance-related index related to network performance may be called a packet mirroring device. Furthermore, the network performance diagnosis device may also be called a network performance index visualization device because it may be implemented as a device for visualizing a performance-related index of a network service. Additionally, the network performance diagnosis device may also be called a network-new entity registration device because it may be implemented as a device that registers a newly associated entity with a network. Furthermore, the network performance diagnosis device may also be called a network monitoring device that performs diagnosis for performance and/or security of a network.

Furthermore, the term called network performance may be comprehensively used in relation to communication performance in a server, a communication network and a client. Furthermore, the term called security of a network may include at least one of security elements according to detection based on anomaly detection, signature-based detection, or specification-based detection. Furthermore, security in the present disclosure includes an unintentional obstacle cause in addition to an intentional obstacle cause. Accordingly, the detection of a system design error, a system operation error, or a mistake of a manager may be included in security monitoring.

Network Performance Monitoring

Figure 2:
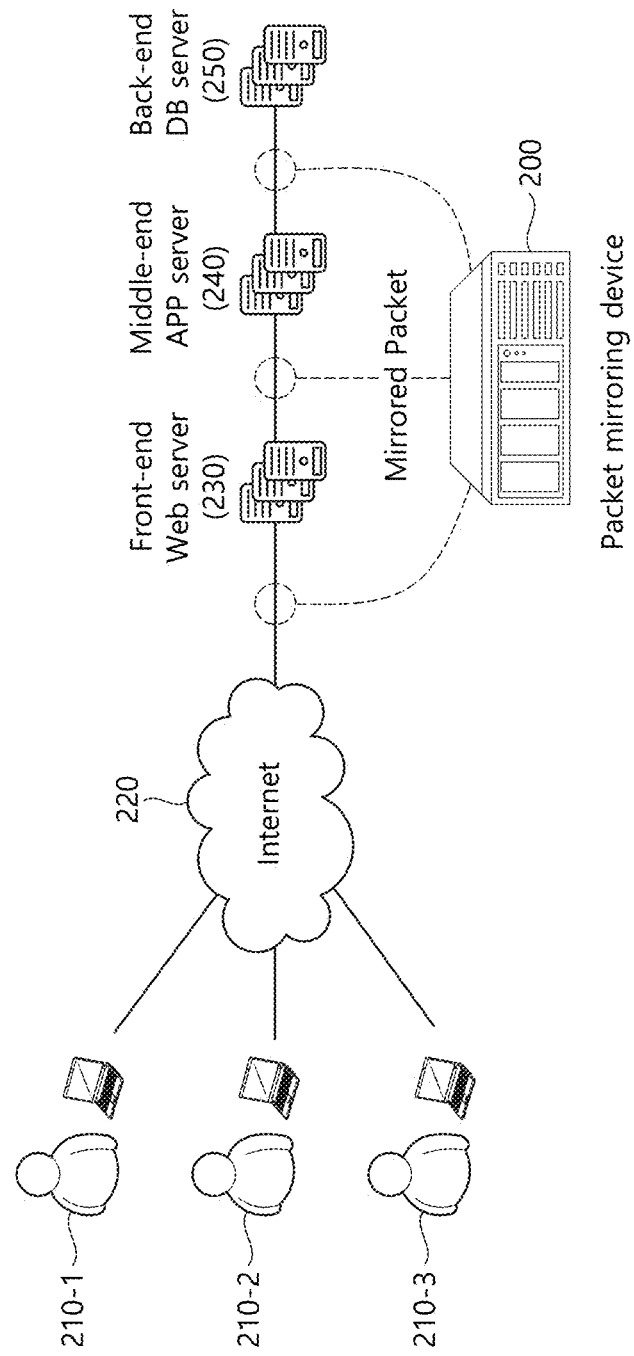
FIG. 2 is a concept view illustrating a system including a packet mirroring device according to an embodiment of the present disclosure.

FIG. 2 is a concept view illustrating a system including a packet mirroring device according to an embodiment of the present disclosure. As illustrated in FIG. 2, the packet mirroring system according to an embodiment of the present disclosure may include client terminals 210-1 to 210-3, a network 220, server stages 230 to 250, and a packet mirroring device 200.

Referring to FIG. 2, the client terminals 210-1 to 210-3 access a specific web site and/or web application over the network 220. In this case, the access is performed in the server stages 230 to 250 associated with the web site and/or the web application. The client terminals 210-1 to 210-3 access a specific web page through a web browser and request the execution of a desired page or application. The request may include the execution of multimedia content, such as a moving image and audio, and/or other applications in addition to static content such as a html document.

According to an embodiment of the present disclosure, the client terminals 210-1 to 210-3 are operated by a user, and may include a given device having a communication function (including Internet access and a web browser execution function) and a data processing function. The client terminals 210-1 to 210-3 may be denoted as a mobile station (MS), a user equipment (UE), a user terminal (UT), a wireless terminal, an access terminal (AT), a terminal, a fixed or mobile subscriber unit, a subscriber station (SS), a cellular telephone, a wireless device, a wireless communication device, a wireless transmit/receive unit (WTRU), a mobile node, a mobile, a mobile station, a personal digital assistant (PDA), a smartphone, a laptop, a netbook, a personal computer, a wireless sensor, a consumer electronic device (CE), an Internet of things (IoT) device or other terms. Various embodiments of the client terminals 210-1 to 210-3 may include a cellular phone, a smartphone having a wireless communication function, a personal digital assistant (PDA) having a wireless communication function, a wireless modem, a portable computer having a wireless communication function, a photographing device such as a digital camera having a portable wireless communication function, a gaming device having a wireless communication function, music storage and playback home appliances having a wireless communication function, Internet home appliances capable of wireless Internet access and browsing, and portable units or terminals in which combinations of such functions are integrated, but the present disclosure is not limited thereto.

Each of the client terminals 210-1 to 210-3 may include a user communication interface, including input devices, such as a mouse and a keyboard for receiving a user input, and a display for providing a control user interface that enables a user to interact with networked devices. The user interface may include a graphical user interface (GUI) in order to provide a user with information.

The network 220 includes a wired and/or wireless network. The network 220 may include the Internet. The network 220 may include a serial bus that provides a physical layer (medium) for the transmission and reception of data between variously accessed client terminals 210-1 to 210-3 and server stages 230 to 250. In this case, the serial bus may include 1394 serial bus. The 1394 serial bus may support both a time-multiplexed audio/video (A/V) stream and Internet Protocol (IP) communication (e.g., IETF REC 2734), but the present disclosure is not essentially limited thereto. The network 220 may also include a non-1394 network (e.g., Ethernet). Furthermore, the network 220 may include a home network. Furthermore, the network 220 may be a given network supporting an IoT connection. Each of the client terminals 210-1 to 210-3 may communicate with one or more server devices 230 to 250 over the network 220.

The server stages 230 to 250 respond to requests from users by using resources of the network 220 in order to provide the users with services. The response includes the return of information (data). Furthermore, the response includes the return of performance (e.g., mechanical function) and state of a function, the return of a data stream and state, the return of the accommodation and state of a data stream, or the storage of a state for various actions. The server stages 230 to 250 may include an ordered, embedded, or control program in order to implement control of their own hardware.

The server stages 230 to 250 may be associated with a specific web site and/or web application, and perform an operation and management related to a task performed in each web site and/or web application. The server stages 230 to 250 may interact with the client terminals 210-1 to 210-3 and other servers 230 to 250. Exemplary services may include MPEG sourcing/sinking and a display service.

The server stages 230 to 250 may process information, such as interface data (e.g., HTML, XML, Java, JavaScript, GIF, JPEG, MPEG, a graphic file or another given format used for an intended purpose) that provides an interface for a command and control for a device through the network 220. In a specific embodiment, each of the servers 230 to 250 may process information, such as one or more hypertext markup languages (HTMLs) providing a command and control for a corresponding device. The server stages 230 to 250 use an Internet standard indicative of a HTML page by using a browser scheme.

According to an embodiment of the present disclosure, the server stages 230 to 250 may include a web server 230, an app server 240, and a database (DB) server 250. However, the server stages do not need to be essentially composed of only a combination of the three servers. It is valid that only the web server 230 is present and the app server 240 and the DB server 250 are not present. Only one app server 240 may be configured, and other various forms and a server combination of layers are also possible.

The web server 230 is a server that provides requested content to a web client. The web server 230 may provide a web browser with static HTML or an image, such as JPEG or GIF, through a HTTP protocol. According to circumstances, the web server 230 may also include a container capable of operating an internal application therein.

The app server 240 may also be called a web application server (WAS) server, which indicates a middleware software server that provides transaction processing and management and an application execution environment in a client/server environment. Typically, the server stages 230 to 250 may be constructed as a three-layer web computing environment of a web server, an application server, and a database. In this case, the app server 240 plays a role as an application server of the client/server environment. The app server 240 provides an application execution environment and a database access function, manages transactions, performs business logic for processing a task, and performs an application association between other types of systems, etc.

According to an embodiment of the present disclosure, an effective distribution may be induced through a function classification of the web server 230 and the WAS 240. Static data may be processed by the web server 230 that is present ahead in structure, and dynamic data may be processed by the WAS 240, that is, a rear stage. For example, an HTML and JavaScript file, CSS, an image, etc., that is, static data, are located and processed by the web server 230 in response to a request from a user so that a service request is not transmitted to the WAS 240. Furthermore, a web application service is handed over to the WAS 240 located at the back side, so that the WAS 240 can concentrate on the execution of a web application. A method of processing a thing to be processed by the web server 230 and a thing to be handed over to the WAS 240 may be processed through a configuration of the web server 230. Whether to hand a specific extension or a directory task to the WAS 240 is processed by the web server 230.

The DB server 250 is a repository in which various data handled by the web server 230 and/or the app server 240 is stored. The DB server 250 may store a task processed by the web server 230 and/or the app server 240, a web site, a large amount of data associated with a web application depending on the properties of the web application. The large amount of data may include personal information, institution information, data associated with various types of content (e.g., multimedia content), etc.

The packet mirroring device 200 may be disposed in at least one of spaces between the network 220 and the web server 230, between the web server 230 and the app server 240, and between the app server 240 and the DB server 250. The packet mirroring device 200 is connected to a switching device (not illustrated) disposed in at least one of the spaces between the network 220 and the web server 230, between the web server 230 and the app server 240, and between the app server 240 and the DB server 250, and diagnoses performance of a network service based on a packet mirrored from packets transmitted and received between two entities. According to the embodiment of the present disclosure, since the mirrored packet may be generated by duplication based on packets (actually used user traffic) that are actually transmitted and received, a separate artificial test packet does not need to be generated in order to diagnose performance of a network service. In particular, the packet mirroring device 200 may monitor all packets in real time.

The packet mirroring device 200 calculates various indices indicative of performance of a network service in real time based on various information (e.g., a source ID, a destination ID and time information) included in a mirrored packet. The calculation of the index may be performed in a transaction unit. The calculated index may be more than 120 types, which are more specifically described with reference to FIG. 5. The packet mirroring device 200 determines whether a problem, such as speed delay, waiting delay, exceeding traffic, or the occurrence of an error, in what section for each section based on calculated indices, and visualizes a result of the determination so that an operator or manager can check the result. That is, the packet mirroring device 200 enables an error section to be rapidly checked, and enables measures against the error section to be rapidly performed based on the check. Since such management of a network service is performed in one point, IT management distributed and performed by several persons in charge conventionally can be efficiently performed, and the state of a network service in all sections is shows at a look. Accordingly, immediately checking an error can be supported, and measures therefor can be performed.

Moreover, the packet mirroring device 200 may track approach (related to a security issue) from a malicious user by analyzing a mirrored packet, and enables measures therefor to be performed in real time.

According to the embodiment of the present disclosure, the packet mirroring device 200 may not require the installation of an agent that substantially gives a burden on the server stages 230 to 250 because it is connected to the switching device. That is, the packet mirroring device 200 does not give a burden, such as slowing a task speed of the server stages 230 to 250. However, the packet mirroring device 200 of the present disclosure does not need to be configured as hardware and may be installed and operated in the switching device or another device as software.

Figure 3:
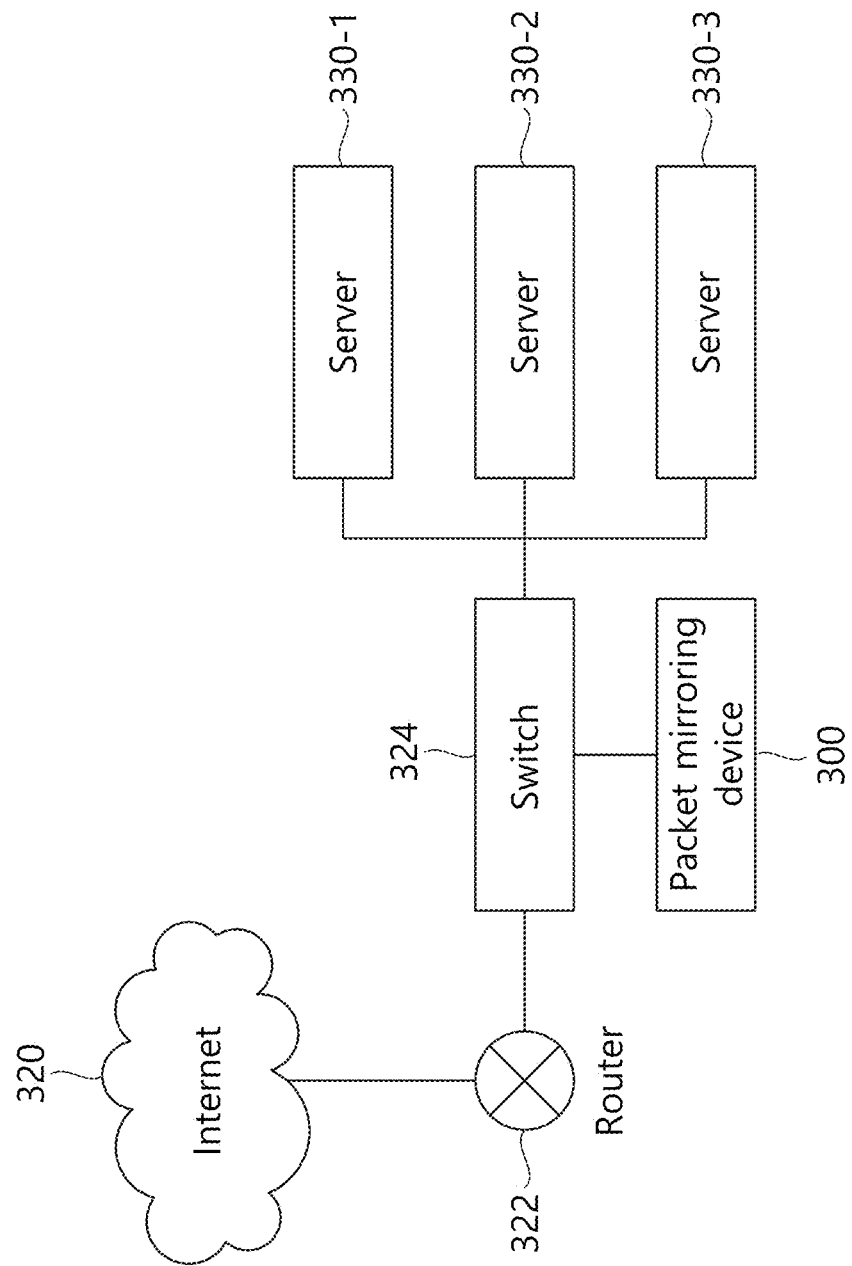
FIG. 3 is a block diagram illustrating a connection configuration between the packet mirroring device and another device of a network according to an embodiment of the present disclosure.

FIG. 3 is a block diagram illustrating a connection configuration between the packet mirroring device and another device of a network according to an embodiment of the present disclosure.

Referring to FIG. 3, a router 322 is connected to a network, such as the Internet 320. The router 322 is connected to a switch 324, transmits a request from a client terminal (not illustrated) to servers 330-1 to 330-3 related to the request, and transmits, to the client terminal, information related to a response to the request from the servers 330-1 to 330-3.

The router 322 or a sharer (not illustrated) having a routing function extracts a location and receiving address of a packet transmitted by the client terminal through the Internet 320, designates an optimal path for the location, and turns a data packet to the switch 324 according to the path. The router 322 identifies an IP address and forwards data to the switch 324.

The switch 324 stores a unique MAC address of each of the servers 330-1 to 330-3, determines to which place a packet needs to be transmitted through address, and transmits, to corresponding servers 330-1 to 330-3, a packet provided by the router 322. The switch 324 includes a switch playing a role as an OSI 2 layer, an OSI 3 layer, an OSI 4 layer and/or another layer (e.g., OSI 7 layer). For example, the switch may perform a function for setting up a path. Furthermore, the switch may perform functions, such as load balancing, port forwarding, and QoS. The switch 324 may be called a network switch, a switching hub, or a port switching hub.

The packet mirroring device 300 is connected to the switch 324, and obtains almost all packets provided to the servers 330-1 to 330-3 through the switch 324 by mirroring the packets. Packet mirroring, that is, the duplication or capture of a packet may be performed in the switch 324. According to circumstances, packet mirroring may be performed in the packet mirroring device 300 itself. After duplicating a packet provided to the servers 330-1 to 330-3, the switch 324 may set, as a destination port, a port connected to the packet mirroring device 300, and may provide the duplicated packet to the packet mirroring device 300. In this case, the switch may designate a corresponding port for analysis use, and may provide the packet to the port.

Figure 4:
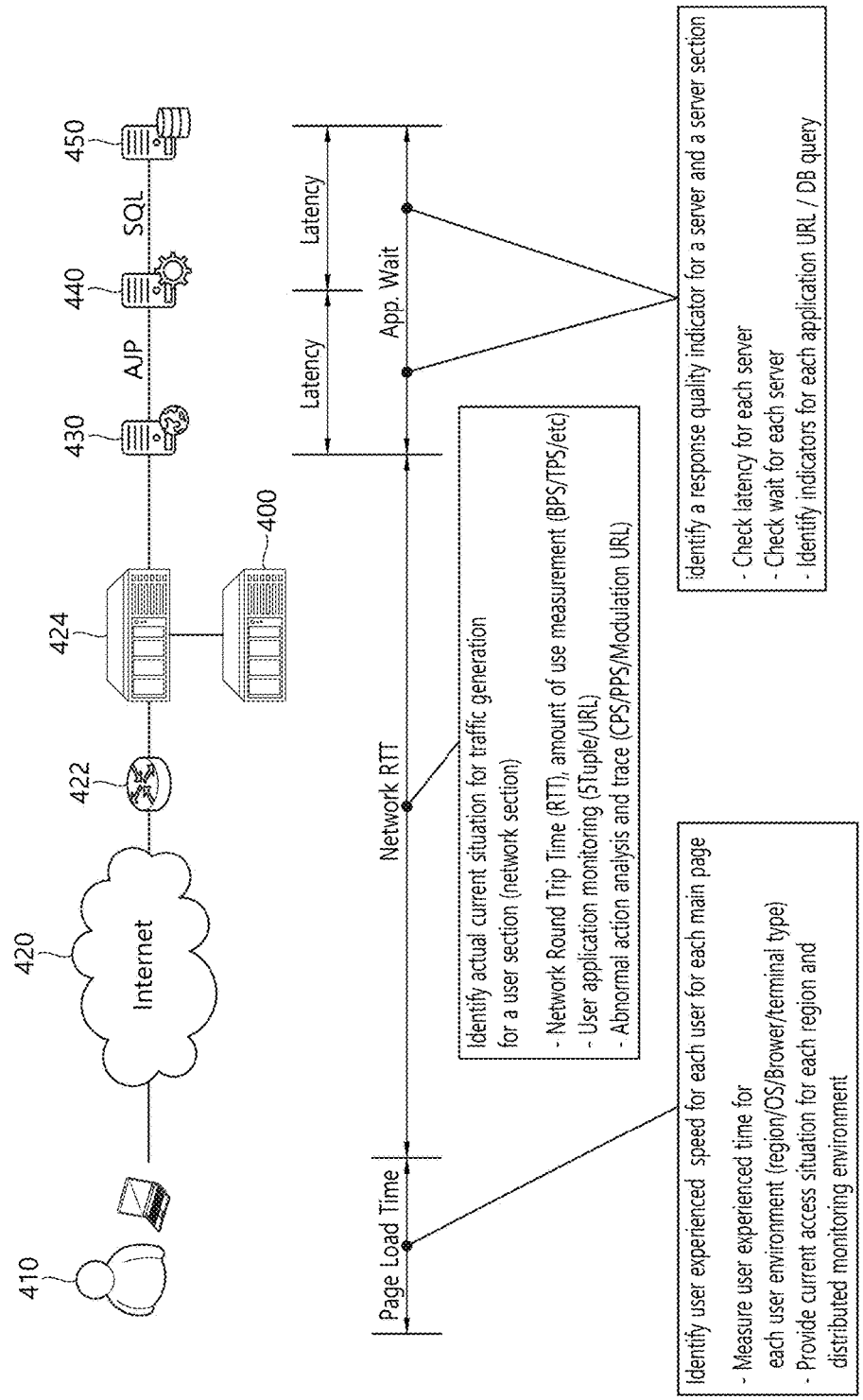
FIG. 4 is a concept view for describing an operation for each section of the packet mirroring device according to an embodiment of the present disclosure.

FIG. 4 is a concept view for describing an operation for each section of the packet mirroring device according to an embodiment of the present disclosure.

Referring to FIG. 4, as described with reference to FIGS. 2 and 3, a client terminal 410 transmits packets to server stages 430, 440, and 450 through the Internet 420. In this case, a router 422 and a switch 424 are present between the Internet 420 and the server 430. A packet mirroring device 400 is connected to the switch 424.

The packet mirroring device 400 may check a user experience delay time in the client terminal 410 by analyzing a mirrored packet. Furthermore, the packet mirroring device 400 may check information associated with traffic up to the first server 430 through the Internet 420, and may also check latency in the server stages 430, 440, and 450. In particular, latency in the server stages 430, 440, and 450 is determined for each section. Latency in the section of the web server 430 and the WAS 440 and the section of the WAS 440 and the DB server 450 is separately calculated and treated. Web latency and app latency may be separately calculated. In this case, the web latency indicates latency taken for a static URL (an image (gif, png, jpg, etc.), css, js, text, etc.) to receive data from the web server 430. The app latency means latency taken for the first packet of a page generated from a dynamic URL or a post URL to be received. The app latency may be associated with dynamic content including a query parameter, dynamic content (page), such as HTML, ASP, JSP, or PHP, and/or a call using a HTTP POST method. That is, the app latency indicates latency associated with a task returned via the WAS server 440 and/or the DB server 450.

First, in the client terminal 410, the experience speed of a user is checked as a page loading time. The experience speed is analyzed and visualized as an experience speed for each user with respect to each major web page. That is, if users accessing a specific web page are multiple, an experience time may be checked for each user environment and/or each area of the multiple users. The user environment may be differently checked for each area, each OS installed in the client terminal, type of a web browser and each type of a terminal. Furthermore, an access situation for each area and distribution monitoring environment may be provided. In this case, the access situation for each area may be divided and provided as a present global area situation that aims at the entire world and a present local area situation that aims at a local area.

An actual traffic occurrence situation for a user section (network section) up to the server 430 may be represented as a network round trip time (RTT). The actual traffic occurrence situation may be called a network time required. In addition, in relation to usage, present situations for bit per second (BPS) information indicative of a data transfer speed per second, user per second (UPS) information indicative of the number of users connected per second, connection per second (CPS) information indicative of the number of new sessions connected per second, and transaction per second (TPS) information indicative of the number of transactions occurring per second may also be checked. Furthermore, a user application may be monitored, and an abnormal action by a user may also be analyzed and tracked. An application that occupies network traffic may be recognized and a correlation between a user, an application and a network may be monitored, through such performance-related indices.

Additionally, the packet mirroring device 400 may also check latency between the servers 430, 440, and 450. That is, the packet mirroring device 400 may check a response quality index for each server section. In this case, the packet mirroring device 400 may check latency for each server, the number of response wait sessions for each server, and an index for each application URI and/or an index for each DB query of a server.

Figure 5:
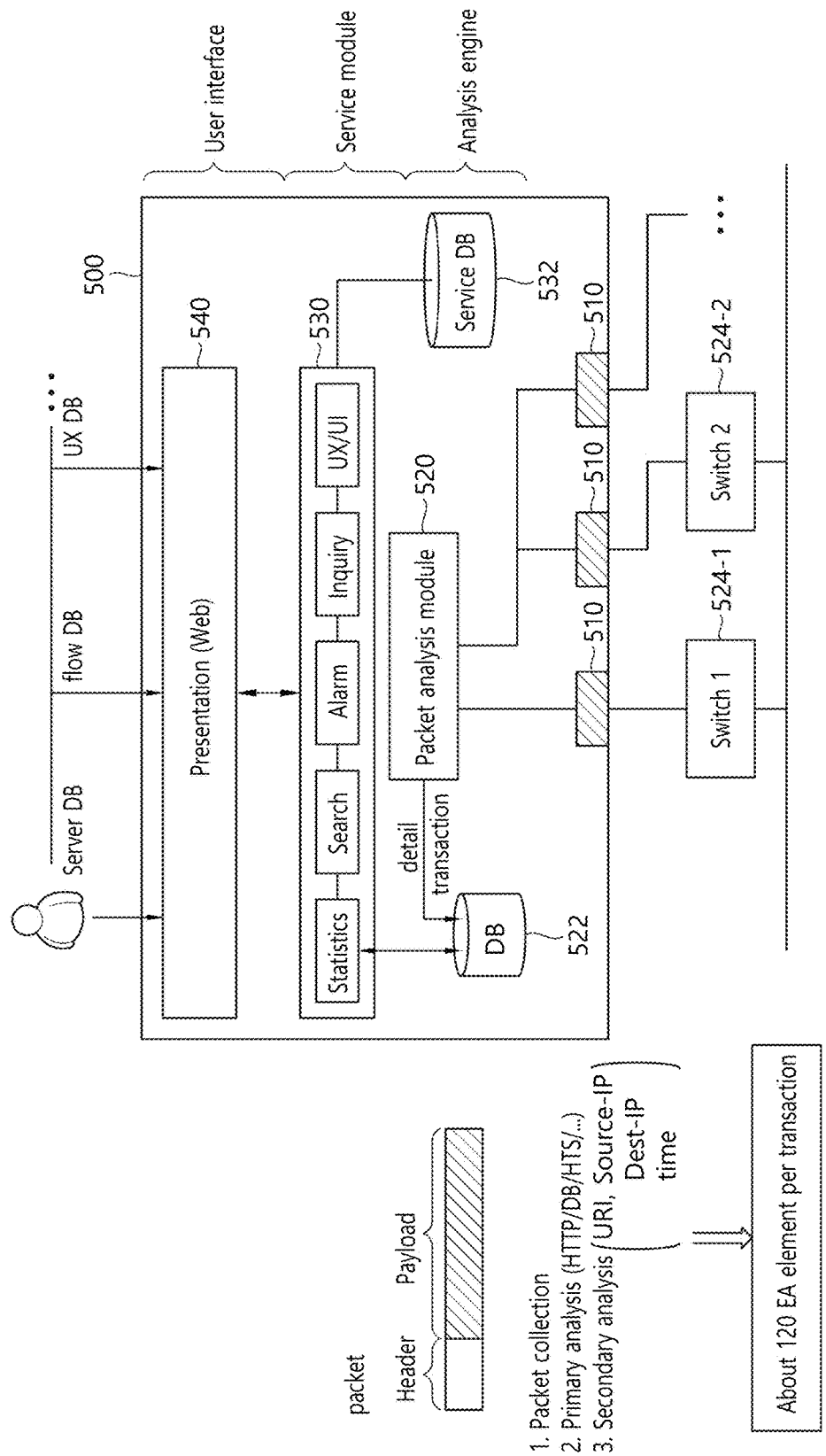
FIG. 5 is a block diagram specifically illustrating a packet mirroring device according to an embodiment of the present disclosure.

FIG. 5 is a block diagram specifically illustrating a packet mirroring device according to an embodiment of the present disclosure. As illustrated in FIG. 5, the packet mirroring device 500 according to an embodiment of the present disclosure may include a port 510, a packet analysis module 520, a service module 530 and a user interface 540. Furthermore, the packet mirroring device 500 may further include a packet analysis database (DB) 522 and a service DB 532.

Referring to FIG. 5, at least one port 510 may be provided, and is connected to switch devices 524-1, 524-2, . . . . One port may be connected to one switch device. The connected ports receive mirrored packet information from the switch devices 524-1, 524-2, . . . and transmit the mirrored packet to the packet analysis module 520.

The packet analysis module 520 collects a mirrored packet and substantially analyzes the packet, and may be called an analysis engine. The packet analysis module 520 primarily analyzes the header of the packet in the mirrored packet, and identifies whether the mirrored packet is a HTTP packet, a packet associated with a DB or a packet associated with a TCP through the analysis. That is, the packet analysis module 520 determines with which protocol the mirrored packet is associated. Accordingly, the packet analysis module 520 may check to which server request information, such as "GET/web address/HTTP/1.1" has been transmitted. The packet analysis module 520 analyzes a sentence structure by parsing such packet header information. "GET" is a request message, and the "web address" indicates a web address associated with the request. Furthermore, "HTTP/1.1" means HTTP 1.1 version. In addition, the packet analysis module 520 may also identify and store language information (e.g., ko-kr) associated with the packet. In a request method, in addition to GET, POST, HEAD, PUT, DELETE, etc. may be transmitted according to circumstances. The packet analysis module 520 stores such information along with time information and a related IP.

The packet analysis module 520 assigns the index of each packet, and identifies what the packet is, whether the packet is a HTTP-based request packet, that is, a corresponding packet, or a response packet thereto based on the assigned index. In this case, the packet analysis module 520 may also perform a comparison and analysis with information obtained from packets in the past. That is, if a request packet obtained from a first entity is present, a response packet thereto from a second entity may be subsequently present. In this case, the establishment of one session and a flow of transactions may be analyzed based on at least two time-series packets and packets transmitted to and received from the first entity and the second entity.

Furthermore, the packet analysis module 520 may parse what browser has been used by a client terminal, information associated with HOST, previous URL address information, and browser support language information. In this case, the packet analysis module 520 may analyze that a header is which type of header (general header, request header or entity header), and may parse information indicating the boundary line of the header and payload.

Thereafter, the packet analysis module 520 secondarily analyzes a uniform resource locator (URL) (or uniform resource identifier (URI)), source IP (Source_ip), destination IP (Dest_ip) and time information of the mirrored packet. In this case, whether a packet corresponds to a packet for redirection to which an address, such as www.google.co.kr, may be checked by identifying a URL value. Furthermore, the source IP may indicate the IP address of a client terminal, and the destination IP may indicate the IP of a server associated with the final destination site of a request. In the case of a response packet, they may indicate opposite information. The time information may be provided in a timestamp form. In addition, length information of the entire packet may be checked.

The packet analysis module 520 includes a packet analysis algorithm corresponding to each protocol, for example, various protocols such as HTTP, IP, UDP, TCP, and DNS, may adaptively extract a URL, a source IP, a destination IP and time information from a packet based on each protocol, and may use them for analysis.

The packet analysis module 520 may generate performance index information of about 120 elements per transaction based on packet-related information extracted through secondary analysis as described above. Preferably, the packet analysis module 520 analyzes 10,000 transactions per second. Thereafter, the packet analysis module 520 stores the extracted packet-related information and the about 120-performance index information generated per transaction in the DB 522. Hereinafter, a performance-related index generated based on packet-related information of a mirrored packet is more specifically described.

The packet analysis module 520 calculates RTT information in a transaction unit. That is, the packet analysis module 520 calculates RTT information of a data signal. An algorithm related to the calculation of the RTT information is more specifically described below with reference to FIG. 7.

Furthermore, the packet analysis module 520 generates session information. The session information may indicate the number of sockets established per second, that is, the number of sockets connected without being disconnected. Furthermore, the packet analysis module 520 calculates latency information taken for a client to receive a response from a specific server after transmitting a request. This may be considered to be latency taken to query a database, perform an application or perform other tasks.

The packet analysis module 520 calculates BPS information indicative of the size of a bit transmitted or received per second, packet per second (PPS) information indicative of information on the number of packets transmitted or received per second, and UPS information indicative of the number of users (based on IP) connected per second. How many users are connected per second may be calculated based on the number of source IPs connected to a specific destination IP. In addition, the packet analysis module 520 calculates CPS information (indicating how many sessions are newly connected per second) indicative of the number of new sessions connected per second, and TPS information (indicating how many transactions occur per second) indicative of the number of transactions occurring per second. Furthermore, the packet analysis module 520 calculates hit per second (HPS) information indicative of the number of URLs requested per second. In this case, the packet analysis module 520 calculates HPS based on how many URLs are requested per second in a corresponding server in the case of a server HPS, and calculates HPS based on how many URLs are requested per second in a corresponding client in the case of a client HPS. Furthermore, the packet analysis module 520 calculates server per second (SPS) information, that is, information on the number of servers connected per second. The SPS information indicates to how many servers a client is connected per second.

In addition, the packet analysis module 520 calculates wait information indicative of the number of response wait sessions. The wait information is the number of sessions in the state in which a client has not received a response after transmitting a request, and indicates that 10 of 100 sessions is in the state in which they have not receive a response, assuming that the number of real-time sessions of a server is 100 and the number of waits is 10 among the 100 sessions.

Moreover, the packet analysis module 520 generates client_ip, server_ip, client_port, and server_port information, which indicate IP information of a client, IP information of a server, port information of the client, and port information of the server, respectively. In this case, the client_ip and server_ip information use a string as a unit (e.g., 222.103.141.187), and the client_port and server_port information use a number as a unit (e.g., 1254 or 80).

The packet analysis module 520 may calculate transaction_number information. The transaction_number information is a transaction number generated after a session is established. In the case of the first transaction after a session is established, the transaction_number information indicates 1. In general, after a session is established, several transactions occur. The transaction_number information is indexed by increasing the number by 1 every time. If one page is viewed through a browser, when components (js, css, image, etc.) within the page are requested, if several transactions are processed through one session, the transaction_number information may be indexed by increasing the number by 1 per transaction, so the transactions may be classified. For example, if the transaction_number information is 8, this indicates that a corresponding transaction is an eighth transaction after a session is established.

In relation to the start and end of a transaction, the packet analysis module 520 generates start_time information, start_usec information, end_time information, end_usec information, fin_time information and fin_usec information. Such information may be obtained by providing a request packet by the same source (client) and destination (e.g., server) during given duration based on source ip, destination ip and time information of a mirrored packet and analyzing a detailed history for whether all data related to the request packet has been received.

The start_time information indicates a transaction start time (year/month/day hour/minute/second: For example, 2012-07-18 22:33:06), and the start_usec information indicates a transaction start time (1 second in a million). The start_usec information may become a completed time by being combined with the start_time (e.g., 2012-07-18 22:33:06.288370).

The end_time information indicates a transaction end time. That is, the end_time information indicates the end of data (time when the last Response Data of a transaction was received). For example, the end_time information may be represented as 2012-07-18 22:33:12.

The end_usec information indicates a transaction end time in one-millionth second unit.

The fin_time information indicates a fully ended time when a next transaction is reached after a transaction is ended or when a transaction is completed (Fin is received) or when the time is out (Timeout). For example, the fin_time information may be represented as 2012-07-18 22:35:23.

The fin_usec information: indicates a transaction-full termination time in one-millionth second unit.

The packet analysis module 520 stores a transaction state as an information name called "state." The information name may be represented as seven numbers and is as follows.

Transaction State Codes
1—session_finish: an initial state
2—3whs_syn_sent: the state in which a client has transmitted syn during three handshakes
3—3whs_syn_received: the state in which a client has receives syn/ack during three handshakes
4—3whs_ack_received: the state in which a server has received ack during three handshakes
5—session_connected: the state in which a session has been established
6—session_request: the state in which a client has made a request
7—session_response: the state in which a server has made a response Next, the packet analysis module 520 stores the results of the transaction as an information name called "result." The information name may be represented as eleven numbers and is as follows.

Transactions Result Codes
1—trans_finish: the state in which one transactions has been finished
2—client_finish: the state in which a client has finished a session (transmits Finish—FIN)
3—server_finish: the state in which a server has finished a session (transmits Finish—FIN)
4—client_reset: the state in which a client has finished a session (transmits Reset—RST)
5—server_reset: the state in which a server has finished a session (transmits Reset—RST)

6—client_timeout: the state in which a session has been finished due to Timeout while a client transmits a request 7—server_timeout: the state in which a session has been finished due to Timeout while a server transmits a response 9—session_error: HTTP session error 10—req_parser error: HTTP Request Header error 11—rsp_parser_error: HTTP Response Header error Next, the packet analysis module 520 calculates time information related to response delay of a transaction. The time information includes tran_latency, tran_rsp_time, used_ time, and fin_used_time information.

The tran_latency information indicates transaction latency, and indicates latency taken for a client to receive the first data from a server after transmitting a request. The tran_latency information uses a millionth of a second as a unit. For example, the tran_latency information may have a 76328 value. tran_rsp_time is a transaction response time, and indicates the transmission time of response data. That is, tran_rsp_time indicates the time when a server transmits response data, and also uses a millionth of a second as a unit. used_time information is the entire use time of a transaction, and may be calculated as "End Time–Start Time." used time information indicates the time taken for a session to be established between a client and a server and for both a request from the client and a response from the server to be finished. The fin used time information is a use time until the full termination of a transaction, and is calculated as "Fin Time–Start Time."

The packet analysis module 520 calculates session_req_pkts, session_req_bytes, session_rsp_pkts, session_rsp_bytes, session_bps, sess_max_bps, session_pps, sess_max_pps information.

The session_req_pkts information indicates the number of transaction request data packets, and is calculated based on the number of packets transmitted by a specific client as request data. The session_req_pkts information uses a number as a unit. The session_req_bytes information indicates bytes of request data of a transaction, is calculated based on the amount of bytes transmitted by a specific client as request data, and uses a byte as a unit. The session_rsp_pkts information indicates the number of transaction response packets, is calculated based on the number of packets of response data transmitted from a specific server to a client, and uses a number as a unit. The session_rsp_bytes information indicates bytes of response data of a transaction, is calculated based on the amount of bytes transmitted by a specific server as response data, and uses a byte as a unit. The session_bps information indicates a real-time BPS of a session, is calculated based on a BPS of a currently established session, and uses a number as a unit. The session_pps information indicates a real-time PPS of a session, is calculated based on a PPS of a currently established session, and uses a number as a unit. The sess_max_pps information indicates a maximum PPS of a session, is calculated based on a maximum PPS for a period in which a corresponding session will be used, and uses a number as a unit.

Next, the packet analysis module 520 generates domain, url, method, and response_code_number information.

The domain information indicates information associated with a domain in a Url requested by a client, and uses a string as a unit. For example, the domain information indicates information such as www.lgmobile.co.kr.

The url information is a Url requested by a client, indicates information such as "/jsp/front/search/include/akc.jsp", and has a string as a unit.

The method information is the type of request method (POST, GET, HEAD, PUT . . . ), indicates the type of request method requested by a client, and has a string as a unit.

The response_code_number information is a response result and is indicated as a HTTP state code. For example, the response_code_number information is a Response Status Code requested by a server, may be represented as one value of "200, 304, 404, 500 . . . ", and has a string as a unit.

The packet analysis module 520 calculates users, max_users, sessions, max_sessions, wait, max_wait, ups, max_ups, cps, max_cps, tps, max_tps, latency, max_latency, and idle information in relation to a specific url.

The users information indicates the number of real-time users (based on a client IP) of a corresponding Url, may indicate "the number of real-time users of /jsp/front/search/include/akc.jsp", for example, and has a number as a unit.

The max_users information is a maximum number of users of a corresponding Url during the time when a Url is used, indicates "a maximum number of users of /jsp/front/search/include/akc.jsp", for example, and has a number as a unit.

The sessions information indicates the number of real-time sessions of a corresponding Url, may indicate "the number of real-time sessions of /jsp/front/search/include/akc.jsp", for example, and has a number as a unit.

The max_sessions information indicates a maximum number of sessions of a corresponding Url during the time when a Url is used, may indicate "a maximum number of sessions of /jsp/front/search/include/akc.jsp", for example, and has a number as a unit.

The wait information is the number of real-time waits of a corresponding Url, may indicate "the number of real-time response wait sessions of jsp/front/search/include/akc.jsp", for example, and has a number as a unit.

The max_wait information is a maximum number of response wait sessions of a corresponding Url during the time when a Url is used, may indicate "a maximum number of response wait sessions of /jsp/front/search/include/akc.jsp" for example, and has a number as a unit.

The ups information indicates a real-time UPS of a corresponding Url, and may indicate "a real-time UPS of /jsp/front/search/include/akc.jsp", for example. The ups information means "the number of users connected to /jsp/front/search/include/akc.jsp per second", and has a number as a unit.

The max_ups information indicates Max UPS of a corresponding Url, may indicate a "maximum UPS of /jsp/front/search/include/akc.jsp", for example, and has a number as a unit.

The cps information indicates a real-time CPS of a corresponding Url, and may indicate "a real-time CPS of /jsp/front/search/include/akc.jsp", for example. The cps information means "the number of sessions connected to /jsp/front/search/include/akc.jsp per second", and has a number as a unit.

The max_cps information indicates Max CPS of a corresponding Url, may indicate a "maximum CPS of /jsp/front/search/include/akc.jsp", for example, and has a number as a unit.

The tps information indicates a real-time TPS of a corresponding Url, and may indicate "a real-time TPS of /jsp/front/search/include/akc.jsp", for example. The tps information means "the number of transactions occurred in /jsp/front/search/include/akc.jsp per second", and has a number as a unit.

The max_tps information indicates Max TPS of a corresponding Url, may indicate a "maximum TPS of /jsp/front/search/include/akc.jsp", for example, and has a number as a unit.

The latency information is latency of a corresponding Url, may indicate "real-time latency of jsp/front/search/include/akc.jsp", for example, and has a number as a unit.

The max_latency information indicates Max latency of a corresponding Url, may indicate "maximum latency of /jsp/front/search/include/akc.jsp", for example, and has a number as a unit.

The idle information indicates the idle of a corresponding Url, and may indicate "the time when there is not request for /jsp/front/search/include/akc.jsp", for example. Idle becomes short if a corresponding Url is a URL that is used a lot, and Idle becomes long if a corresponding Url is a URL that is not used a lot. The idle information has a number as a unit.

The packet analysis module 520 may generate content_len, mime, referrers, agent, and cookie information by analyzing the headers of a request packet of a client and a response packet from a server.

The content_len information indicates the content length of a response header, and indicates the length of content included in a response HTTP header transmitted by a server. For example, the content_len information may mean "bytes of /jsp/front/search/include/akc.jsp", and has a string as a unit.

The mime information indicates a response header content type, and may be one of text, html, etc., for example. The mime information is content type information included in a response HTTP header transmitted by a server, and has a string as a unit.

The referrers information indicates the referrer of a request header, and indicates a referrer included in a request HTTP header transmitted by a client. For example, the referrers information may be considered as a meaning, such as "a referrer of /jsp/front/search/include/akc.jsp is http://www.lgmobile.co.kr/jsp/front/search/include/miniAkc.html", and has a string as a unit.

The agent information indicates the agent of a request header, and indicates an agent included in a request HTTP header transmitted by a client. The information is commonly included and transmitted in a browser, and may include information, such as an OS version, a browser type, and a version.

The cookie information indicates cookies of a request header, and contains information associated with cookies included in a request HTTP header transmitted by a client.

The packet analysis module 520 may generate server_countrys, server_max_countrys, server_error, server_user, server_max_user, server_sessions, server_max_sessions, server_bps, server_max_bps, server_pps, server_max_pps, server_rtt, server_max_rtt, server_ups, server_max_ups, server_cps, server_max_cps, server_tps, server_max_tps, server_hps, server_max_hps, server_wait, server_max_wait, and server_idle information, as information related to a network service of a specific server.

The server_countrys information indicates the number of real-time countries of a corresponding server, and may mean "the number of real-time countries of users connected to 203.247.157.199 server", for example. The fact that two countries are connected to the 203.247.157.199 server can be analyzed.

The server_max_country s information indicates a maximum number of countries of a corresponding server. That is, in the case of a registered server, a Max criterion may indicate a day, and may be changed according to user setting matters. For example, the server_max_countrys information may mean "a maximum number of countries connected to a 203.247.157.199 server." Accordingly, the fact that a maximum of 10 countries had been simultaneously connected to the 203.247.157.199 server can be analyzed.

The server_error information indicates the number of real-time errors (400, 500 response codes) of a corresponding server. For example, the server_error information may indicate the number of user errors and/or server errors up to 400~599 in a Response Status Code responded by a 203.247.157.199 server.

The server_user information indicates the number of real-time users (based on a client IP) of a corresponding server, and may mean "the number of real-time users of a 203.247.157.199 server", for example.

The server_max_user information indicates a maximum number of users of a corresponding server. In this case, in the case of a registered server, a criterion for Max may be a day. The server max_user information may be changed according to user setting matters, and may indicate "a maximum number of users of a 203.247.157.199 server", for example.

The server sessions information indicates the number of real-time sessions of a corresponding server. The server_max sessions information indicates a maximum number of sessions of a corresponding server. The server_bps information indicates a real-time BPS of a corresponding server. The server_max_bps information indicates Max BPS of a corresponding server. The server_pps information indicates a real-time PPS of a corresponding server. The server_max_pps information indicates Max PPS of a corresponding server.

The server_rtt information indicates a real-time RTT of a corresponding server. The server_max_rtt information indicates Max RTT of a corresponding server, and may be solved as "maximum average RTT of a 203.247.157.199 server", for example. A unit for the server rtt information and the server max rtt information is a micro sec.

The server_ups information indicates a real-time UPS of a corresponding server, and may indicate "real-time UPS of a 203.247.157.199 server." This means that about one user per second is connected to the 203.247.157.199 server.

The server_max_ups information indicates Max UPS of a corresponding server.

The server_cps information indicates a real-time CPS of a corresponding server, and may indicate "real-time CPS of a 203.247.157.199 server", for example. This means that about 15 sessions are connected to the 203.247.157.199 server per second.

The server_max_cps information indicates Max CPS of a corresponding server.

The server_tps information indicates a real-time TPS of a corresponding server, and may indicate "real-time TPS of a 203.247.157.199 server", for example. This indicates that about 79 transactions occur in the 203.247.157.199 server per second.

The server_max_tps information indicates Max TPS of a corresponding server.

The server_hps information indicates a real-time HPS of a corresponding server, and may indicate "real-time HPS of a 203.247.157.199 server", for example. This means that about 79 Urls are requested from the 203.247.157.199 server.

The server_max_hps information indicates Max HPS of a corresponding server.

The server_wait information indicates the number of waits of a corresponding server, and may indicate "the number of real-time waits of a 203.247.157.199 server", for example. This may indicate that 46 of 206 sessions are now waiting for a response in the 203.247.157.199 server.

The server_max_wait information indicates a Max Wait number of a corresponding server.

The server_idle information indicates an Idle time of a corresponding server, and may indicate "a time during which a request from a 203.247.157.199 server was not present", for example. Idle becomes long when the number of access users to a corresponding server is many, and becomes short when the number of access users to a corresponding server is small. The server idle information has a micro sec as a unit.

According to an embodiment of the present disclosure, a unit for the server_countrys, server_max_countrys, server_error, server_user, server_max_user, server_sessions, server_max sessions, server_bps, server_max_bps, server_pps, server_max_pps, server_ups, server_max_ups, server_cps, server_max_cps, server_tps, server_max_tps, server_hps, server_max_hps, server_wait, and server_max_wait information is a number.

The packet analysis module 520 may generate client_country_code, client_error, client_servers, client_max_servers, client_sessions, client_max_sessions, client_bps, client_ max_bps, client_pps, client_max_pps, client_rtt, client_ max_rtt, client_sps, client_max_sps, client_cps, client_max_cps, client_tps, client_max_tps, client_hps, client_max_hps, client_wait, client_max_wait and client_idle information, as information related to a network service of a specific client.

The client_country_code information indicates a country code (KR ..) of a client, and may indicate "the country of a 222.103.141.187 client is KR", for example.

The client_error information indicates the number of real-time errors of a client, and may indicate "the number of errors up to 400~599 in a Response Status Code among transactions requested by a 222.103.141.187 client", for example.

The client_servers information indicates the number of real-time server accesses of a client, and is calculated based on a server now monitored by the packet analysis module 520. For example, the client_servers information may indicate "the number of servers now being accessed by a 222.103.141.187 client." The client_max_servers information indicates a maximum number of simultaneous servers of a client. The client_sessions information indicates the number of real-time sessions of a client. The client_ max_sessions information indicates a maximum number of sessions of a client.

The client_bps information indicates a real-time BPS of a client. The client_max_bps indicates a maximum BPS of a client. The client_pps information indicates a real-time PPS of a client. The client_max_pps information indicates a maximum PPS of a client.

The client_rtt information indicates a real-time RTT of a client. The client_max_rtt information indicates a maximum RTT of a client. A unit for the client rtt information and the client_max_rtt information is a micro sec.

The client_sps information indicates a real-time SPS of a client, and indicates to how many servers the client is now connected per second. The client_max_sps information indicates a maximum SPS of a client. The client_cps information indicates a real-time CPS of a client, and indicates how many sessions are connected per second. The client_max_cps information indicates a maximum CPS of a client.

The client_tps information indicates a real-time TPS of a client, and indicates how many transactions now occur per second. The client_max_tps information indicates a maximum TPS of a client. The client_hps information indicates a real-time HPS of a client. The client_max_hps information indicates a maximum HPS of a client.

The client_wait information indicates the number of real-time waits of a client, and indicates the number of sessions now waiting for a response in a specific client. The client_ max_wait information indicates a maximum number of waits of a client. The client_idle information indicates a real-time Idle Time of a client, and indicates the time during which a request was not present in a specific client. A unit for the client_idle information is a micro sec.

According to an embodiment of the present disclosure, a unit for the client_country_code, client_error, client servers, client_max_servers, client_sessions, client_max_sessions, client_bps, client_max_bps, client_pps, client_max_pps, client_sps, client_max_sps, client_cps, client_max_cps, client_tps, client_max_tps, client_hps, client_max_hps, client_wait, and client_max_wait information is a number.

Additionally the packet analysis module 520 may generate org, city_id, isp_id, os_id, browser_id, mobile_id, telcom_id information.

The org information indicates an IP-based organization of a client, and may indicate "an organization of a 222.103.141.187 Client" is Korea Telecom, for example.

The city_id information may indicate an IP-based City Code of a client, and may indicate "a City of a 222.103.141.187 Client" is Seoul, for example.

The isp_id information indicates an IP-based ISP Code of a client, and may indicate "ISP of a 222.103.141.187 Client" is Korea Telecom, for example.

The os_id information indicates an OS Code of a client. Information on whether a corresponding client uses Win XP, iOS or Android as an OS may be identified based on the os_id information.

The browser_id indicates a Browser Code of a client. Information on whether a corresponding client uses Explorer, Chrome or MSIE9 as a web browser may be identified based on the browser_id.

The mobile_id information indicates a Mobile Code of a client, is device identification information of a client, and indicates information on whether a device is Samsung, Pantech or Apple device.

The telcom_id information indicates a TelCom Code of a client, and indicates information on whether a communication company of a client is SKT, KT, or LGT.

The network service performance-related indices associated with the 120 packets are generated in real time and stored in the DB 522.

The service module 530 generates statistics based on the performance-related indices stored in the DB 522. The statistics may be performed in a specific server unit, in a specific user unit, in a URL unit, in a session unit, as a server group located in a specific area, in a client group unit located in a specific area and/or in a webpage unit. The service module 530 may properly visualize the performance-related indices by using various preset forms of visualization tools so that a user can intuitively check performance of service according to a current network. The visualization is performed based on the statistics. That is, a graph or table of a meaningful form may be generated by collecting indices associated with a specific parameter. For example, a task of generating a list of sessions generated in a specific time zone in association with a specific client or server or generating a table of a database query generated at that time is performed. That is, the performance-related indices associated with a network service are stored along with time information (timestamp information) of a corresponding packet, and thus a flow map may be generated so that a packet flow in a specific time zone can be understood in a relation between a client terminal and a server stage. Various statistics and a corresponding visualization method are more specifically described with reference to the following drawings.

In order to generate a specific graph or a specific table/list in accordance with an input from a user, the service module 530 may perform search and query based on a criteria variable, such as a desired time or a desired environment (e.g., a specific web browser type or a specific user terminal type (mobile or PC)). The service module 530 may generate a proper form of visualization information by classifying a desired data based on the selected criteria variable.

According to an embodiment of the present disclosure, the service module 530 may perform an alarm function for finding and displaying a portion that becomes problematic in a network service. For example, if the number of waits is a threshold or more, the service module 530 may determine that there is a problem in the response speed of a corresponding section, and may visually display that there is a problem in the corresponding section. In addition to differently representing alert means according to problem occurrence visually, the alert means may be implemented in a form in which a text message is transmitted to a previously stored contact address of a related person in charge or e-mail is transmitted. This is more specifically described with reference to FIG. 12.

The various statistical data, visualization information data, and information related to the visualization tool generated in the service module 530 and various threshold information set by a user may be stored in the service DB 532. When a user requests given processed information through the user interface 540, corresponding information may be returned.

The user interface 540 includes a device for receiving various inputs from an operator and outputting visualized information, such as a graph or table generated in the service module 530. The device may include input means, such as a mouse, a keyboard, and a touch pad, and output means, such as a monitor and a touch screen. A user may input UX/UI database information, including a database associated with information (e.g., a server name, a server IP, an associated URL, a port, a sort number, location information of a server, an IP area that may be processed, etc.) on a server, a flow database associated with a connection relation (link) with various server stages, and a visualization tool for output to a user and/or metadata associated with visualization. Furthermore, a user may input a rule set for determining the occurrence of a problem and various setting values associated with the rule set.

Figure 6:
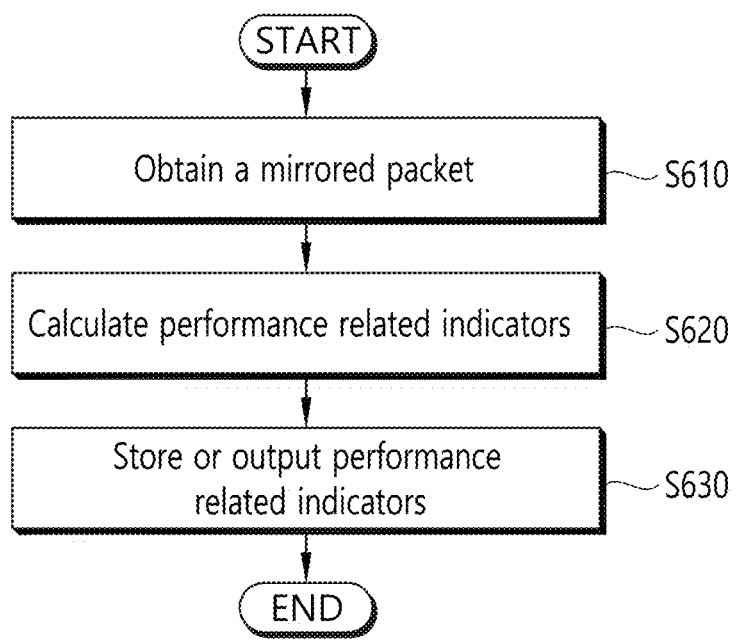
FIG. 6 is a flowchart schematically illustrating a network performance diagnosis method of the packet mirroring device according to an embodiment of the present disclosure.

FIG. 6 is a flowchart schematically illustrating a network performance diagnosis method of the packet mirroring device according to an embodiment of the present disclosure.

Referring to FIG. 6, the packet mirroring device obtains a mirrored packet from the switching device (S610).

Thereafter, the packet mirroring device extracts a source IP, a destination IP and time information from the mirrored packet and then calculates various performance-related indices (S620). Some of the performance-related indices may be calculated in a transaction unit, and a specific performance-related index may be calculated in a second unit.

Thereafter, the packet mirroring device may store the calculated performance-related indices in a local storage and/or an external database (S630). Furthermore, in order for a user of the client terminal and/or a network manager to visualize desired statistical information based on the calculated performance-related indices, the packet mirroring device may generate statistics for the indices and may return the results of search and query for desired information. Furthermore, in the case of a specific value or more in association with a service, the packet mirroring device may determine a problem in a network and may indicate the problem for each section or each web site.

Figure 7A:
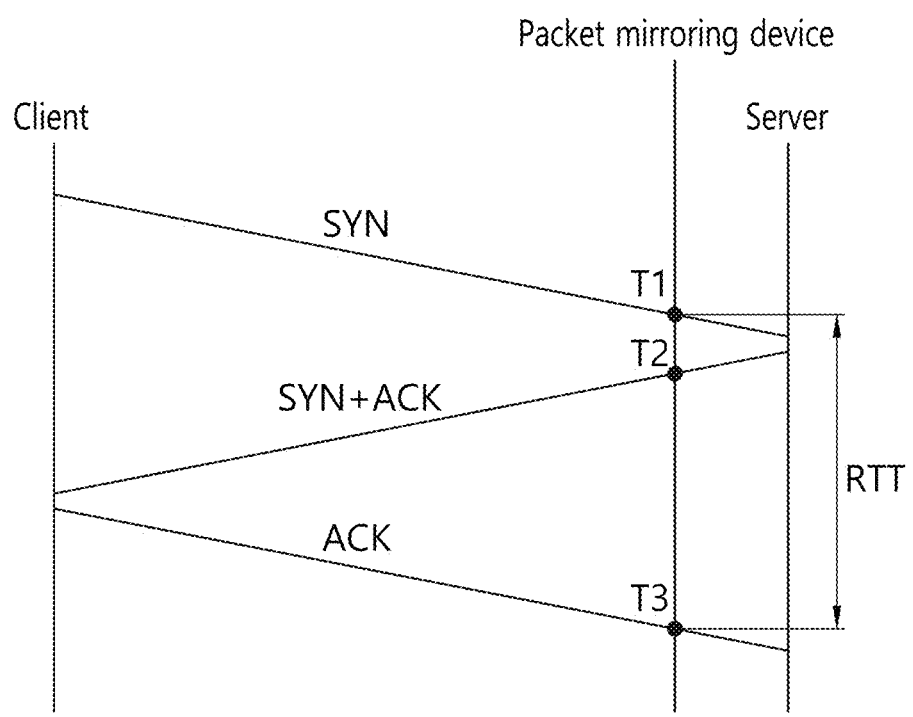
FIGS. 7a and 7b are concept views illustrating a network round trip time (RTT) index between a user and a server, which is calculated in the packet mirroring device according to an embodiment of the present disclosure.
Figure 7B:
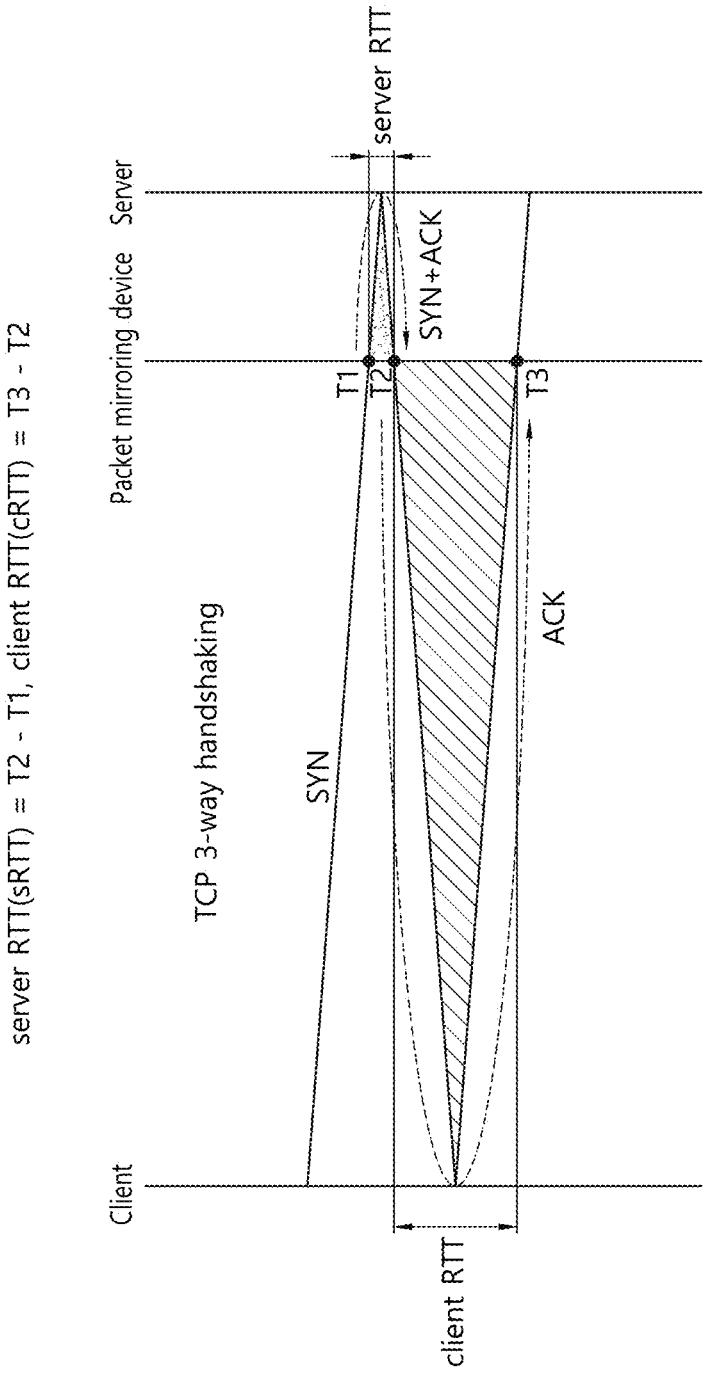

FIGS. 7a and 7b are concept views illustrating a network round trip time (RTT) index between a user and a server, which is calculated in the packet mirroring device according to an embodiment of the present disclosure.

Referring to FIG. 7a, the packet mirroring device calculates RTT information of a packet in a network between a user and a server. In this case, the packet mirroring device assumes that it is located between the client and the server. Assuming a basic synchronization scenario, first, the client transmits a synchronization signal SYN. The server receives the synchronization signal SYN, and transmits a synchronization signal and an acknowledgement signal ACK together in response to the received synchronization signal. The client may transmit an acknowledgement signal ACK in response to the signal from the server. The transmission and reception of these three signals may be called a 3-way handshake.

In such a signal transmission scenario, the packet mirroring device is located between the client and the server, and thus a mirrored packet arrives at the packet mirroring device at timing T1 earlier than the time when the synchronization signal SYN actually arrives at the server after starting from the client. Furthermore, the synchronization signal and the acknowledgement signal from the server arrive at the packet mirroring device at timing T2 earlier than the arrival time for the client. Finally, the acknowledgement signal ACK in the client arrives at the packet mirroring device at timing T3 earlier than the arrival time for the server.

In such a relation, the packet mirroring device can secure the timing information T1 to T3 in relation to the transmission and reception timing of the three packets, and may calculate an RTT value, shifted at earlier timing by a given time from the arrival time for the server by using "T3-T1." This may be called a network RTT.

Referring to FIG. 7b, the network RTT may be subdivided and calculated as an RTT in the server and an RTT in the client. The RTT (sRTT) in the server may indicate a latency time in the server stage with respect to one packet, and may be calculated using "T2-T1."

Furthermore, the RTT (cRTT) in the client is an RTT in the client, and may be calculated using "T3-T2."

The packet mirroring device according to an embodiment of the present disclosure calculates and stores the three RTTs; a network RTT, a server RTT and/or a client RTT in real time for each transaction.

Figure 8:
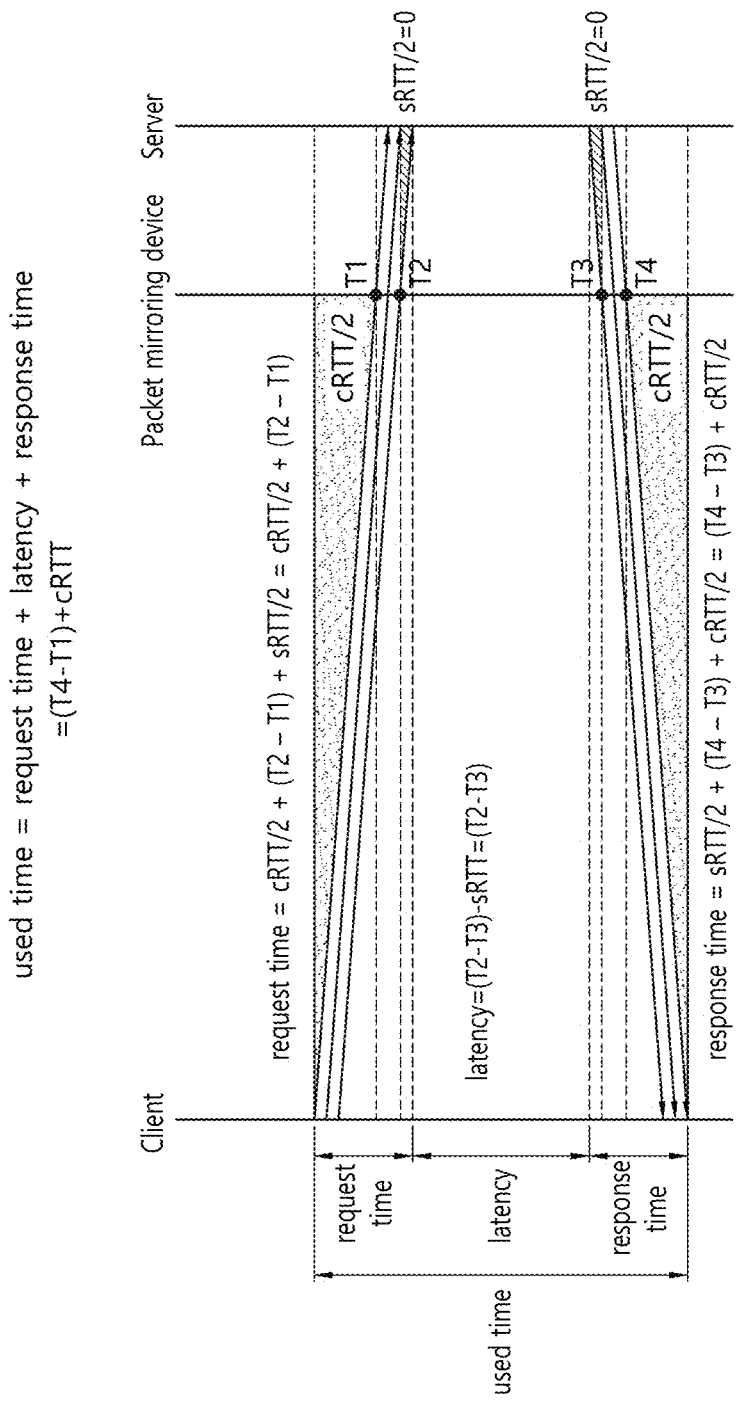
FIG. 8 is a concept view illustrating a delay index calculated in the packet mirroring device according to an embodiment of the present disclosure.

FIG. 8 is a concept view illustrating a delay index calculated in the packet mirroring device according to an embodiment of the present disclosure.

Referring to FIG. 8, the packet mirroring device may calculate various delay indices. In this case, an embodiment in which the packet mirroring device is present between a client and a server, the client transmits a plurality of request packets to the server, and the server transmits a plurality of response packets to the client in response to the plurality of requests is assumed.

The packet mirroring device may obtain, based on arrival timing of a mirrored packet, timing T1 at which the first client request packet arrives at the packet mirroring device, timing T2 at which the last client request packet arrives at the packet mirroring device, timing T3 at which a first response packet is reached from the server, and timing T4 at which the last response packet is reached from the server.

In this case, request time (request time) information among delay indices indicates a time from the time when the client transmits a plurality of requests to the server to the time when a corresponding request arrives as the server. In relation to this, the packet mirroring device may be aware of the time when the first request packet starts from the client based on the timing T1 through a value obtained by dividing a cRTT by half. Furthermore, the packet mirroring device may be aware of the time the last request packet actually arrives at the server based on a value obtained by dividing an sRTT by half. Through such arithmetic analysis, "request time=cRTT/2+(T2−T1)+sRTT/2" may be calculated. In general, the sRTT value is a very small value, and thus is calculated as a value very similar to an cRTT/2+(T2−T1) value.

Next, latency indicates latency until the server receives content or data, associated with a request, from a URL associated with the request of a client. That is, assuming that the server performs transmission to the client as soon as the server receives data, latency indicates the time until the server receives the first data related to a request from the corresponding URL. This is calculated as a value obtained by subtracting an sRTT value from (T2−T3). In this case, "T2−T3" may be latency because the sRTT value may be a very small value to the extent that it may be neglected.

Next, a response time indicates the time taken for the server to transmit content related to a request to the client. This is calculated using an equation "response time=sRTT/2+(T4−T3)+cRTT/2." Considering that the sRTT is a very small value, the response time is almost identical with a (T4−T3)+cRTT/2 value.

If a used time until the entire response data related to a request is received after the client transmits the request is calculated, the user time is calculated using "used time=(T4−T1)+cRTT" because the used time is the sum of the request time, the latency and the response time.

Figure 9:
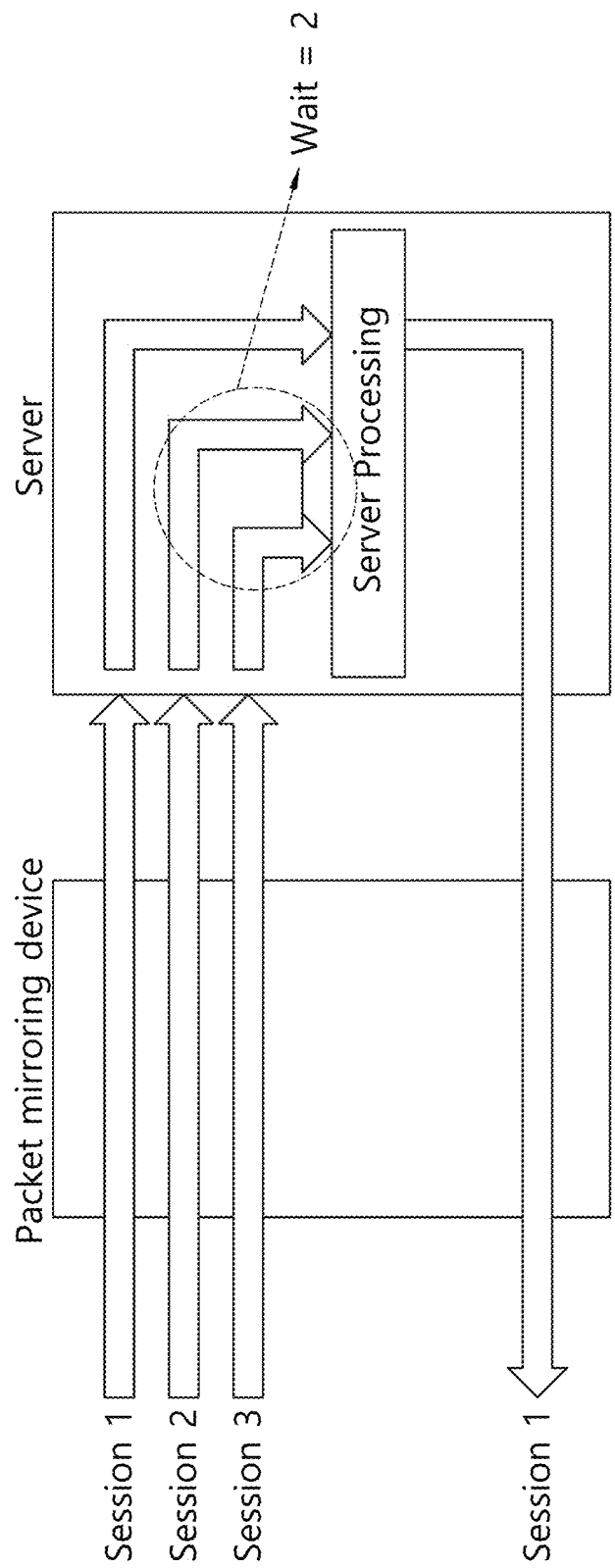
FIG. 9 is a concept view illustrating a server response wait session number index calculated in the packet mirroring device according to an embodiment of the present disclosure.

FIG. 9 is a concept view illustrating a server response wait session number index calculated in the packet mirroring device according to an embodiment of the present disclosure.

Referring to FIG. 9, the server processes at least one request from a plurality of clients, and thus one server processes a plurality of sessions in relation to the request. In this case, if the processing time in the server is increased, latency in the client is also increased. This requires patience for a user of a client device. Accordingly, response wait session number information in the server has a very important meaning.

The number of response wait sessions is calculated as the number of remaining sessions obtained by subtracting a session in which response data is actually transmitted to the client through processing in the serve from a plurality of sessions associated with a request. For example, if only a response to one of three sessions is made, the number of response wait sessions is calculated as wait=3−1=2. That is, the packet mirroring device is present between the client and the server, and can secure all mirroring packets for an actual packet transmitted and received between the client and the server. Accordingly, the number of response wait sessions now being processed within the server can be clearly checked.

According to an embodiment of the present disclosure, whether processing for a specific request in the server has been completed may be checked based on whether a response to the request packet for a specific URL has been transmitted to the client based on a source ip and a destination ip. The response packet is associated with the specific URL shown in the request packet, and may be checked by checking whether the destination ip and the source ip are included in a manner opposite to the request packet.

Figure 10:
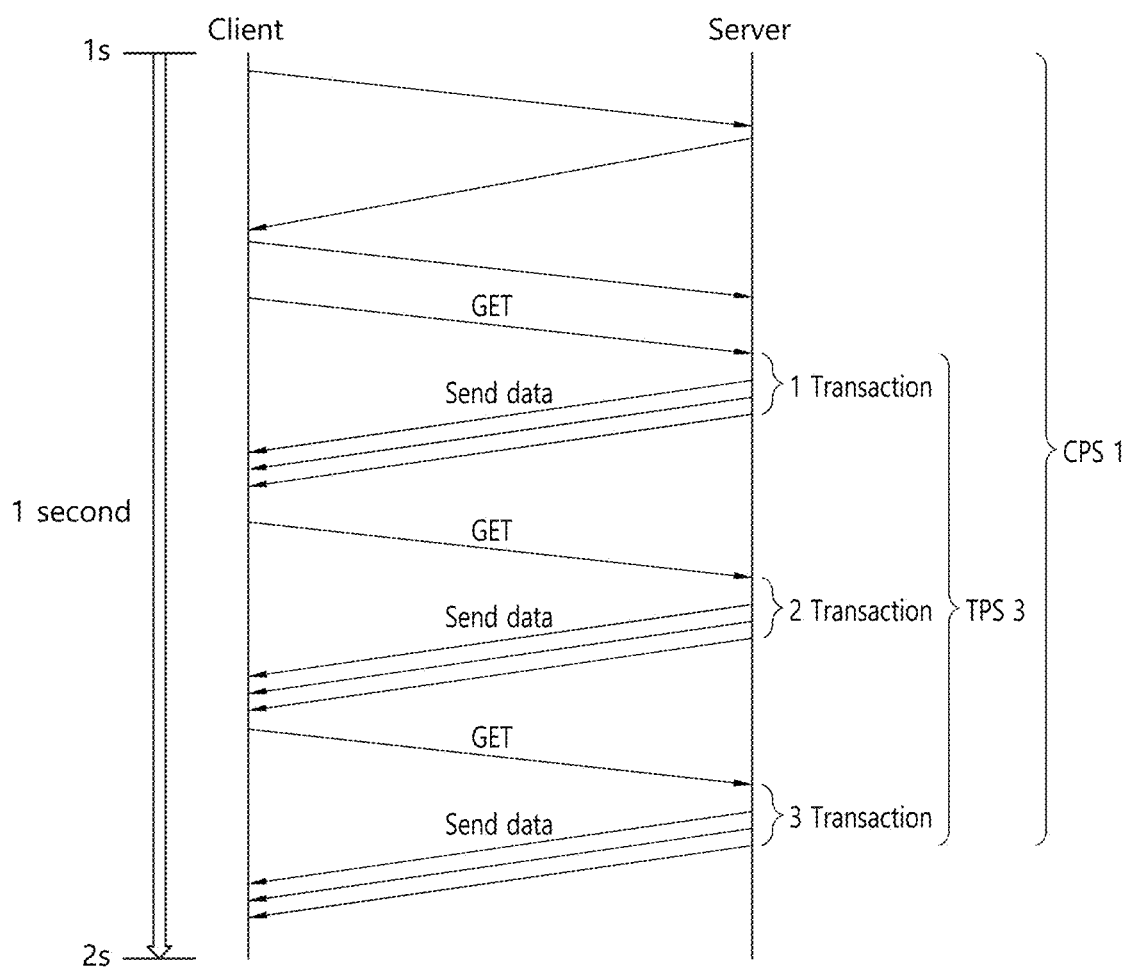
FIG. 10 is a concept view illustrating a connection per second/transaction per second (CPS/TPS) index calculated in the packet mirroring device according to an embodiment of the present disclosure.

FIG. 10 is a concept view illustrating a connection per second/transaction per second (CPS/TPS) index calculated in the packet mirroring device according to an embodiment of the present disclosure.

Referring to FIG. 10, one transaction includes at least one request between a client and a server and at least one response data packet according to the at least one request. In the embodiment of FIG. 10, three response data packets form one transaction with respect to one GET request. They do not need to essentially have a relation of 1:3, but may have a relation in which request packets are greater and a response data packet corresponding to a corresponding request packet is smaller.

Such a transaction also has an important meaning in association with the speed and latency of a network service. The packet mirroring device calculates the number of transactions newly attempted per second, which is called a TPS. Furthermore, the number of connections between a specific client and a specific server, which may be called a connection. The packet mirroring device calculates the number of connections newly attempted per second, which is called a CPS.

In addition, the packet mirroring device periodically calculates user per second (UPS) information indicative of the number of users connected per second and BPS information indicative of the amount of data transmitted and received per second through a specific client, a specific server or a specific session. The packet mirroring device also periodically calculates PPS information indicative of the number of packets transmitted and received per second, HPS information indicative of the number of URLs requested per second, and SPS information indicative of the number of servers connected per second.

In the embodiments of FIGS. 7a to 10, the embodiment in which the packet mirroring device is present between the client and the server and calculates various indices associated with network latency between the client and the server has been described. The packet mirroring device may be present between a plurality of servers of a server stage, and may calculate latency between the servers. For example, the packet mirroring device may be present between the web server and the WAS server and may calculate a delay index between the web server and the WAS server, and may be between the WAS server and the DB server and may calculate a delay index between the WAS server and the DB server. Furthermore, the packet mirroring device may be disposed within a server stage in which a plurality of packet mirroring devices includes a plurality of servers, may calculate a delay index for each section, and may collectively display the delay index for each section within the entire server network and for each server by sharing the calculated delay index.

According to another embodiment of the present disclosure, one packet mirroring device may be connected to a switch between the client and the web server, a switch between the web server and the WAS server, and a switch between the WAS server and the DB server, and may calculate a delay index for each section in a plurality of server sections and/or for each server.

Figure 11:
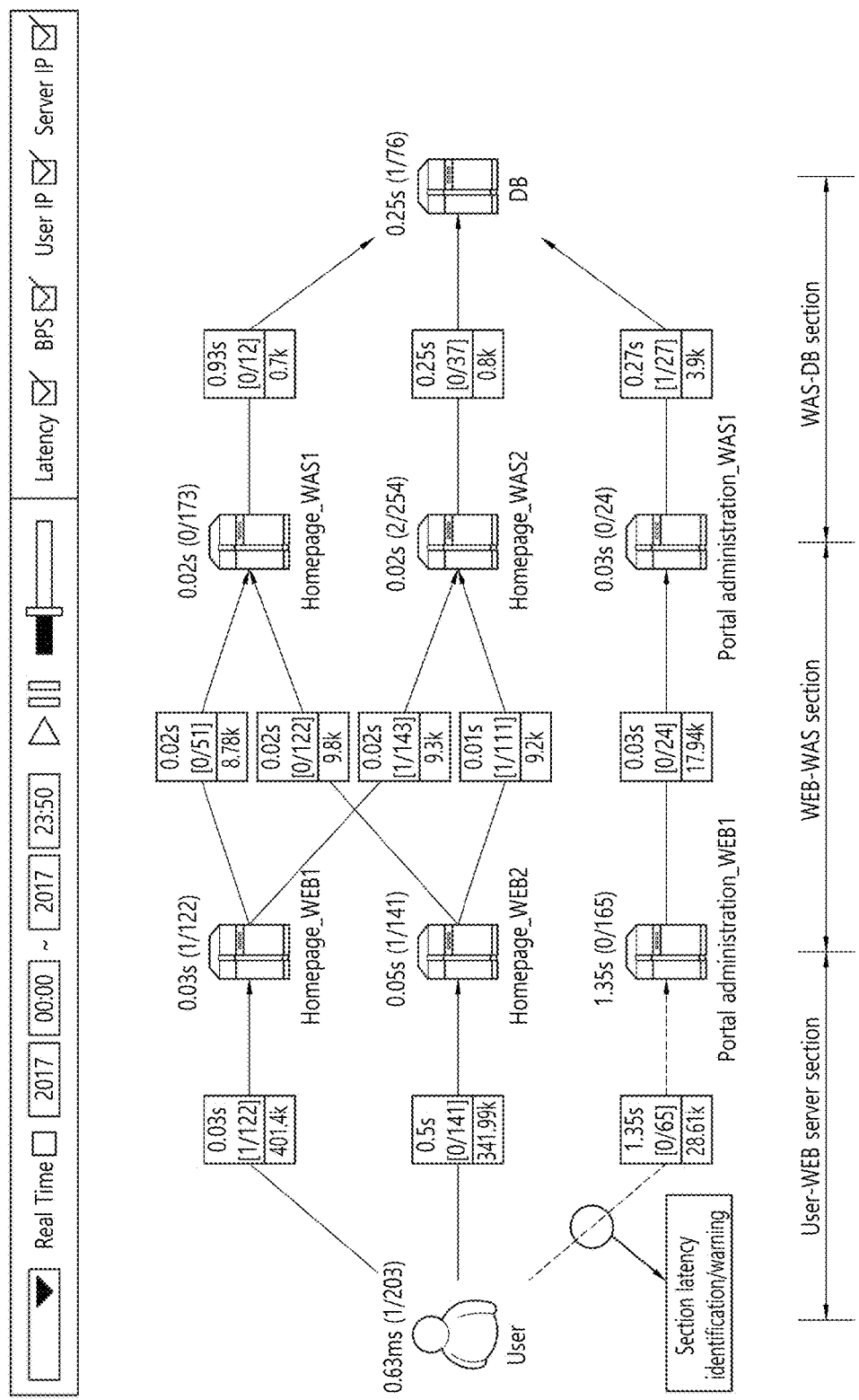
FIG. 11 is a diagram illustrating a flow map generated based on a performance index calculated in the packet mirroring device according to an embodiment of the present disclosure.

FIG. 11 is a diagram illustrating a flow map generated based on a performance index calculated in the packet mirroring device according to an embodiment of the present disclosure.

Referring to FIG. 11, the flow map is composed of a user, at least one server, and a link (associated with a session) between the user and the server. The present embodiment indicates a system configuration in which the user is connected to three web servers, the three web servers are connected to three WASs, and the three WASs are connected to one DB.

According to an embodiment of the present disclosure, in relation to a portion that visualizes a performance index of the packet mirroring device, the packet mirroring device is implemented as a network performance index visualization device. In this case, the performance-related index does not need to essentially use an index generated based on a mirrored packet. After a packet is obtained using another method, a performance-related index may be calculated using the above method based on information within the obtained packet. Thereafter, a flow map, a server list, a user list, a URL list, a session list, a web page analysis page, etc. to be described later may be generated by objecting the corresponding performance-related index.

First, in the embodiment of FIG. 11, the packet mirroring device may generate a flow map indicative of a traffic flow of a network including each entity based on the calculated performance-related index. A portion in which duration to be watched is set is present at the top of the flow map. In the case of real-time setting, a flow map at current timing is played back. In order to check performance of a network service at specific timing in the part, a flow map in the past time may be played back. For example, if a section from 11:11 on Jan. 2, 2017 to 01:33 on Jan. 3, 2017 in the past, is to be seen, a user sets a start time and an end time, and plays back content associated with a flow map generated based on the corresponding timing. In this case, a time bar is generated based on the set start time and end time. A flow map at desired timing may be played back through control of fast forward, fast reward, playback/stop, etc. for the generated time bar. In this case, an index to be indicated may be selected through each ink, each user and each server. For example, at least one of latency, the number of response wait sessions information (wait), BPS, CPS, TPS, UPS, etc. may be included. Furthermore, an IP address may be selected to be displayed in each user and each server.

According to an embodiment of the present disclosure, in the flow map, the user and each server display the calculated performance-related index. In this case, indices associated with latency and/or speed of a network among the performance-related indices may be used. Each performance-related index may be objected and displayed on a specific virtual space. In this case, the object is a data object and is objected from the performance-related index in order to appear in the flow map. For example, the object may include data, such as a response waiting speed or a BPS. Each performance-related index includes time information, and thus the object may be implemented to include the time information and mapped on the virtual space. The virtual space indicates a display space indicating an object. A plurality of objects may be represented within the virtual space.

In generating the flow map, the packet mirroring device determines to which entity (e.g., a client, a server, or a link between the client and the server) the performance-related index is related, identifies what the performance-related index is, and generates the flow map according to predetermined metadata on the virtual space based on the contents (BPS, the number of response wait sessions, or latency) of the identified performance-related index and the entity of the performance-related index. In particular, it is a principle that one performance-related index is represented in a visual form for each index in accordance with one object, but a performance-related index having high relevance (e.g., an index, such as latency of the same user and the number of response wait sessions) may be objected in one visual form. That is, two data may be displayed on one client icon in a given form. The same is true of a performance-related index associated with the server stage and the link.

For example, a delay index, such as latency of a user of 0.63 ms, is objected and represented on a virtual space associated with the flow map. A link is objected based on at least one of performance-related indices between a plurality of entities. The server is objected based on at least one of performance-related indices associated with the server and is represented on the virtual space. The delay index indicated in the flow map does not essentially include only latency. At least another of about 120 performance-related indices generated according to an embodiment of the present disclosure may be indicated. In this case, the indicated latency may indicate current latency. If a plurality of latencies is present in a plurality of links, the fastest latency, average latency, and/or the slowest latency may be indicated according to user setting.

Furthermore, in the flow map, in relation to a user and each server, information on a total number of sessions now associated with the user and information on the number of sessions waiting to be processed may be indicated in a form such as "1/203."

According to an embodiment of the present disclosure, a user may be displayed as a user group in a specific area. For example, users within one company may be indicated as group users related to the one company. In this case, the number of related users may be separately indicated. Furthermore, users within one group may be classified into a group 1, a group 2, etc. In this case, a criterion for the classification may be directly set by a manager, and the users may be automatically classified based on information related to an area, an organization and/or an IP. Furthermore, a performance-related index for the classified users may be separately processed. The separate processing may mean that when being objected in the flow map, the performance-related index is generated as a separate object. That is, in a group consisting of 50 employees, the group may be divided into a group 1 of 15 and a group 2 of 35. In this case, a user 1 may indicate a performance-related index for the group 1 of 15, and the group 2 may be objected based on a performance-related index for the remaining 35 and indicated in the flow map.

Even in the case of the server, information on the number of sessions not being processed compared to a total number of sessions connected to a corresponding server may be indicated like "1/122." In this case, information associated with the sessions may be changed into information associated with transactions and/or information associated with a connection (or link) and indicated according to user setting. That is, about 120 performance-related indices calculated in the packet mirroring device may be properly displayed in the flow map.

In the embodiment of FIG. 11, each link is associated with sessions on both sides of packet transmission and reception. Information objected and indicated in a rectangular form in the middle of the link may include latency, information on the number of response wait sessions, and a latency index such as a BPS. For example, in the case of the user and Home Page_WEB 1 on the upper side of FIG. 11, latency speed of 0.03 s is now indicated between the two entities with respect to a specific packet, and 122 sessions are present. It can be seen at a look that most of the 122 sessions has been processed and only one session is in a response wait state. Furthermore, it may be checked that service is performed at a fast speed of a BPS of 401.4 k.

In contrast, a very slow speed with latency of 1.35 s is indicated between the user and Portal Administration_WEB 1 on the lower side of FIG. 11. A ratio of 0/65 of the number of response wait sessions compared to a total number of sessions is indicated, and a relatively low BPS of 28.61 k is indicated. Accordingly, alert related to "section latency" is indicated in a corresponding link due to low latency and BPS. The alert indication may be represented using a method of using a color of a line indicative of the corresponding link and a method of differentiating the thickness of a line or a form of a line. For example, a threshold associated with a plurality of pieces of latency may be set, and a state may be identified by comparing the set threshold and a current latency value. The state may be determined by a rule set to be described later, and may be divided into a plurality of sections through a plurality of thresholds. For example, the state may be divided into states, such as "normal", "alert", and "problem occurrence", and may be determined based on a result of a comparison with a threshold. A visual expression corresponding to the determined state is present, and the corresponding state may be indicated as the corresponding visual expression. For example, a method of indicating "problem occurrence" as the worst state in red and indicating a next poor state in yellow indicating "alert" may be used. That is, different visual expressions may be used in accordance with a plurality of sections corresponding to a plurality of thresholds. The visual expression includes a change in at least one of the color, thickness and form of an object. In particular, in states related to a link, a "normal" state is indicated using a dark line, a "latency" state is indicated using a red line, a "network problem" state is indicated using a dotted dark line, and a "network latency" state is indicated using a dotted red line so that an operator can intuitively understand the states at a look.

Additionally, in the flow map, a web server is associated with at least one WAS server. In particular, two web servers (Home Page_WEB 1 and Home Page_WEB 2) on the upper side are connected to two WAS servers (Home Page_WAS 1 and Home Page_WAS 2) while forming a plurality of links therewith. That is, the web server (Home Page_WEB 1) is also connected to the two WASs (Home Page_WAS 1 and Home Page_WAS 2), and the web server (Home Page_WEB 2) is also connected to the two WASs (Home Page_WAS 1 and Home Page_WAS 2). Accordingly, four links are generated, and performance-related indices for the four links are respectively indicated.

Likewise, a web server-WAS section and a WAS-DB section in addition to the user-web server section may be represented. Due to such a visual representation, a user can intuitively check in which server of any section in a network server a problem is present now or in the past.

According to another embodiment of the present disclosure, the three sections of the user-web server section, the web server-WAS section and the WAS-DB section do not need to be essentially represented. Although one section (e.g., user-server section) smaller than the three sections is represented, a plurality of DB server sections may be hierarchized and represented as a plurality of a DB slave, a DB master and a DB end. The same is true of the web server or the WAS. A general configuration of such a flow map may be generated through user setting (this may be stored as metadata).

In relation to the generation of the flow map, the packet mirroring device may configure the web server, the WAS server and the DB server associated with a request from a user based on the user (i.e., the IP of a client terminal), that is, the center, through the analysis contents of a mirrored packet. That is, a server stage related to a destination ip and/or a URL within the mirrored packet may be extracted as components of the flow map. Connection relations of the flow map may be generated based on the ip of each server and visualized. Alternatively, the flow map may be generated by first setting a specific server that is the center and associating a user who has sent a request to the server with other servers associated with the set server.

The metadata associated with the configuration of the flow map may be previously stored in the service DB (532 of FIG. 5). The metadata may store a color, a font, a location of a physical file, a background, etc. in addition to information related to a form and location coordinates of an objected target object (e.g., a user, a server, and a link).

FIG. 12 is a table illustrating an example of setting values for determining whether an alert associated with network performance in the packet mirroring device according to an embodiment of the present disclosure occurs.

Referring to FIG. 12, in the flow map or other visualized representations, the packet mirroring device indicates an alert by comparing performance-related indices, associated with a current network service, with various thresholds so that a user can prevent a great traffic problem. In relation to a determination of the alert, various thresholds may need to be set.

In general, a determination of an alert situation may be divided into a server alert and a section alert, which have separate available rule sets. The server section may be determined based on a portion for a server state (Service Down, Server Down), the number of sessions, the number of response wait sessions, latency, a CPS, a TPS, a BPS, HTTP 40× or 50× error, etc. The section alert may be determined based on the number of response wait sessions and latency.

As illustrated in FIG. 12, the packet mirroring device determines whether a problem occurs in a network service based on at least some of performance-related indices. The packet mirroring device may determine web traffic latency, WAS traffic server latency, a WAS traffic wait excess, DB traffic latency, the occurrence of web WAS section latency, etc. based on latency information indicative of latency until a server receives the first data associated with content of a client associated with the content from a URL associated with a request for the content and information on the number of response wait sessions indicative of the number of sessions in a state in which a response to the request transmitted by the client has not been received. The packet mirroring device may compare the performance-related index with a threshold, and may determine whether a problem occurs through the measurement of duration in which a value of the performance-related index higher than the threshold is present as a result of the comparison.

First, the web traffic latency may occur when the number of response wait sessions among all sessions is 70% or more and the latency is more than 5 seconds with respect to all web servers. It may be determined that when such a time is 10 seconds or more, there is a problem with web traffic latency depending on user setting.

Furthermore, the WAS traffic server latency may be determined that a problem has occurred in the WAS server when the state in which latency is 5 seconds or more continues for 5 seconds or more. The occurrence of a WAS traffic wait excess is determined that a problem has occurred in the WAS server when the state in which the number of response wait sessions is 70% or more continues for 5 seconds or more.

The DB traffic latency may occur when the number of response wait sessions among all sessions is 30% or more and the latency is more than 5 seconds with respect to all DB servers. It may be determined that there is a problem with the DB traffic latency when such a time is 10 seconds or more depending on user setting.

Moreover, in relation to the occurrence of the web WAS section latency, it may be determined that there is a problem with all web servers and WAS servers when the state in which the latency is 5 seconds or more continues for about 5 seconds or more.

Furthermore, the packet mirroring device may determine whether a problem occurs by comparing a speed-related index, such as a BPS, with a threshold. The occurrence of a BPS excess is targeted for all servers. It is determined that a problem has occurred when the state in which the BPS is more than 50M continues for 5 seconds or more.

The occurrence of a CPS excess is targeted for all servers. It is determined that a problem has occurred when the state in which the CPS is more than 150 continues for about 10 seconds or more.

In the case of a 50× and/or 40× error, when the state in which the HTTP 50× error (or HTTP 40× error) is more than 5 continues for about 5 seconds or more with respect to all web servers, it is determined that a problem has occurred.

In the case of the occurrence of a wait excess, when the state in which a total number of sessions is more than 1000 and a ratio of the number of response wait sessions is more than 80% continue for about 10 seconds or more with respect to all servers, it is determined that a problem has occurred.

Various thresholds related to the occurrence of such a problem, a related duration threshold, a target server IP, and a corresponding alert level are selected to be changed by user setting.

According to an embodiment of the present disclosure, an alert level may be determined to be matched with such a problem situation. An alert state in the flow map and other various visualization tools are represented based on the alert level. Furthermore, as measures against the problem situation, an operation of providing notification of the alert situation through SMS text, an e-mail and/or a social network service (SNS) associated with a preset person-in-charge account may be performed.

According to another embodiment of the present disclosure, the packet mirroring device continues to store data for a network performance-related index over time, so the stored data forms big data. A proper rule set suitable for an alert situation may be adaptively generated by applying a machine learning algorithm to the stored big data. For example, the packet mirroring device may set a higher or lower threshold based on data for the past average latency of WAS servers and/or the number of response wait sessions with respect to a WAS server in which a WAS traffic latency problem on a regular basis.

Furthermore, in the state in which latency in a normal category and/or the number of response wait sessions, and BPS or TPS values are stored with respect to the past big data, when there is a difference of a threshold or more compared to average latency of a normal category and/or the number of response wait sessions, BPS or TPS values, the occurrence of a problem occurrence may be determined.

Otherwise, in a connection relation between the web server and the WAS server or the WAS server and the DB server, if service speed delay intensively occurs in any one server, an alert may be represented by determining that speed delay having a threshold or more occurs compared to an average speed delay value of other servers.

Figure 13:
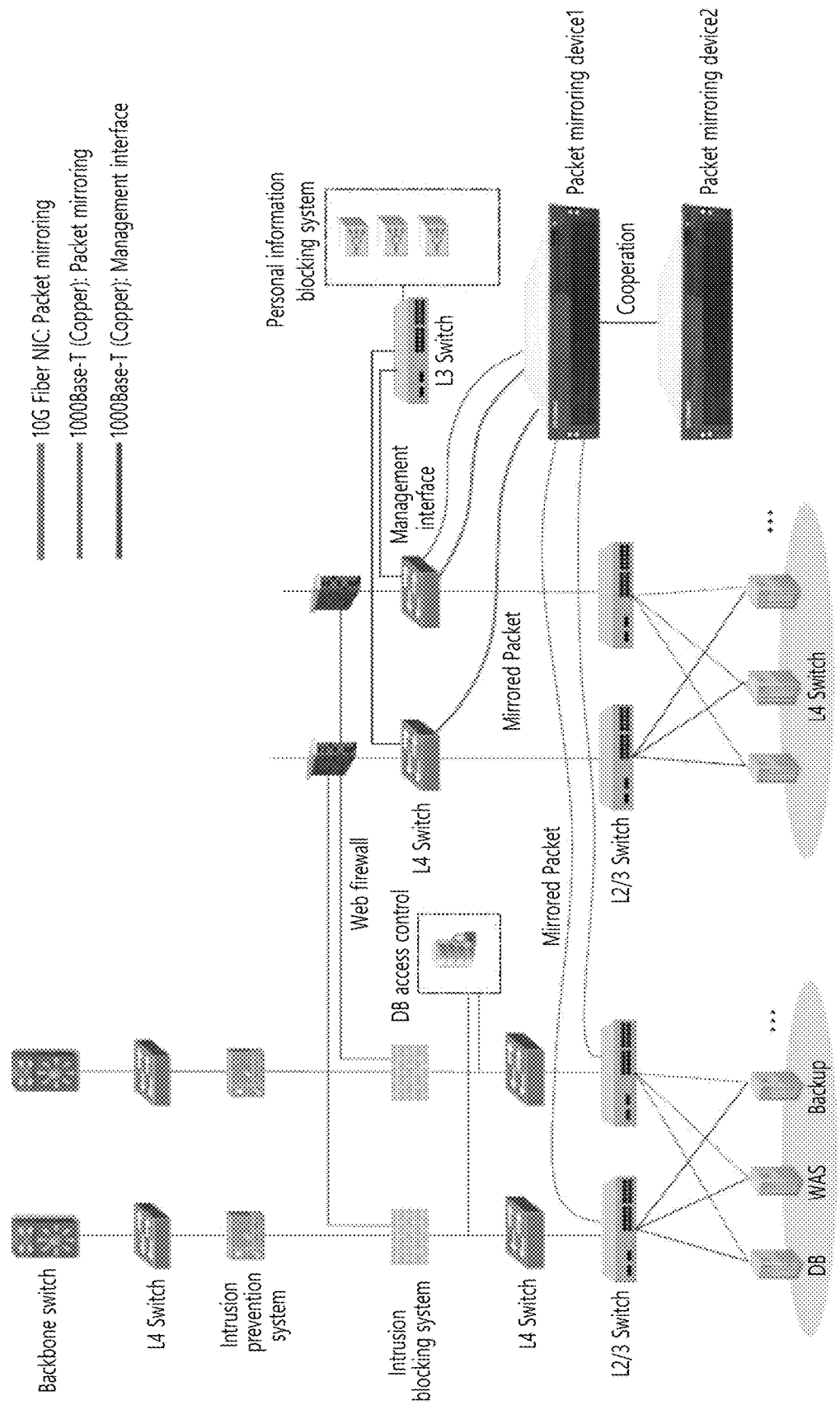
FIG. 13 is a diagram for describing a system connection relation between a plurality of packet mirroring devices according to another embodiment of the present disclosure.

FIG. 13 is a diagram for describing a system connection relation between a plurality of packet mirroring devices according to another embodiment of the present disclosure.

Referring to FIG. 13, the packet mirroring device may be connected to L2/L3 switches and L4 switches. The entire network system including the packet mirroring device includes backbone switches connected to an Internet network, L4 switches connected to the backbone switches, firewall systems (intrusion prevention systems) and intrusion blocking systems connected to L4 switches, the L4 switches connected to the intrusion blocking systems, and L2/L3 switches connected to the L4 switches. In this case, in the intrusion blocking system, other two L4 switches may be connected to a branch, and the two L4 switches are connected to an L3 system. A packet mirroring device 1 collects packets from the L2/L3 switches and the L4 switches. In this case, the packet mirroring device 1 receives a mirrored packet from the L2/3 switches by performing packet mirroring based on a 1000 base-T standard. The packet mirroring device 1 may receive the mirrored packet from the L4 switches by performing packet mirroring by using 10G Fiber NIC. In this case, a 1000 Base-T management interface may be connected to one of the two L4 switches, and signals associated with the management of a switching operation and the management of a packet mirroring operation may be transmitted and received.

According to the embodiment of the present disclosure, the packet mirroring device 1 and the connected switches may communicate with each other using different standards. In particular, connection media also include a copper wire and a fiber, and thus various types of media may be used based on communication characteristics.

The packet mirroring device 1 may be configured to operate in conjunction with a packet mirroring device 2. The packet mirroring device 1 may be configured to perform an operation of collecting and analyzing packets, and the packet mirroring device 2 may be configured to perform an operation for performing performance statistics and a search task. In this case, the L2/3 switches are complexly connected to the web server, the WAS server and the DB server. Accordingly, network service performance indices for the web server-WAS server section and the WAS server-DB server section can be calculated for each section.

Figure 14:
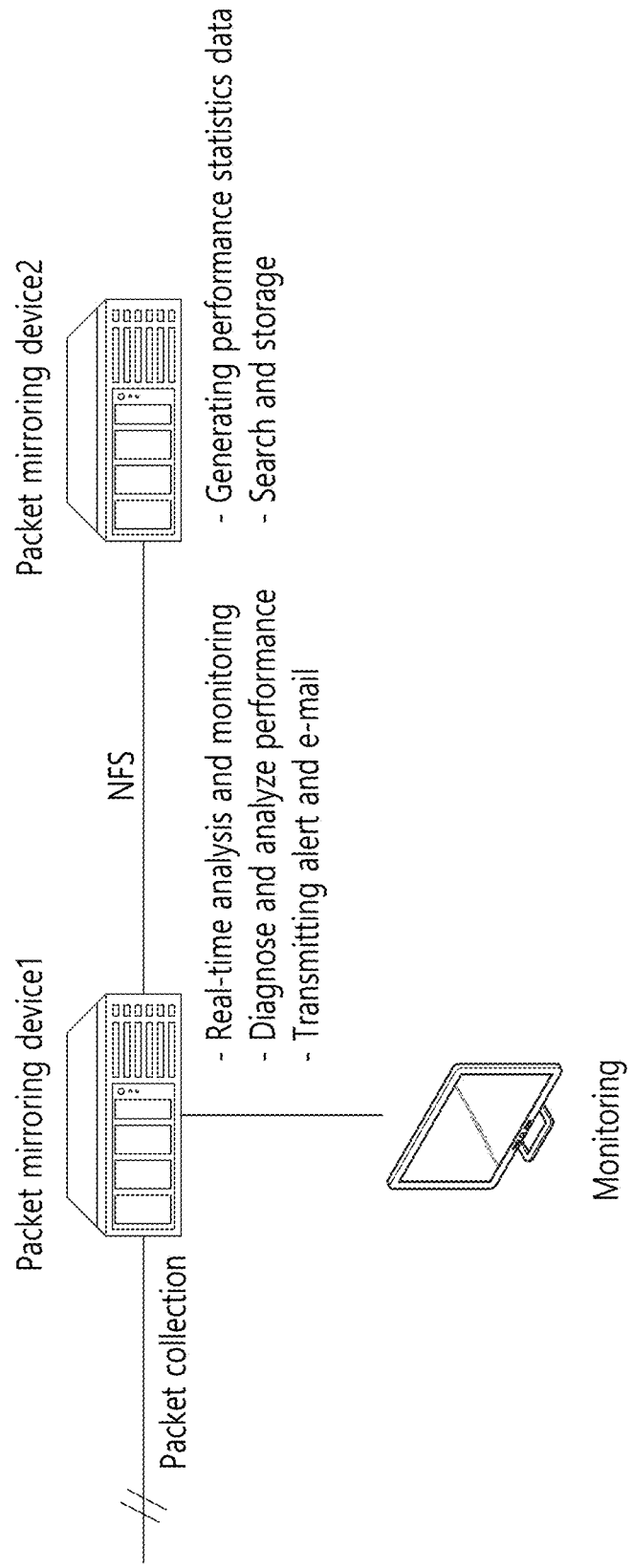
FIG. 14 is a diagram illustrating components that perform different functions based on a connection relation between a plurality of packet mirroring devices according to another embodiment of the present disclosure.

FIG. 14 is a diagram illustrating components that perform different functions based on a connection relation between a plurality of packet mirroring devices according to another embodiment of the present disclosure.

Referring to FIG. 14, a packet mirroring device 1 is connected to a switch and collects a mirrored packet. The packet mirroring device 1 collects packet information for each section, such as a client-web server, a web-WAS, and a WAS-DB, and analyzes and monitors performance of a network service for each section in real time. The packet mirroring device 1 may operate in conjunction with a packet mirroring device 2 that generates statistics associated with performance and performs analysis.

The packet mirroring device 2 communicates with the packet mirroring device 1 through short distance wireless communication or wired communication, such as near field communication (NFC), and periodically generates statistical data by using packet-related raw data received from the packet mirroring device 1 and data associated with an analyzed performance-related index. Specific statistics are generated in a 1-hour unit. Thereafter, a function for querying about, searching for, and storing the statistical data may be performed.

Although display means has been illustrated as being connected to only the packet mirroring device 1, the packet mirroring device 1 and/or the packet mirroring device 2 may be connected to the display means and may display related data so that a user can view the data.

Figure 15:
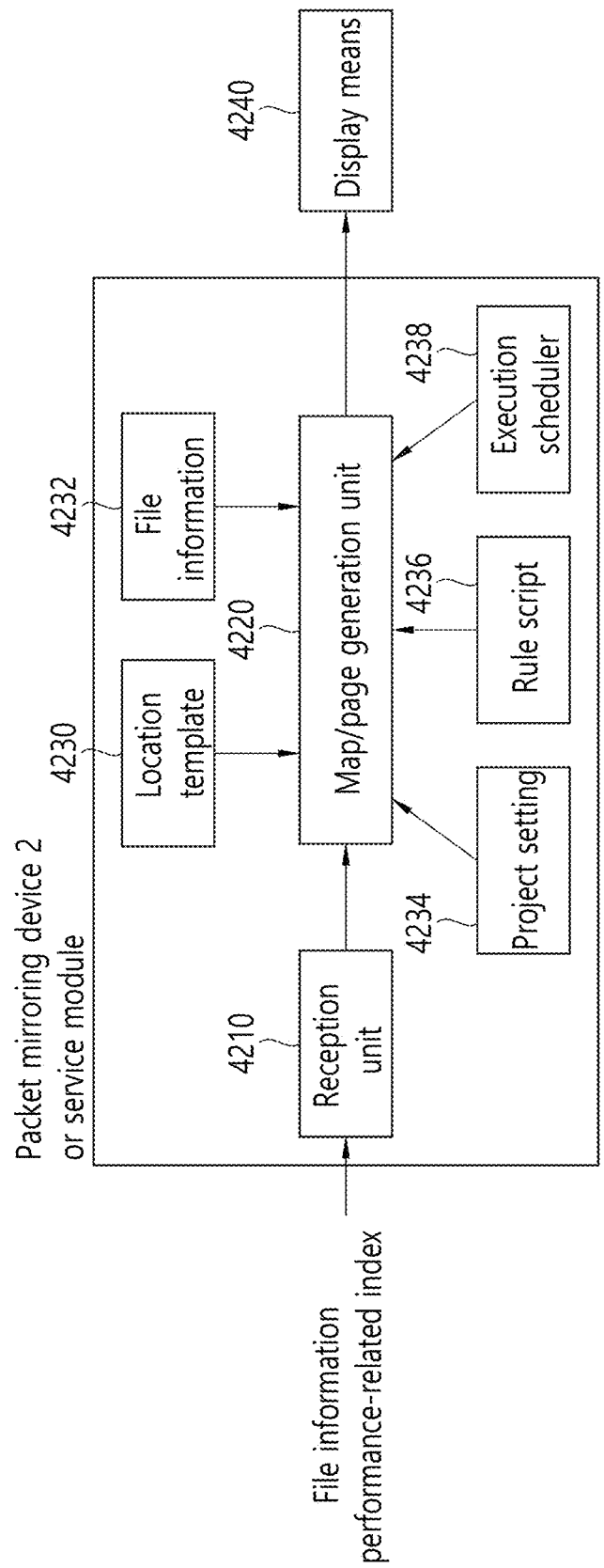
FIG. 15 is a block diagram specifically illustrating a packet mirroring device according to an embodiment of the present disclosure or the service module of FIG. 5.

FIG. 15 is a block diagram specifically illustrating a packet mirroring device according to an embodiment of the present disclosure or the service module of FIG. 5. As illustrated in FIG. 15, the packet mirroring device or the service module according to an embodiment of the present disclosure may include a reception unit 4210 and a map/page generation unit 4220.

Referring to FIG. 15, the reception unit 4210 may receive, from the packet mirroring device (not illustrated) or the analysis DB (refer to 522 of FIG. 5), raw data information of a mirrored packet and data associated with a performance-related index. Thereafter, the reception unit 4210 transmits the received data to the map/page generation unit 4220.

The map/page generation unit 4220 may generate flow map or analysis page data by integrating the received packet data and/or performance-related index based on information of a location template 4230, tile information 4232, project setting 4234, a rule script 4236, and an execution scheduler 4238.

The location template information 4230 may include deployment information on various types of pages. For example, several types of information on the deployment of a plurality of analysis pages (e.g., a server list, a session list, a user list, a URL list, and a web page analysis page) may be included in one entire display canvas. Furthermore, the template information may include information on a connection relation between a map and a page. In association with a drill-down-based hierarchical page configuration, in which layer an analysis page will be disposed may be determined (a default type may be configured and a plurality of types may be configured), and the deployment of a map/page having a determined given type and a template having a connection relation between a map and a page may be defined. According to another embodiment of the present disclosure, if a manager generates a template having a desired specific type, the same template may be subsequently invoked, and the same map/page configuration may be easily rearranged.

The tile information 4232 stores background information of a user interface. For example, background information used as the background of a flow map may be stored. When the map/page generation unit 4220 generates map/page data, the map/page data may be visualized as the stored background.

The information of the project setting 4234 includes various types of configuration information of a project that generates dynamic content in the map/page generation unit 4220.

The rule script 4236 defines basic deployment information of various objects (e.g., a device object, a server object and/or a link object) displayed in a map/page, the color, font, etc. of visual expressions to be displayed in the map/page, etc. In configuration information of the rule script 4236, management, such as the generation and storage of a new configuration and the deletion of the existing configuration by a system, may be performed.

Furthermore, since the cycle of received data is variable, the map/page generation unit 4230 includes the execution scheduler 4238, and may automatically/manually change a data reception cycle and/or a page occurrence cycle according to a defined schedule and perform the generation of a map/page. The execution scheduler 4238 may include time-series task sequence information from the step of extracting data necessary for analysis from received data to the generation of a map and/or analysis page.

The map and/or page data generated through the map/page generation unit 4230 may be output through display means 4240, such as a monitor. Alternatively, the map and/or page data may be provided to another packet mirroring device, and map and/or page data provided by the packet mirroring device may be generated by processing the map and/or page data in another form. The display means 4240 may be included in the packet mirroring device and may be separately present like an external monitor.

Network Security Monitoring

A network monitoring device according to an embodiment of the present disclosure may perform network security monitoring for determining whether a security problem has occurred in a network. Meanwhile, the network monitoring according to an aspect of the present disclosure may perform network performance monitoring and/or network security monitoring for calculating the index of performance of the network simultaneously or separately. Hereinafter, security monitoring elements in the network monitoring of the present disclosure are more specifically described.

As described above, in the present disclosure, the security of a network may include at least one of security elements according to detection according to anomaly detection, signature-based detection, specification-based detection. Furthermore, security in the present disclosure includes an unintentional obstacle cause in addition to an intentional obstacle cause. Accordingly, the detection of a system design error, a system operation error, and a manager error may be included in security monitoring. Checking whether a device included in a network operates normally may also be included in security monitoring.

Figure 16:
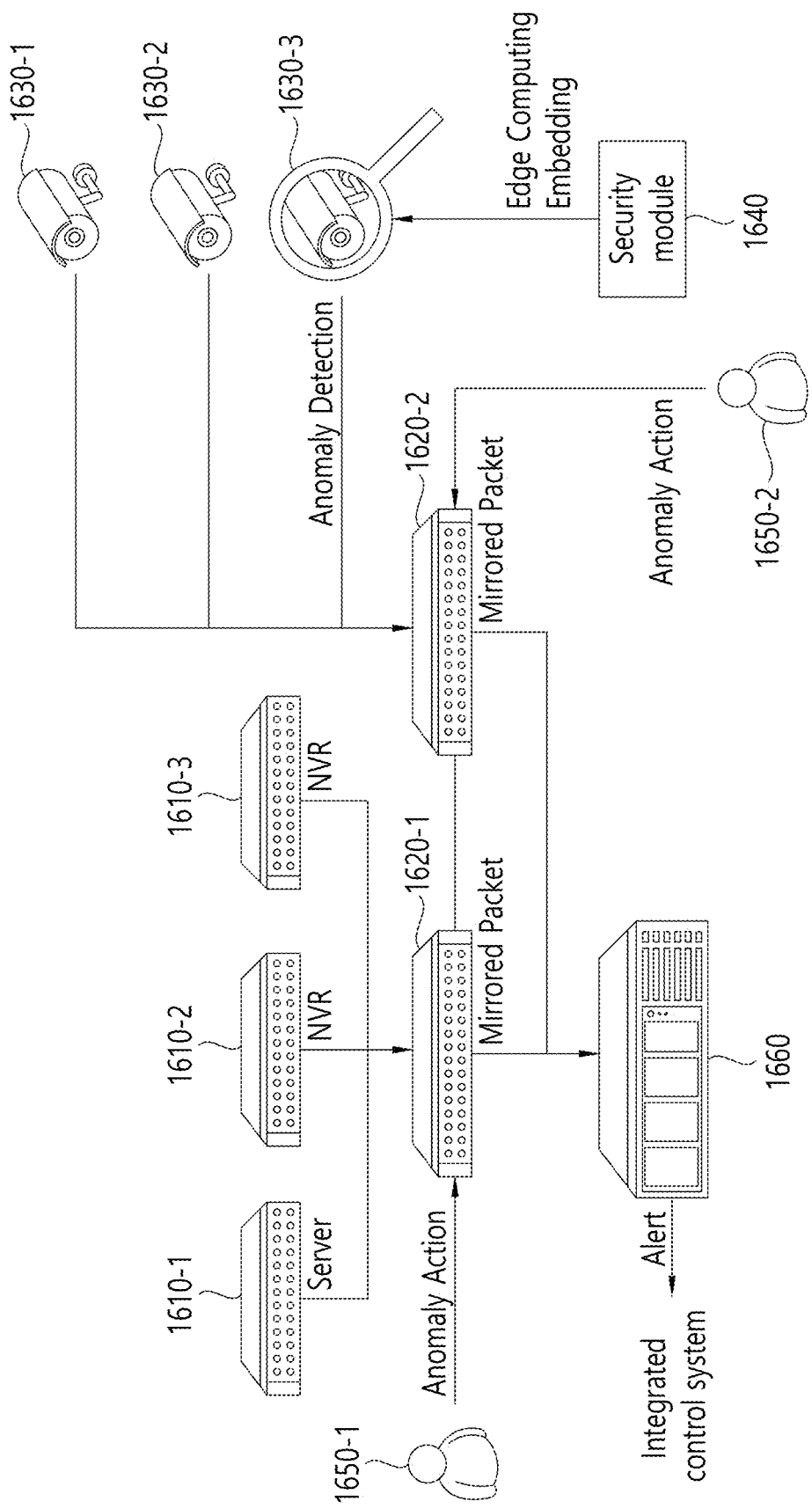
FIG. 16 is a concept view of a first network to which network monitoring according to an embodiment of the present disclosure may be applied.
Figure 17:
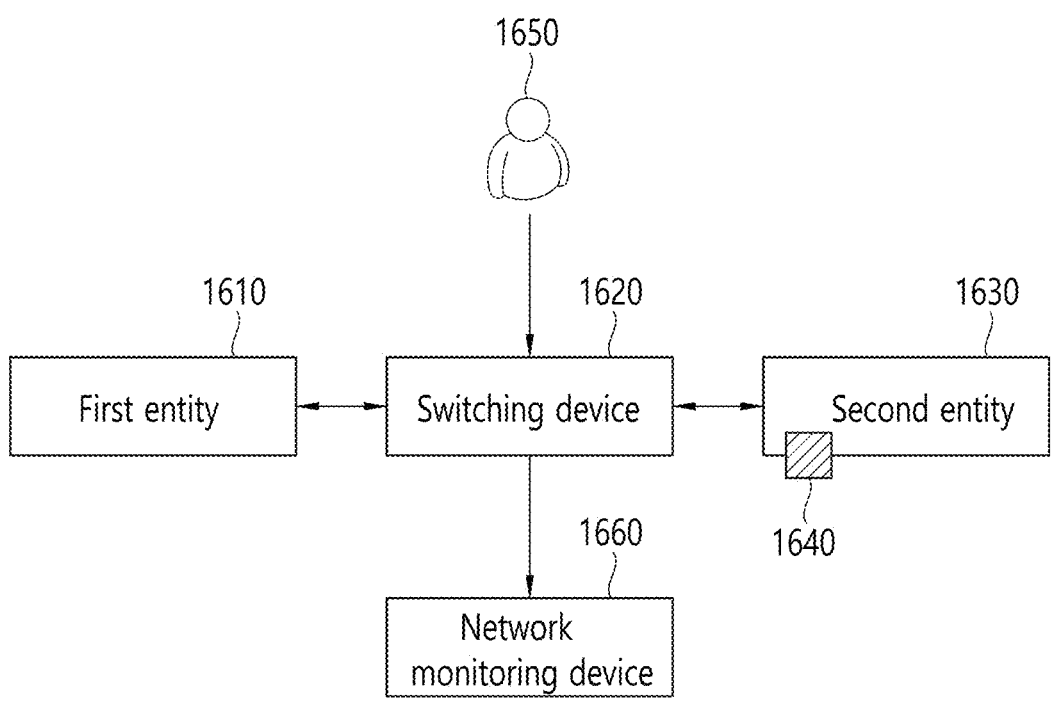
FIG. 17 is a block diagram illustrating a configuration of the first network of FIG. 16.

FIG. 16 is a concept view of a first network to which network monitoring according to an embodiment of the present disclosure may be applied. FIG. 17 is a block diagram illustrating a configuration of the first network of FIG. 16. First, as illustrated in FIG. 17, the first network to which network monitoring according to an embodiment of the present disclosure may be applied includes at least one switching device 1620 in the middle thereof, and may include at least one first entity 1610 and at least one second entity 1630 which exchange information. The switching device 1620 may include network switches that play a role as an OSI 2 layer, an OSI 3 layer, an OSI 4 layer and/or another layer (e.g., OSI 7 layer). For example, the switching device 1620 may perform a function for setting the path of a packet, and may also perform functions, such as load balancing, port forwarding and QoS. The switching device 1620 may be called a network switch, a switching hub, or a port switching hub.

A network monitoring device 1660 is connected to the switching device 1620, and may obtain almost all packets transmitted and received between a first entity 1610 and a second entity 1630 through the switching device 1620 by mirroring all the packets. Packet mirroring, that is, the duplication or capture of a packet may be performed in the switching device 1620. Packet mirroring may be performed in the network monitoring device 1660 itself according to circumstances. The switching device 1620 may duplicate packets transmitted and received between the first entity 1610 and the second entity 1620, may set a port connected to the network monitoring device 1660 as a destination port, and may provide the duplicated packets to the network monitoring device 1660. In this case, the switching device 1620 may designate the corresponding port for analysis use and provide the packets to the port.

A given third party 1650 may perform an anomaly action on the switching device 1620 as illustrated in FIG. 17, for example, and may perform an attack on the second entity 1630 or the first entity 1610 over a wireless or wired network unlike in that illustrated in FIG. 17. The network monitoring device 1660 may be configured to whether a security-related problem has occurred in a network by performing security monitoring on the network through the mirroring of a packet between the first entity 1610 and the second entity 1630 based on the switching device 1620.

According to an aspect, the second entity 1630 may be a device including a processor and capable of performing edge computing, and may be connected to the switching device 1620 via an edge computing device including a processor. The processor may include a security module 1640 which may be implemented as software or implemented as separate hardware. The security module 1640 may perform security monitoring in the second entity 1630 itself in parallel to, simultaneously or sequentially with the security monitoring of the network monitoring device 1660. The second entity 1630 may be an IoT device equipped with a processor. In an IoT environment, the number of IoT devices included in a network tends to be increase in geometrical progression. The anomaly action of the given third party 1650 may be directed toward the second entity 1630 in addition to the first entity 1610. As described above, the security of an IoT device may be more vulnerable than that of a component of a network conventionally. However, if IoT devices included in a network are very many, to perform, by the network monitoring device 1660, security monitoring on all the IoT devices included in a network may have a problem, such as the shortage of the processing capability of the network monitoring device 1660 or the difficulty of securing a real-time property, for example. Each of the second entities 1630 according to an aspect of the present disclosure can perform security monitoring on a network more certainly although multiple second entities 1630 are present because it individually performs security monitoring based on the security module 1640.

FIG. 16 illustrates a more detailed embodiment in which in the first network of FIG. 17, the first entities include a server 1610-1 and network video recorder (NVR) 1610-2 and 1610-3 and the second entities include IP cameras 1630-1, 1630-2, and 1630-3. For example, applications essentially including a plurality of IP cameras, such as the security of a specific area or a smart city or a smart factory, are variously developed, but a security problem such as hacking into a camera becomes a big problem in the activation of an IP camera. As illustrated in FIG. 16, in the network including the IP cameras and the NVRs, the server 1610-1 and the NVRs 1610-2 and 1610-3 may be connected to the first switching device 1620-1, the plurality of IP cameras 1630-1, 1630-2, and 1630-3 may be connected to the second switching device 1620-2, and the first switching device 1620-1 and the second switching device 1620-2 may be interconnected. Furthermore, the network monitoring device 1660 may perform security monitoring on the network by analyzing mirrored packets from the first switching device 1620-1 and the second switching device 1620-2, and may transmit an alert to an integrated control system in response to a determination that a security problem has occurred in the network.

In the network of FIG. 16, the given third party 1650-1 may apply an anomaly action to the network through the first switching device 1620-1. The given third party 1650-2 may apply an anomaly action to the network through the second switching device 1620-2. The network monitoring device 1660 may perform security monitoring for the entire network, anomaly detection, device health check for devices included in the network, and application monitoring. Furthermore, according to an aspect, for example, the IP camera 1630-3 may be implemented as a connected camera including a processor and capable of performing edge computing. The security module 1640 of a micro engine form which may be implemented as a software module, for example, in the processor may perform security monitoring by concentrating on the IP camera 1630-3. The processor included in the connected camera 1630-3 may be configured to learn and apply artificial intelligence. The security module 1640 may be configured to perform monitoring on a process and resources, to watch system log files, for example, and to review other security elements.

Accordingly, the NVR-based "security-enhanced IP camera system" of FIG. 16 may perform anomaly detection by analyzing packet information and camera operation information for at least some IP cameras connected to the NVRs. Through the security monitoring of at least one of the monitoring device 1660 and the security module 1640, real-time anomaly detection in addition to transaction logging-based post-processing may be performed. A real-time diagnosis effect can be improved due to a micro engine application of the security module. Analysis in the security module may include the analysis of a packet input to the second entity, log, state watching and analysis, for example. At least some of the IP cameras included in the network may be low-performance IoT devices incapable of performing edge computing. In this case, real-time diagnosis through the micro engine may not be performed.

Figure 18:
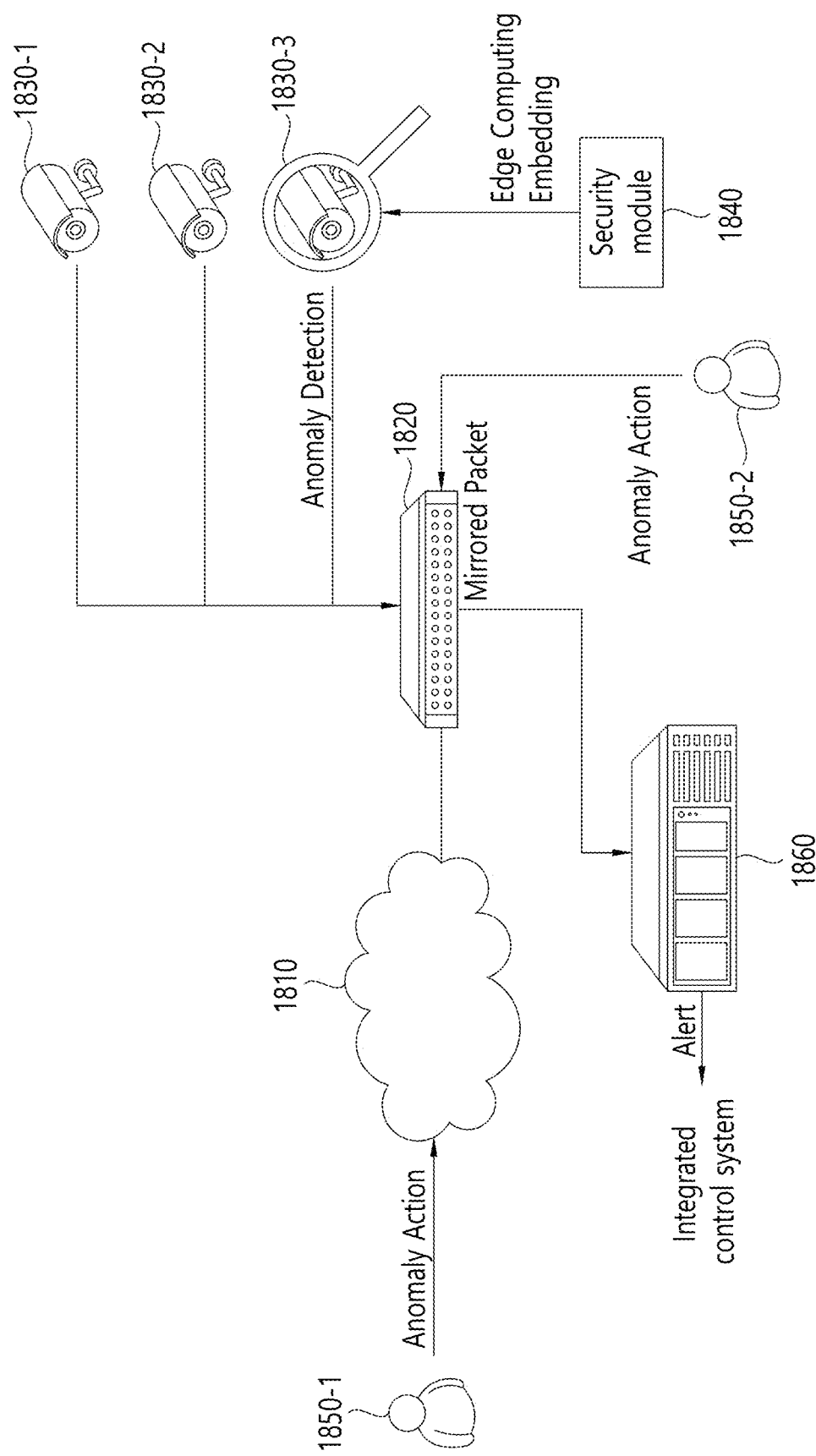
FIG. 18 is a concept view of a second network including a cloud network to which network monitoring according to an embodiment of the present disclosure may be applied.
Figure 19:
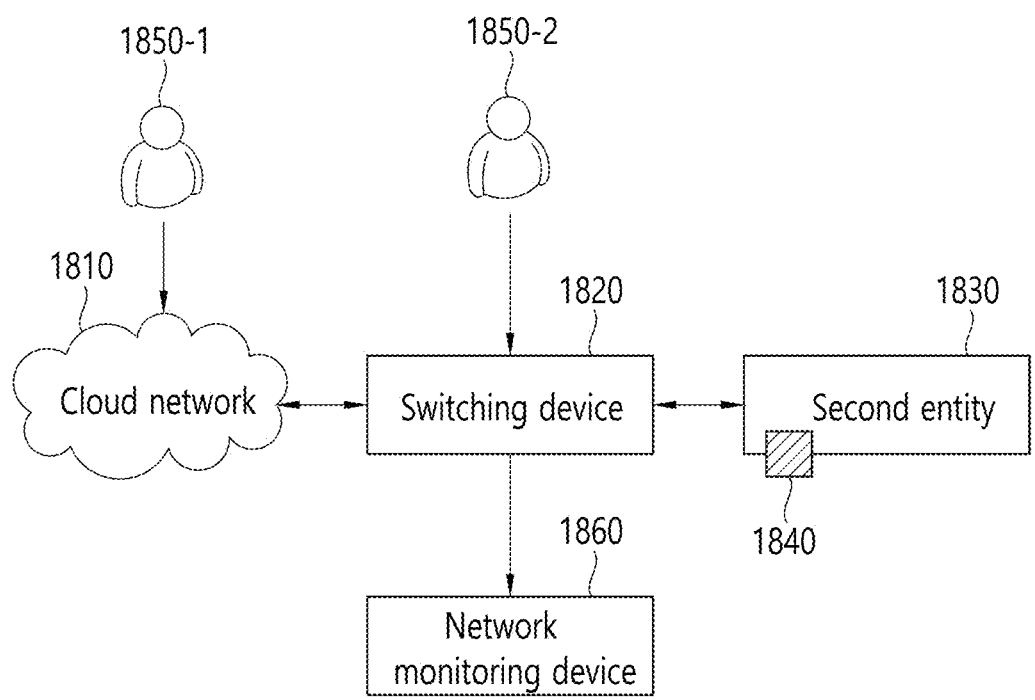
FIG. 19 is a block diagram illustrating a configuration of the second network of FIG. 18.

FIG. 18 is a concept view of a second network including a cloud network to which network monitoring according to an embodiment of the present disclosure may be applied. FIG. 19 is a block diagram illustrating a configuration of the second network of FIG. 18.

In the second network of FIGS. 18 and 19, a second entity 1830 may be configured to transmit and receive data to and from a cloud network 1810 via a switching device 1820. That is, instead of including a separate server or NVR, the cloud network may receive information from the second entity, and may access the second entity 1830 or control access thereto over the cloud network. A network monitoring device 1860 may perform security monitoring on the network by mirroring a packet between the cloud network 1810 and the second entity 1830 by using the switching device 1820. As in the first network, the second entity 1830 may include a security module 1840 as an edge computing device equipped with a processor. A given third party 1850-1 may perform an anomaly action on a network over the cloud network 1810 or a given third party 1850-2 may perform an anomaly action through the switching device 1820. For a purpose similar to that in the first network, the network monitoring device 1860 and the security module 1840 of the second entity 1830 may perform security monitoring through at least partially cooperation. As illustrated in FIG. 18, the second entity may include a plurality of IP cameras 1830-1, 1830-2, and 1830-3. For example, some IP camera 1830-3 may be configured to perform edge computing.

Figure 20:
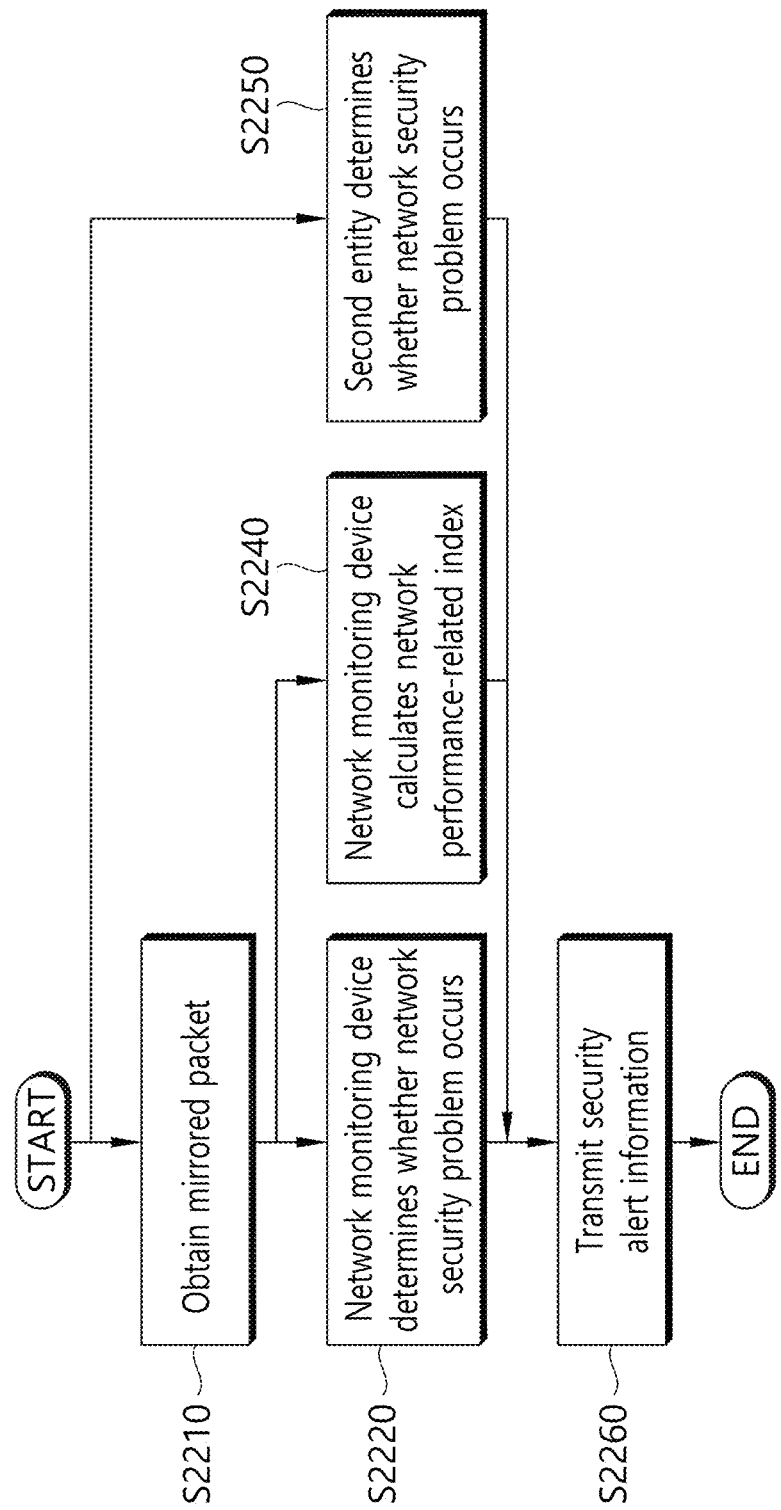
FIG. 20 is a flowchart of a network monitoring method according to an embodiment of the present disclosure.

FIG. 20 is a flowchart of a network monitoring method according to an embodiment of the present disclosure. Hereinafter, a network monitoring method according to an embodiment of the present disclosure is more specifically described with reference to FIG. 20. The network monitoring method according to an embodiment of the present disclosure may perform monitoring for a network, including a first entity and a second entity, a switching device provided between the first entity and the second entity, and a network monitoring device connected to the switching device, as described with reference to FIGS. 16 to 19, for example. In this case, the first entity may include a server, the second entity may include a client terminal, and the client terminal may include an IoT device. According to an aspect, for example, as illustrated in FIGS. 16 and 17, the first entity may include a network video recorder (NVR), and the second entity may include an IP camera, thus configuring a security-enhanced IP camera system.

As illustrated in FIG. 20, in the network monitoring method according to an embodiment of the present disclosure, the network monitoring device 1660 may obtain at least one mirrored packet for at least one packet transmitted and received between the first entity 1610 and the second entity 1630, based on mirroring from the switching device 1620 (step 2210). For example, a packet duplicated or captured in the switching device 1620 may be transmitted to the network monitoring device 1660.

The network monitoring device 1660 may determine whether a security problem for a network associated with the first entity 1610 and the second entity 1620 occurs, based on at least some of pieces of information included in the at least one mirrored packet (step 2220). Furthermore, as described above, the network monitoring device 1660 may also perform performance monitoring for the network, and may calculate a performance-related index indicative of performance of service of the network associated with the first entity 1610 and the second entity 1630 (step 2240) based on at least some of pieces of information included in the at least one mirrored packet, in parallel to a determination of whether a security problem occurs (step 2220). The determination of whether a security problem occurs and the calculation of the performance-related index may be simultaneously performed, may be sequentially performed, and may be at least partially simultaneously performed. A detailed technical characteristic for the calculation of the performance-related index invokes the aforementioned writing related to network performance monitoring.

Meanwhile, as described above, the second entity 1630 according to an aspect of the present disclosure includes a processor and may perform edge computing, or may be connected to the switching device 1620 via an edge computing device equipped with a processor. In this case, the second entity 1630 or the edge computing device (not illustrated) may determine whether a security problem for a network associated with the first entity 1610 and the second entity 1630 occurs based on at least some of pieces of information included in at least one packet received by the second entity 1630 or transmitted by the second entity 1630, independently of or in parallel to the execution of network monitoring of the network monitoring device (step 2250).

The security monitoring performed by the network monitoring device 1660 and the security monitoring performed by the second entity 1630 or the edge computing device may be at least partially different. A security monitoring procedure in each device is described later in this specification.

Referring back to FIG. 20, in response to a determination that at least one of the monitoring device and the second entity or the edge computing device determines that a security-related problem has occurred in the network, security alert information may be transmitted to at least one of a preconfigured manager device or integrated control system (step 2260). According to an aspect, the second entity or the edge computing device may transmit edge area security alert information to the switching device 1620 in response to the determination that the security problem has occurred. The edge area security alert information may include information indicating that a security-related problem has occurred in an edge area including the second entity or the edge computing device. The network monitoring device 1660 may transmit security alert information to a user terminal having a first account for the management of a pre-registered network, in response to a determination that the security problem for the network has occurred based on security monitoring performed by the network monitoring device, or the reception of edge area security alert information from the second entity or the edge computing device via the switching device 1620.

Figure 21:
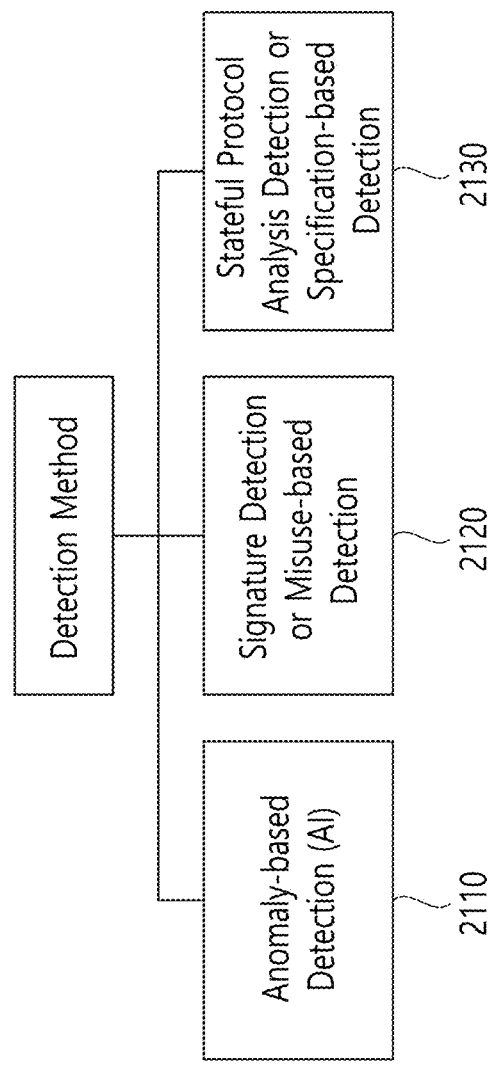
FIG. 21 is a classification diagram of exemplary methods of detecting whether a security problem occurs.
Figure 22:
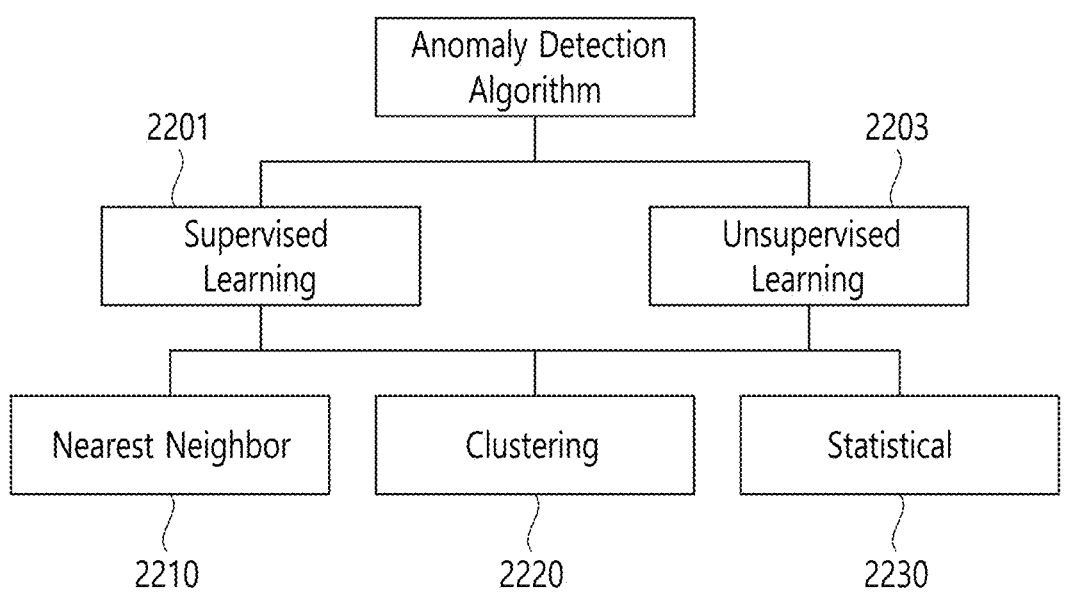
FIG. 22 is a detailed classification diagram of an artificial intelligence-based anomaly detection method of FIG. 21.

FIG. 21 is a classification diagram of exemplary methods of detecting whether a security problem occurs. FIG. 22 is a detailed classification diagram of an artificial intelligence-based anomaly detection method of FIG. 21. As illustrated in FIG. 21, a method of detecting whether a security-related problem occurs may be basically divided into anomaly detection (AI) 2110, signature-based detection or misuse-based detection 2120, and stateful protocol analysis detection or specification-based-detection 2130. The anomaly detection 2110 includes detecting abnormal actions deviating from a common system use pattern. The signature-based detection 2120 may be performed by monitoring known attacks by using an already known attack pattern. The specification-based detection 2130 is similar to the anomaly detection in that an attach deviated from a normal action is detected, but is characterized in that it does not depend on a machine learning scheme, it is based on a specification manually developed by modeling legitimate system actions, and it detects a dangerous object by applying a security rule to developed specifications and comparing a corresponding rule with an actual operation of the dangerous object.

Meanwhile, as illustrated in FIG. 22, an AI-based anomaly detection algorithm may be divided into supervised learning 2201 and unsupervised learning 2203, and may be specifically divided into nearest neighbor 2210, clustering 2220, and a statistical scheme 2230.

In network security monitoring according to an embodiment of the present disclosure, the clustering 2220 or the statistical scheme 2230 among AI-based anomaly detection schemes may be chiefly applied. At least one of the signature-based detection 2120 based on a rule or pattern or the specification-based detection 2130 using a rule or pattern may be used. That is, the step of determining whether a security problem occurs (step 2220, step 2250) in FIG. 20 may include determining whether the security problem occurs based on at least one of anomaly detection based on artificial intelligence including clustering or a statistical scheme, signature-based detection using a pattern or a rule, or specification-based detection using a pattern or a rule. Meanwhile, schemes applied to the security monitoring of the monitoring device 1660 and security monitoring in the security module 1640 may be different. A method of applying security monitoring in the same device may be different depending on information, that is, an analysis target. This is described later in this specification.

Figure 23:
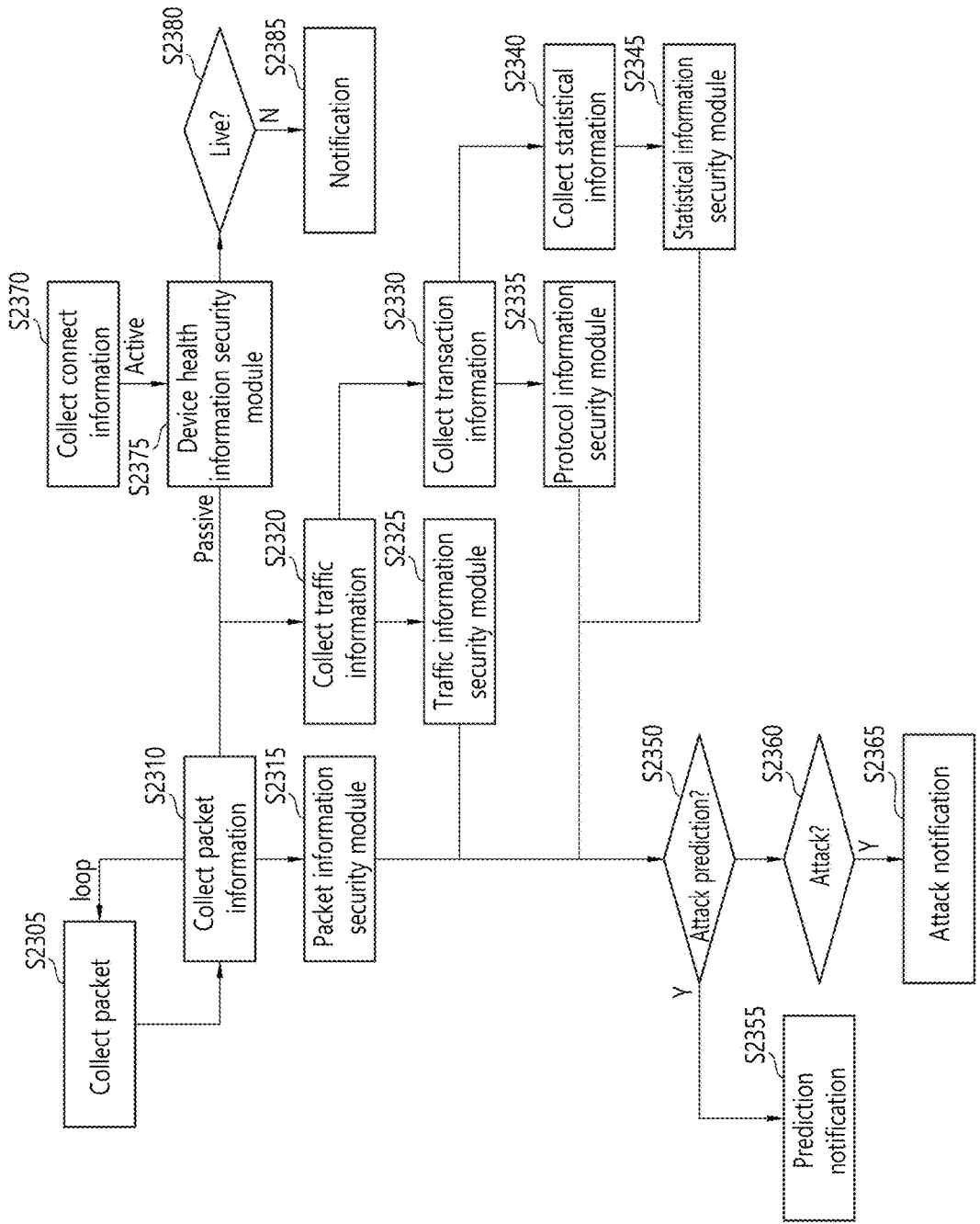
FIG. 23 is a flowchart illustrating a mechanism for determining whether a security problem occurs according to an embodiment of the present disclosure.

FIG. 23 is a flowchart illustrating a mechanism for determining whether a security problem occurs according to an embodiment of the present disclosure. As illustrated in FIG. 23, a determination of whether a security problem occurs according to an aspect of the present disclosure may be performed on pieces of specific information in stages and on pieces of specific information in parallel depending on information induced from a mirrored packet. More specifically, as illustrated in FIG. 23, first, when a mirrored packet is collected from the switching device 1620 (step 2305), packet information including information from the at least one mirrored packet may be collected (step 2310). A packet information security module may determine whether a security-related problem has occurred in a network based on the packet information (step 2315). In this case, the packet information may mean information which may be obtained from the at least one packet regardless of the source or destination of the packet, as in a case where the occurrence of an acknowledgement signal ACK 100 times or more per second is determined to be the occurrence of a security problem, for example.

Referring back to FIG. 23, traffic information may be collected based on the packet information (step 2320). A traffic information security module may determine whether a security-related problem has occurred in the network based on the traffic information (step 2325). In this case, the traffic information may be converted into a flow of the packet based on 5 tuples (a source IP, a source port, a destination IP, a destination port, and a protocol), for example. That is, the traffic information has information on a source and a destination, and may include information indicating a connection relation between two or more entities.

Referring back to FIG. 23, transaction information or protocol information may be collected based on the traffic information (step 2330). A protocol information security module may determine whether a security-related problem has occurred in the network based on the transaction information or the protocol information (step 2335). In this case, the transaction information may indicate a set of information transmissions and receptions between a plurality of entities. The concept of a transaction described in relation to the network description monitoring, for example may be applied to the transaction information. In a protocol unit, for example, a case where a login occurs 10 times or more per minute may be determined to be the occurrence of a security problem. The aforementioned packet information and traffic information and transaction information may also be hereinafter referred to as "information related to data transmission and reception." Such information may be used to detect whether a security problem occurs in real time.

Referring back to FIG. 23, at least one of the packet information, the traffic information and the transaction information may be accumulated to form statistical information (step 2340). A statistical information security module may determine whether a security problem occurs based on the statistical information (step 2345). The statistical information may compare a characteristic of the network during predetermined duration with a characteristic of the network at determination timing, and may detect whether a security problem occurs when a difference is equal to or greater than a threshold. Meanwhile, conventional forensics detection for a security problem in addition to real-time security detection may be performed based on a plurality of pieces of information.

Each of the packet information security module, the traffic information security module, the protocol information security module and the statistical information security module detects whether a security problem occurs based on pieces of processing target information, but may detect attack prediction (step 2350). That is, each of the modules may be configured to predict that an attack will occur within predetermined duration not the occurrence of an attack based on each determination criterion, and may perform prediction notification that provides notification of at least one of the fact that an attack is predicted and predicted time information or duration information, when the attack prediction is determined (step 2355). Furthermore, each of the modules may determine that an actual attack has occurred (step 2360), and may perform attack notification in response to a determination that the attack has occurred (step 2365).

Meanwhile, referring back to FIG. 23, security monitoring according to an aspect of the present disclosure may include unintended problems of a user in the security monitoring in addition to an intentional security issue according to a given third party. Security according to an aspect of the present disclosure may be understood as a concept including safety. For example, as illustrated in FIG. 23, security monitoring according to an aspect of the present disclosure may include determining device health information, and may specifically include determining whether a device included in a network operates normally or is alive (step 2375). The alive information may use at least one of an active method, such as collecting connection information (step 2370) and making a determination based on the connection information, and a passive method of making a determination without transmitting separate data. Whether a device or a service is alive is determined (step 2380). A manager or a control center may be notified of a determination that the device is in an alive state in response to the determination (step 2385).

Figure 24:
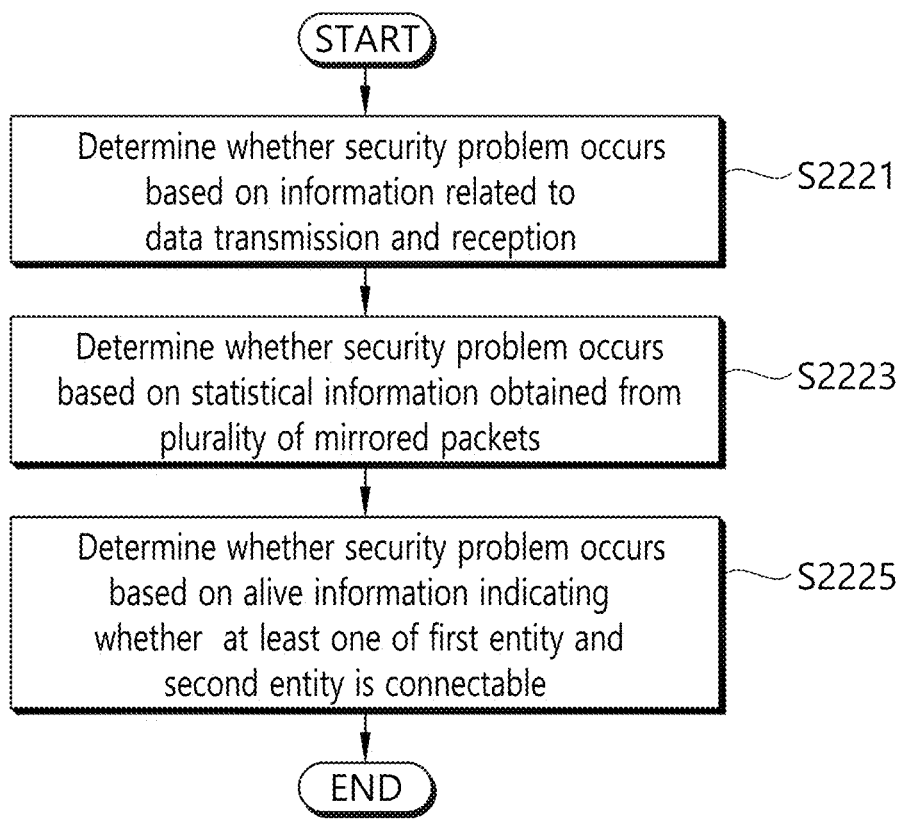
FIG. 24 is a detailed flowchart of the step of determining whether a security problem occurs by a monitoring device in FIG. 20.
Figure 25:
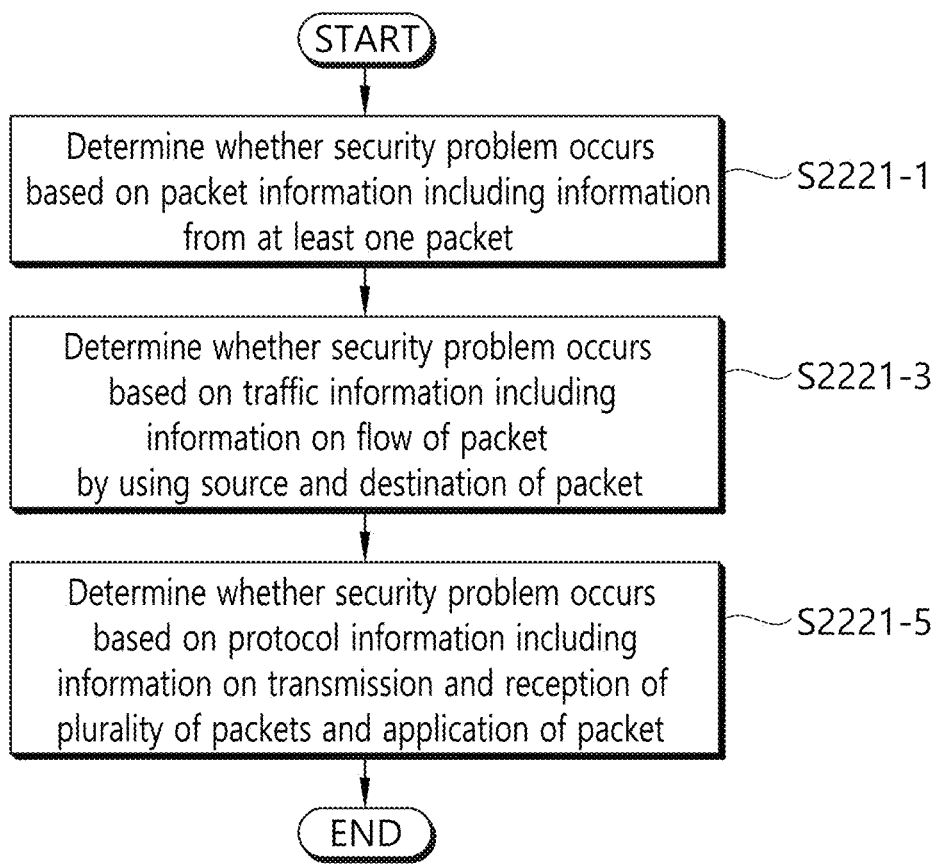
FIG. 25 is a detailed flowchart of the step of determining whether a security problem occurs based on information related to data transmission and reception in FIG. 24.

FIG. 24 is a detailed flowchart of the step (step 2220) of determining whether a security problem occurs by the monitoring device of FIG. 20. FIG. 25 is a detailed flowchart of the step of determining whether a security problem occurs based on information related to data transmission and reception in FIG. 24.

As illustrated in FIG. 24, the step (step 2320) of determining, by the network monitoring device, whether a security problem occurs may include determining whether a security problem occurs based on information related to data transmission and reception, obtained from at least one mirrored packet (step 2221). More specifically, the information related to data transmission and reception, as described above, includes packet information, traffic information, and transaction information. The step of determining whether a security problem occurs based on the information related to data transmission and reception may include determining whether a security problem occurs based on packet information including information from the at least one packet (step 2221-1), determining whether a security problem occurs based on traffic information including information on a flow of the packet by using the source and destination of the packet (step 2221-3), and determining whether a security problem occurs based on protocol information including information on the transmission and reception of a plurality of packets and the application of the packet (step 2221-5), as illustrated in FIG. 25.

Referring back to FIG. 24, the network monitoring device may determine whether a security problem occurs based on statistical information obtained from a plurality of mirrored packets (step 2223), and may determine whether a security problem occurs based on alive information indicating whether at least one of the first entity and the second entity may be connected (step 2225). In FIG. 24, the steps are illustrated to have a sequence, but the steps of determining whether a security problem occurs based on the information may be simultaneously performed at least partially or may be sequentially performed.

Figure 26:
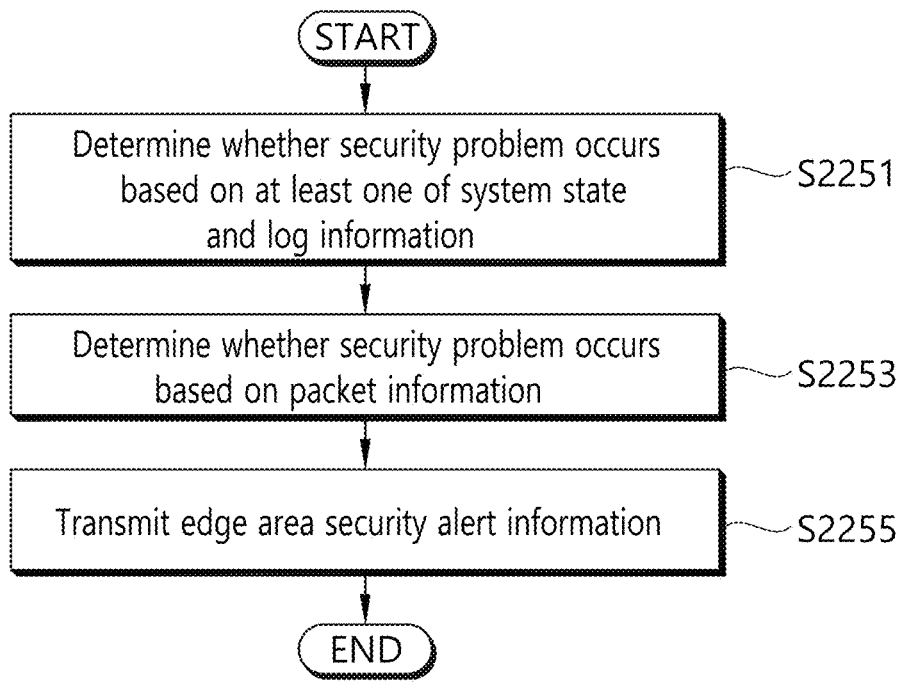
FIG. 26 is a detailed flowchart of the step of determining whether a security problem occurs by a second entity of FIG. 20.

FIG. 26 is a detailed flowchart of the step of determining whether a security problem occurs by the second entity of FIG. 20. As illustrated in FIG. 26, the step (step 2250) of determining, by the second entity or the edge computing device, whether a security problem occurs may include determining whether a security problem occurs based on at least one of a system state and log information of the second entity or the edge computing device (step 2251). Security monitoring performed by the second entity or the edge computing device may be differently determined based on performance of the processor of the second entity or the edge computing device. Basically, whether a security problem occurs may be determined by analyzing a system state of the second entity or the edge computing device or a log recorded on the second entity or the edge computing device. For example, when a login attempt to the second entity or the edge computing device from a unauthorized IP occurs, it may be determined that a security-related problem has occurred.

Meanwhile, the step (step 2250) of determining, by the second entity or the edge computing device, whether a security problem occurs may further include the step (step 2253) of determining whether a security problem occurs based on packet information including the information related to data transmission and reception, obtained from at least one packet transmitted to and received from the second entity or the edge computing device. By considering the processing capability of the second entity and the edge computing device, the network monitoring device may perform security monitoring based on "packet information" which may include pieces of information from a packet itself not including information on the source and the destination, among pieces of security monitoring using the information related to data transmission and reception. However, according to another aspect of the present disclosure, the second entity or the edge computing device may be equipped with a higher performance processor, and may be configured to perform security monitoring by further considering at least one of "traffic information" and "protocol information" similar to the network monitoring device.

Referring back to FIG. 26, the step (step 2250) of determining, by the second entity or the edge computing device, whether a security problem occurs may further include the step (step 2255) of transmitting and receiving, by the second entity or the edge computing device, edge area security alert information to and from the switching device 1620 in response to a determination of the second entity or the edge computing device determining that a security problem has occurred. The security monitoring in the edge area which may include the second entity or the edge computing device may be performed by the second entity or the edge computing device. The second entity or the edge computing device may transmit, to the switching device 1620, edge area security alert information including information indicating that a security problem has occurred in the edge area. Such edge area security alert information may include an instruction that instructs the switching device 1620 to block the reception of data from the second entity or the edge computing device that has transmitted the edge area security alert information. The edge area security alert information may also be transmitted to the network monitoring device 1660 via the switching device 1620, and may enable further improved security monitoring to be performed through cooperation. As described above, the network monitoring device may autonomously determine that a security problem has occurred or may send a security alert to a manager or an integrated control system in response to the reception of information indicating that a security problem has occurred in the edge area. According to an aspect, the network monitoring device may be configured to block the transmission and reception of information on a specific entity of a network in which a security problem has occurred when the security problem has occurred.

FIG. 27 is a table illustrating an example of a security monitoring application scheme according to the OSI 7 layers. As illustrated in FIG. 27, in the security monitoring based on packet information, the security monitoring based on traffic information, the security monitoring based on protocol information, the security monitoring based on statistical information, and the security monitoring based on alive information, on which information in any of the OSI 7 layers the security monitoring is based may be different. According to an aspect, packet information may be obtained from at least one of the OSI 3 layer and the OSI 4 layer, traffic information may be obtained from the OSI 4 layer, protocol information may be obtained from the OSI 7 layer, statistical information may be obtained from at least one of the OSI 3 layer, the OSI 4 layer and the OSI 7 layer, and alive information may be obtained from at least one of the OSI 3 layer and the OSI 4 layer.

This is more specifically described with reference to FIG. 27. In the network layer of the OSI 3 layer, protocols, such as an IP and an ICMP, may be applied, and information for security monitoring based on at least one of packet information, statistical information, or alive information may be provided. In the transport layer of the OSI 4 layer, protocols, such as a TCP and a UDP, may be applied, and information for security monitoring based on at least one of packet information, traffic information, statistical information or alive information may be provided. In the application layer of the OSI 7 layer, protocols, such as a HTTP and an FTP, may be applied, and information for security monitoring based on at least one of protocol information or statistical information may be provided. Although not illustrated in FIG. 27, security monitoring may be performed based on information obtained from the remaining layers except the OSI 3, 4 and 7 layers. In FIG. 27, the alive information may be used to check whether an error occurs or a Trojan horse has been installed in an edge stage of the second entity, such as an IoT device or an IP camera, for example.

FIG. 28 is a concept view of a method of applying a security monitoring method based on artificial intelligence (AI). As illustrated in FIG. 28, security monitoring according to an aspect of the present disclosure may use an AI-based anomaly detection scheme that is trained based on mirrored packets. In relation to this, a configuration and normal state of a network may be fully different for each network. An action or state included in a normal operation category in a specific network may be recognized as an anomaly action in another network. Accordingly, to train AI based on specific common training data has a problem in that an erroneous security monitoring result is derived upon application to an individual network.

An AI-based anomaly detection scheme according to an aspect of the present disclosure may be implemented to train an artificial neural network by using actually mirrored packet data for predetermined time length duration (e.g., a week) in a corresponding network as training data and to apply the trained artificial neural network model when subsequently performing security monitoring on the actually mirrored packet data. As illustrated in FIG. 28, in a training step (step 2810), for predetermined time length duration (e.g., a week), for example, the artificial neural network may be trained by using, as training data, mirrored packets from a target network to which an actual network monitoring method will be applied based on enhanced learning. Such an artificial neural network model may be updated (step 2815) if necessary. In an application step (step 2820), security monitoring may be performed by monitoring the mirrored packets of a target network to be applied based on the trained and/or updated artificial neural network model.

The AI-based anomaly detection scheme may be a clustering scheme, for example. The step of training the artificial neural network may include converting each of at least one mirrored packet for predetermined first duration into each numerical value by using a first function and determining, by the artificial neural network, the range of a normal numerical value based on the numerical values. According to an aspect, as an example of a training target, pieces of information obtained from mirrored packets during a week may be converted into a mathematical sign or number or a vector based on a given function. Such a conversion may be performed by a given function capable of properly distributing states of a corresponding network. One of known machine learning schemes may be used for such a conversion. For example, at least one of L3, L4, and L7 data of mirrored packets of a network may be converted into a mathematical sign or number or a vector by a function. The range of a normal category may be determined by clustering.

Thereafter, detecting whether an anomaly occurs may include converting at least one mirrored packet at monitoring timing into a reference numerical value by using a first function and determining that an anomaly has occurred in response to a determination that a reference numerical value is not included in the range of the normal numerical value. According to an aspect, when the pieces of information from the mirrored packet are converted in the application step, if a corresponding value is different from a category indicative of a normal state by a preset value or more, this may be configured to determine that a security problem has occurred. By training an artificial neural network for predetermined time length duration based on mirrored packets of a network of a target to be applied as described above, security monitoring can be adaptively performed for each network.

FIG. 29 is a table illustrating an example of security monitoring methods and target items according to a processing element. FIG. 30 is a table illustrating an example of security detection according to a processing element. As illustrated in FIG. 29, security monitoring according to an aspect of the present disclosure may apply different security monitoring methods or algorithms depending on a processing element.

As illustrated in FIG. 29, at least one of an artificial intelligence (AI)-based clustering scheme and a rule/pattern-based signature-based detection scheme may be used as an exemplary security problem detection scheme for processing packet information. As an algorithm (target item), AI-based clustering for L3/L4 data may be applied. Alternatively, in relation to a signature scheme, for example, anomaly detection may be performed on a source IP, a source port, a destination IP, a destination port, a protocol, a packet flag, a PPS, a BPS, or a CPS. As described above, security monitoring for packet information may be performed in at least one of the network monitoring device 1660 and the security module 1640.

Referring back to FIG. 29, an AI-based clustering scheme may be used as an exemplary security problem detection scheme for processing traffic information. As an algorithm (target item), for example, a clustering scheme for a traffic dispersion graph may be applied. Security monitoring for the traffic information may be performed in the network monitoring device 1660. However, according to another aspect of the present disclosure, if the processing capability of the processor of an edge computing device is improved, security monitoring may be performed even in the security module 1640.

Referring back to FIG. 29, at least one of an AI-based clustering scheme and a rule/pattern-based specification-based scheme may be used as an exemplary security problem detection scheme for processing protocol information. As an algorithm (target item), AI-based clustering for L7 data may be applied. Alternatively, in relation to the specification-based scheme, for example, anomaly detection for a URL, a command, or an action may be performed. If a target to which security monitoring will be applied is a system including an IP camera, the command may include at least one of a login command, a viewing command, or a preview command for the IP camera, for example. The security monitoring for protocol information may be performed in the network monitoring device 1660. However, according to another aspect of the present disclosure, if the processing capability of the processor of an edge computing device is improved, security monitoring may be performed even in the security module 1640.

Referring back to FIG. 29, an AI-based statistical scheme may be applied as an exemplary security problem detection scheme for processing statistical information. A detailed algorithm (target item) may include a comparison based on a time (e.g., a comparison between states at different dates for the same timing), for example. Security monitoring for statistical information may be performed in the network monitoring device 1660. However, according to another aspect of the present disclosure, if the processing capability of the processor of an edge computing device is improved, security monitoring may be performed even in the security module 1640.

Referring back to FIG. 29, a rule/pattern-based specification-based scheme may be applied as an exemplary security problem detection scheme for processing alive information. As a detailed algorithm (target item), a comparison based on a threshold may be used based on a specification. Security monitoring for alive information may be performed in the network monitoring device 1660. However, according to another aspect of the present disclosure, if the processing capability of the processor of an edge computing device is improved, security monitoring may be performed even in the security module 1640.

Finally, referring back to FIG. 29, a rule/pattern-based signature-based scheme may be applied to processing for a system state and log information which may be performed in the security module 1640 of the second entity or an edge computing device. For example, a method for a comparison based on a threshold within the signature-based scheme may be applied.

As described with reference to FIG. 29, the step (step 2221-1 or step 2253) of determining whether a security problem occurs based on the packet information of FIG. 25 or 26 may be configured to use at least one of the clustering-based anomaly detection and the signature-based detection. The step (step 2221-3) of determining whether a security problem occurs based on the traffic information of FIG. 25 may be configured to use the clustering-based anomaly detection. The step (step 2221-5) of determining whether a security problem occurs based on the protocol information of FIG. 25 may be configured to use at least one of the clustering-based anomaly detection and the specification-based detection. The step (step 2223) of determining whether a security problem occurs based on the statistical information of FIG. 24 may be configured to use the statistical scheme-based anomaly detection. The step (step 2225) of determining whether a security problem occurs based on the alive information of FIG. 24 may be configured to use the specification-based detection.

FIG. 30 illustrates detailed examples of the schemes for detecting whether a security problem occurs and the application of security monitoring based on target items. As disclosed in FIG. 30, the step (step 2221-1 or step 2253) of determining whether a security problem occurs based on the packet information of FIG. 25 or 26 may be configured to determine that a security problem has occurred in a network based on at least one of a determination that the number of accesses in a section from a predetermined first source IP to a first destination IP is a predetermined threshold or more, a determination that a request for a predetermined first URL is a predetermined threshold or more, a determination that a bit per second (BPS) of a predetermined first server is a predetermined threshold or more, a determination that a packet per second (PPS) from a predetermined second source IP belonging to the signature scheme is a predetermined threshold or more, a determination that the number of synchronization signal (SYN) packets from a predetermined third source IP is a predetermined threshold or more, and a determination that a predetermined fourth source IP simultaneously attempts access to server IPs whose number is a predetermined threshold or more, based on AI.

Furthermore, referring to FIG. 30, the step (step 2221-3) of determining whether a security problem occurs based on the traffic information of FIG. 25 may be configured to determine that a security problem has occurred in the network in response to a determination that traffic deviated from the traffic dispersion graph by the predetermined threshold or more has occurred by using the AI-based clustering scheme.

Referring back to FIG. 30, the step (step 2221-5) of determining whether a security problem occurs based on the protocol information of FIG. 25 may be configured to determine that a security problem has occurred in the network based on at least one of a determination that a request for a predetermined first structured query language (SQL) from a predetermined first IP has occurred by a predetermined threshold or more, a determination that an HTTP request of a predetermined threshold or more from a fifth source IP whose HTTP request is smaller than a preset reference value has occurred, and a determination that a request for a predetermined second URL for a predetermined second server has occurred by a predetermined threshold or more, a determination that a predetermined first action (e.g., keep-Alive) for predetermined time length duration has occurred by a predetermined threshold number or more, which may belong to the specification-based scheme, a determination that access to a URL causing a 404 error has occurred by a predetermined threshold or more, or a determination that a login failure has occurred by a threshold number (e.g., 3) or more for predetermined time length duration (e.g., 1 minute), based on AI.

Furthermore, referring to FIG. 30, the step (step 2223) of determining whether a security problem occurs based on the statistical information of FIG. 24 may be configured to determine that a security problem has occurred in the network based on at least one of a determination that an average BPS for predetermined first duration is greater than an average BPS for the same time length duration prior to a preset date by a predetermined threshold or more, a determination that server access from a client IP not having access for predetermined time length duration has occurred, or a determination that the outbound BPS of the server is more than twice a preset average value, which may belong to the AI scheme.

Referring back to FIG. 30, the step (step 2225) of determining whether a security problem occurs based on the alive information of FIG. 24 may be configured to determine that a security problem has occurred in the network based on at least one of a determination that access to at least one of the first entity or the second entity is impossible during time length duration of a predetermined threshold, a determination that an acknowledgement signal (ACK) packet has been generated less than a synchronization signal (SYN) packet by a predetermined threshold or more, or a determination that a device IP is not present within an address resolution protocol (ARP), which may belong to the specification-based scheme.

Meanwhile, referring to FIG. 30, the step (step 2251) of determining whether a security problem occurs based on at least one of the system state and the log information of FIG. 26 may be configured to determine that a security problem has occurred in the second entity or the edge computing device based on at least one of a determination that a login attempt has occurred from a unauthorized IP to the second entity or the edge computing device, a determination that an operation of an unknown process has occurred in the second entity or the edge computing device, or a determination that a login failure of a predetermined number or more for the second entity or the edge computing device has occurred for predetermined time length duration, which may be included in the signature-based scheme.

FIG. 31 is a table illustrating security according to cooperation between the monitoring device and an edge area. As illustrated in FIG. 31, the highest security can be secured when security detection is performed in both the network monitoring device 1660 and an edge area, for example, the security module 1640 of the second entity or the edge computing device. High security is secured when security detection is performed only in the network monitoring device 1660. Low security is secured when security detection is performed only in an edge area, for example, the security module 1640 of the second entity or the edge computing device. The lowest security is secured when security detection is not performed in both the network monitoring device 1660 and an edge area, for example, the security module 1640 of the second entity or the edge computing device. Moreover, as described above, security detection performed in an edge area, for example, the security module 1640 of the second entity or the edge computing device may be changed depending on performance of the processor of the second entity or the edge computing device, for example. This may affect the strength of security and/or one or more of efficiency and rapidness of security monitoring.

FIG. 32 is a table illustrating an example of a security algorithm of alive information. As illustrated in FIG. 32, the alive information-based security algorithm may be divided into a passive type and an active type. A state of a device may be divided into Server Down and Service Down. In this case, the Server Down and the Service Down are determined when both conditions 1 and 2 are satisfied. When a server is down, it may be determined that an unconditional service has been down. In FIG. 32, last_transfer_time may indicate the time of a packet that has been last transmitted (requested/responded). A timeout time of CONNECT( ) may be 3 seconds, for example. An address resolution protocol (ARP) may indicate a protocol used to make an IP address correspond to a physical network address in a network.

As illustrated in FIG. 32, in the passive algorithm, a condition 1 of Server Down may include that a time from the final transmission time to a present time exceeds n seconds, and a condition 2 thereof may include that the number of synchronization signals SYN exceeds m. Furthermore, in the passive algorithm, likewise, a condition 1 of Service Down may include that a time from the final transmission time to a present time exceeds n seconds, and a condition 2 thereof may include that the count of server reset exceeds m. In the active algorithm, a condition 1 of the Server Down may include that an access time for a server IP is a network timeout time or a network close time, and a condition 2 thereof may include that a server IP is not present within an ARP. In the active algorithm, a condition 1 of Service Down is the same as that of Server Down, but a condition 2 thereof may include that a server IP is present within an ARP.

Figure 33:
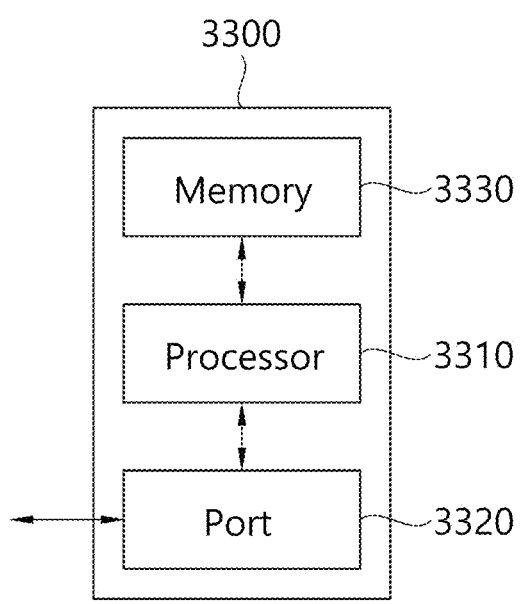
FIG. 33 is a block diagram illustrating an exemplary configuration of a network monitoring device according to an embodiment of the present disclosure.

FIG. 33 is a block diagram illustrating an exemplary configuration of a network monitoring device according to an embodiment of the present disclosure. As illustrated in FIG. 33, the network monitoring device 3300 according to an embodiment of the present disclosure may include a processor 3310, a port 3320 and a memory 3330. The network monitoring device 3300, as described above with reference to FIGS. 16 to 19, may be included in a network, including the first entity 1610 and the second entity 1630, the switching device 1620 provided between the first entity and the second entity, and the network monitoring device 1660 or 3300 connected to the switching device.

The port 3320 may be configured to obtain at least one mirrored packet for at least one packet transmitted and received between the first entity 1610 and the second entity 1630, based on mirroring from the switching device 1620.

The processor 3330 may be configured to determine whether a security problem for a network associated with the first entity 1610 and the second entity 1630 occurs, based on at least some of pieces of information included in at least one mirrored packet.

The memory 3330 may store at least one of a trained artificial neural network model for security monitoring, signature information, or specification information, for example. According to an aspect, the memory 3330 may store instructions that enable the processor 3310 to perform network monitoring.

Figure 34:
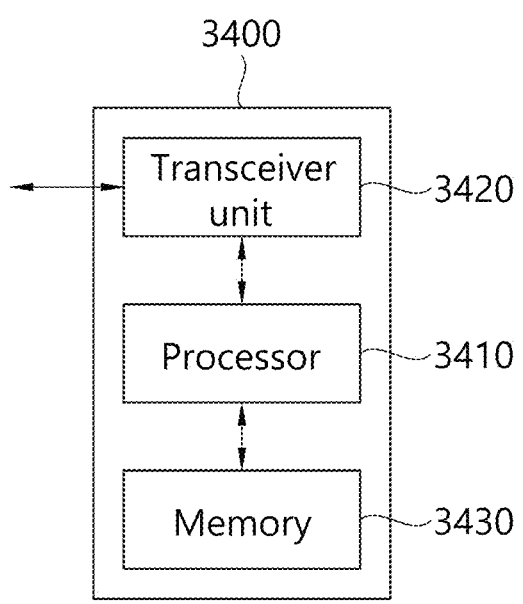
FIG. 34 is a block diagram illustrating an exemplary configuration of a second entity according to an embodiment of the present disclosure.

FIG. 34 is a block diagram illustrating an exemplary configuration of a second entity according to an embodiment of the present disclosure. As illustrated in FIG. 34, the second entity 3400 according to an embodiment of the present disclosure may be a second entity included in a network, including a first entity and a second entity, and a switching device provided between the first entity and the second entity. In this case, the second entity 3400 may be configured to include a transceiver unit 3420 for transmitting and receiving packets to and from the first entity, to include a processor 3420, and to perform edge computing or to be connected to the switching device via an edge computing device including a processor.

The processor 3420 may be configured to determine whether a security problem for a network associated with the first entity and the second entity occurs based on at least some of pieces of information included in at least one packet received by the second entity 3400 or transmitted by the second entity 3400.

The memory 3430 may store at least one of a training artificial neural network model for security monitoring, signature information, or specification information, for example. According to an aspect, the memory may store instructions for enabling the processor 3410 to perform network monitoring.

Meanwhile, a network monitoring system for determining whether a network security problem occurs according to an embodiment of the present disclosure is described with reference to FIG. 16 to FIG. 19. The network monitoring system according to an embodiment of the present disclosure may include the switching device 1620 provided between a first entity and a second entity, the network monitoring device 1660 connected to the switching device and obtaining at least one mirrored packet for at least one packet transmitted and received between the first entity and the second entity based on mirroring from the switching device and determining whether a security problem for a network associated with the first entity and the second entity occurs based on at least some of pieces of information included in the at least one mirrored packet, and the second entity 1630 including the processor and performing edge computing and connected to the switching device via an edge computing device including a processor. In this case, the processor may be configured to determine whether a security problem for the network associated with the first entity and the second entity occurs, based on the at least some of pieces of information included in at least one packet received by the second entity or transmitted by the second entity.

A detailed operation of at least one of the network monitoring device, the second entity, and the network monitoring system according to an embodiment of the present disclosure may follow the aforementioned detailed procedure of the network monitoring method according to an embodiment of the present disclosure.

Figure 35:
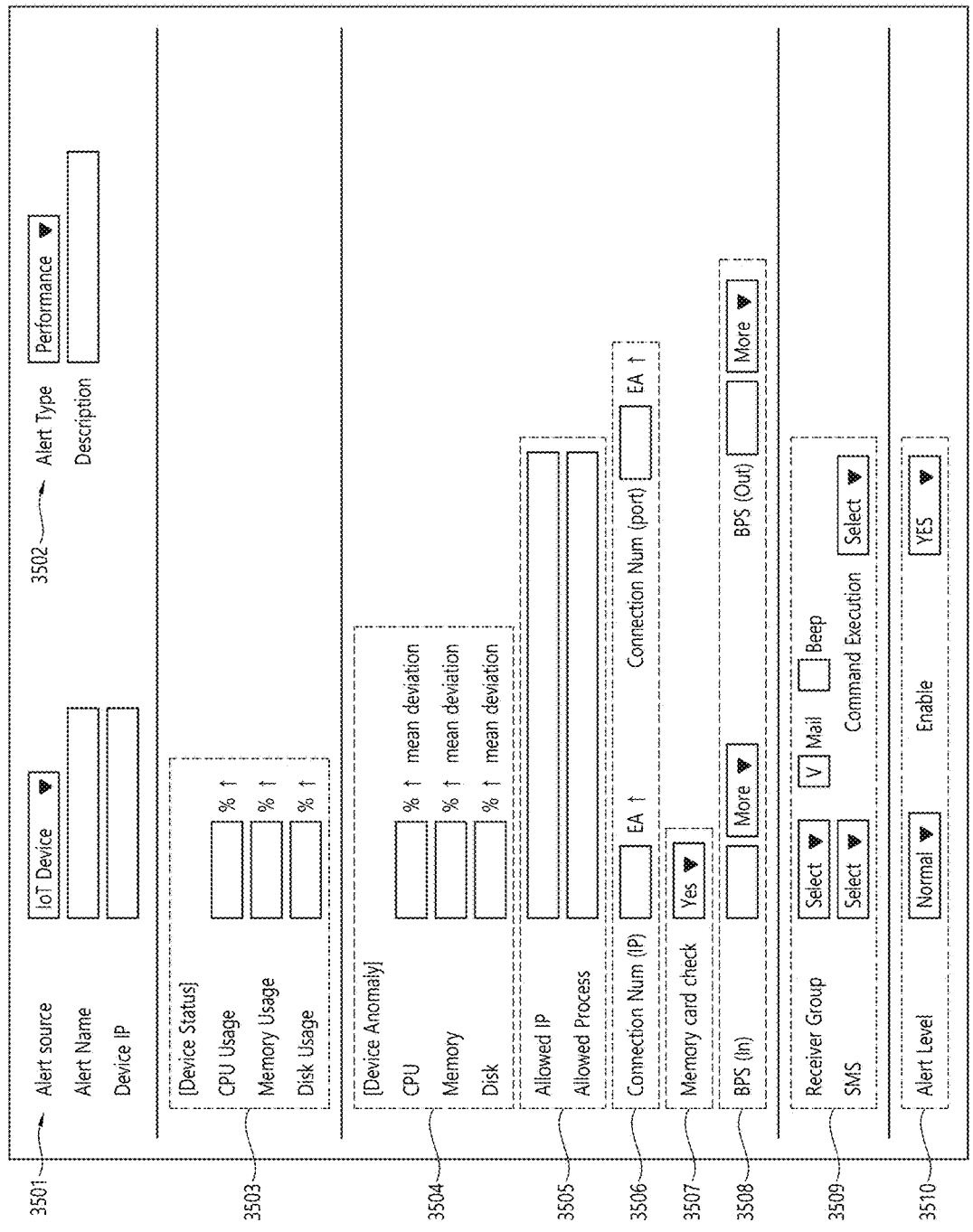
FIG. 35 illustrates a configuration screen for network monitoring by the second entity according to an embodiment of the present disclosure.

FIG. 35 illustrates a configuration screen for network monitoring by the second entity according to an embodiment of the present disclosure. As described above, according to an aspect of the present disclosure, the second entity includes the processor and performs edge computing, and communicates with the first entity via an edge computing device including a processor. The second entity connected to the switching device may also be configured to perform monitoring on performance and/or security of a network. The configuration of network monitoring of the second entity may be performed by the second entity or a device connected to the second entity, for example, and may be performed by the monitoring device connected to the switching device or a device (e.g., console) connected to the monitoring device. FIG. 35 illustrates an exemplary UX/UI capable of performing a detailed configuration for network monitoring by the second entity. For example, a setting value for network monitoring configured by a console may be transmitted to the network monitoring device, and a setting value for network monitoring of the network monitoring device may be stored in the network monitoring device. A setting value for network monitoring of the second entity determined by the console may be transmitted and stored in the second entity. The second entity may be configured to perform network monitoring based on the setting value and to transmit information on a monitoring result to a user by transmitting the information to the network monitoring device.

Referring to FIG. 35, through a UX/UI for an environment configuration for network monitoring, a user may determine an alert element 3501 whose environment configuration is to be changed. Conventionally, for example, the second entity, such as an "IoT device", in addition to a server/flow map/client, that is, an alert target, is also added so that it is selected as an alert element. Furthermore, an alert name and a device IP and a description for each of a plurality of entities according to a type may be displayed.

Meanwhile, after configuring the alert target, the user may set an alert type 3502. That is, the user may determine whether to change a configuration for which one of performance and/or security monitoring with respect to the alert target.

Thereafter, a change in the detailed configuration of detailed items for monitoring may be performed. A configuration for CPU/memory/disk usage may be performed as an alert configuration for a device state 3503. According to an aspect, when a value of a 1-minute average of the CPU/memory/disk usage is a preset threshold or more, an alert may be performed. A threshold of each usage may be configured to be changed and set by a user.

In relation to an abnormal action alert 3504, a configuration for an average absolute deviation of CPU/memory/disk may be performed. According to an aspect, when an average absolute deviation of a 3-minute unit for the CPU/memory/disk usage is a preset threshold or more, an abnormal action alert may be performed. A threshold of each usage may be configured to be changed and set by a user.

Meanwhile, according to an aspect, for example, a white list 3505 may be operated as an allowed IP and/or an allowed process. That is, a specific IP is set as an allowed IP. If access to the second entity is attempted from an IP except the allowed IP, the access may be notified. A specific process is set as an allowed process. If the execution of a process except the allowed process is attempted, such execution may be notified.

A configuration 3506 for the detection of DDoS or DoS may be performed. For example, for the detection of DDoS, a maximum number of IPs whose access is allowed is set. When access is attempted by a preset number or more of IPs, a user may be notified of an alert. Furthermore, for example, the detection of DoS, a maximum number of ports connected to one IP is set. If access is attempted by a port greater than a preset number of ports, a user may be notified of an alert.

Meanwhile, a memory card attachment and detachment change check 3507 may be configured. An event in which an additional storage medium, such as a memory card, for example, is connected to or disconnected from the second entity may be associated with the occurrence of a security problem. Accordingly, a user may be notified of an alert at timing at which the additional storage medium not connected to the second entity is connected or at timing at which the additional storage medium connected to the second entity is disconnected.

A data transfer rate-related configuration 3508 may be performed. For example, a configuration for a threshold or higher or lower of BPS IN (TX) or OUT (RX) may be performed. A user may be notified of an alert at timing at which the BPS of received data becomes a preset value or more or becomes the preset value or less and may be notified of an alert at timing at which the BPS of data transmitted by the second entity becomes a preset value or more or becomes the preset value or less in the second entity. Furthermore, a value of the BPS, that is, a reference, may be configured to be changed and set by a user.

A detailed configuration for a notification function 3509 is possible. That is, alert notification may include a configuration for a received recipient group, a configuration for a notification method, such as a mail or a beep, a configuration for whether to transmit an SMS message, and a configuration for command execution. Furthermore, a configuration for a level of an alert and whether to activate an alert 3510 may also be configured.

The aforementioned system or device and method may be implemented as a hardware element, a software element and/or a combination of a hardware element and a software element. For example, the system, device and element described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been described as being used, but a person having ordinary skill in the art may understand that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be permanently or temporarily embodied in any type of machine, component, physical device, virtual equipment or computer storage medium or device or a transmitted signal wave in order to be interpreted by the processor or to provide an instruction or data to the processor. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as a CD-ROM or a DVD, magneto-optical media such as a floptical disk, a ROM, a RAM, or a flash memory. Examples of the program instruction may include both a machine-language code, such as a code written by a compiler, and a high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. A security monitoring method for a network comprising a first entity and a second entity, a switching device provided between the first entity and the second entity, and a network security monitoring device connected to the switching device, the security monitoring method comprising:
   obtaining, by the network security monitoring device, at least one mirrored packet for at least one packet transmitted and received between the first entity and the second entity, based on mirroring from the switching device;
   determining, by the network security monitoring device, whether a security problem for the network associated with the first entity and the second entity occurs, based on information included in the at least one mirrored packet; and
   calculating a performance-related index indicative of performance of service of a network associated with the first entity and the second entity based on at least some of pieces of information included in the at least one mirrored packet,
   wherein the calculating is performed in parallel with the determining, by the network security monitoring device, whether a security problem occurs, and
   wherein the information included in the at least one mirrored packet is related to data transmission and reception, and includes:
      traffic information comprising information on a flow of the packet by using a source and destination of the packet, the traffic information obtained from at least one of an Open Systems Interconnection (OSI) layer 3 and an OSI layer 4; and
      protocol information comprising information on a transmission and reception of a plurality of packets and an application of the packet, the protocol information obtained from an OSI layer 7.

2. The network security monitoring method of claim 1, wherein the information included in the at least one mirrored packet further includes:
   statistical information obtained from a plurality of mirrored packets; and
   alive information indicating that a connection to at least one of the first entity and the second entity is possible.

3. The network security monitoring method of claim 2, wherein the information included in the at least one mirrored packet further includes packet information comprising information from the at least one packet.

4. The network security monitoring method of claim 3, wherein:
   the packet information is obtained from at least one of the OSI layer 3 and the OSI layer 4,
   the statistical information is obtained from at least one of the OSI layer 3, the OSI layer 4 and the OSI layer 7, and
   the alive information is obtained from at least one of the OSI layer 3 and the OSI layer 4.

5. The network security monitoring method of claim 3, wherein:
   the determining whether the security problem occurs based on the packet information comprises using at least one of clustering-based anomaly detection and signature-based detection,
   the determining whether the security problem occurs based on the traffic information comprises using the clustering-based anomaly detection,
   the determining whether the security problem occurs based on the protocol information comprises using at least one of the clustering-based anomaly detection and specification-based detection,
   the determining whether the security problem occurs based on the statistical information comprises using statistical scheme-based anomaly detection, and
   the determining whether the security problem occurs based on the alive information comprises using the specification-based detection.

6. The network security monitoring method of claim 3, wherein the determining whether the security problem occurs based on the packet information comprises determining that a security problem has occurred in the network, based on at least one of
   a determination that a number of accesses in a section from a predetermined first source IP to a first destination IP is a predetermined threshold or more,
   a determination that a request for a predetermined first URL is a predetermined threshold or more,
   a determination that a bit per second (BPS) of a predetermined first server is a predetermined threshold or more,
   a determination that a packet per second (PPS) from a predetermined second source IP is a predetermined threshold or more,
   a determination that the number of synchronization signal (SYN) packets from a predetermined third source IP is a predetermined threshold or more, and
   a determination that a predetermined fourth source IP simultaneously attempts access to a predetermined threshold or more of server IPs.

7. The network security monitoring method of claim 3, wherein the determining whether the security problem occurs based on the traffic information comprises
   determining that a security problem has occurred in the network, in response to a determination that traffic deviated from a traffic dispersion graph by a predetermined threshold or more has occurred by using a clustering scheme.

8. The network security monitoring method of claim 3, wherein the determining whether the security problem occurs based on the protocol information comprises determining that a security problem has occurred in the network, based on at least one of
   a determination that a request for a predetermined first structured query language (SQL) from a predetermined first IP has occurred by a predetermined threshold or more,
   a determination that an HTTP request of a predetermined threshold or more from a fifth source IP whose HTTP request is smaller than a preset reference value has occurred,
   a determination that a request for a predetermined second URL for a predetermined second server has occurred by a predetermined threshold or more, a determination that a predetermined first action has occurred by a predetermined threshold or more for predetermined time length duration, a determination that access to a URL causing a 404 error has occurred by a predetermined threshold or more, and a determination that a login failure of a threshold number or more has occurred for predetermined time length duration.

9. The network security monitoring method of claim 3, wherein the determining whether the security problem occurs based on the statistical information comprises determining that a security problem has occurred in the network, based on at least one of a determination that an average bit per second (BPS) for predetermined first duration is greater than an average BPS for the same time length duration prior to a preset date by a predetermined threshold or more, a determination that server access from a client IP not having access for predetermined time length duration has occurred, and a determination that an outbound BPS of a server is more than twice a preset average value.

10. The network security monitoring method of claim 3, wherein the determining whether the security problem occurs based on the alive information comprises determining that a security problem has occurred in the network, based on at least one of a determination that access to at least one of the first entity or the second entity is impossible during time length duration of a predetermined threshold, a determination that an acknowledgement signal (ACK) packet has been generated leas than a synchronization signal (SYN) packet by a predetermined threshold or more, and a determination that a device IP is not present within an address resolution protocol (ARP).

11. The network security monitoring method of claim 1, wherein:
the first entity comprises a server, and
the second entity comprises a client terminal.

12. The network security monitoring method of claim 11, wherein the client terminal comprises an IoT device.

13. The network security monitoring method of claim 1, wherein:
the first entity comprises a network video recorder (NVR), and
the second entity comprises an IP camera.

14. The network security monitoring method of claim 1, wherein the determining whether a security problem occurs is based on at least one of artificial intelligence-based anomaly detection comprising a clustering or statistical scheme,
signature-based detection using a pattern or a rule, and
specification-based detection using a pattern or a rule.

15. A network security monitoring device included in a network comprising a first entity and a second entity, a switching device provided between the first entity and the second entity, and a network security monitoring device connected to the switching device, the network security monitoring device comprising:

a port obtaining at least one mirrored packet for at least one packet transmitted and received between the first entity and the second entity, based on mirroring from the switching device; and a hardware processor determining whether a security problem for the network associated with the first entity and the second entity occurs, based on information included in the at least one mirrored packet; and the hardware processor further calculating a performance-related index indicative of performance of service of a network associated with the first entity and the second entity based on at least some of pieces of information included in the at least one mirrored packet, wherein the calculating is performed in parallel with the determining, by the network security monitoring device, whether a security problem occurs, and wherein the information included in the at least one mirrored packet is related to data transmission and reception and includes:

traffic information comprising information on a flow of the packet by using a source and destination of the packet, the traffic information obtained from at least one of an Open Systems Interconnection (OSI) layer 3 and an OSI layer 4; and protocol information comprising information on a transmission and reception of a plurality of packets and an application of the packet, the protocol information obtained from an OSI layer 7.

16. A network security monitoring system determining whether a network security problem occurs, comprising:
a first entity;
a second entity;
a switching device provided between the first entity and the second entity; and
a network security monitoring device connected to the switching device;
wherein the network security monitoring device comprises a hardware processor for:

obtaining at least one mirrored packet for at least one packet transmitted and received between the first entity and the second entity based on mirroring from the switching device, determining whether a security problem for the network associated with the first entity and the second entity occurs based on information included in the at least one mirrored packet, and calculating a performance-related index indicative of performance of service of a network associated with the first entity and the second entity based on at least some of pieces of information included in the at least one mirrored packet, wherein the calculating is performed in parallel with the determining, by the network security monitoring device, whether a security problem occurs, and wherein the information included in the at least one mirrored packet is related to data transmission and reception and includes:

traffic information comprising information on a flow of the packet by using a source and destination of the packet, the traffic information obtained from at least one of an Open Systems Interconnection (OSI) layer 3 and an OSI layer 4; and protocol information comprising information on a transmission and reception of a plurality of packets and an application of the packet, the protocol information obtained from an OSI layer 7.

* * * * *